United States Patent
Senzaki et al.

(10) Patent No.: US 9,834,696 B2
(45) Date of Patent: Dec. 5, 2017

(54) UNDERCOAT AGENT AND METHOD OF FORMING PATTERN OF LAYER CONTAINING BLOCK COPOLYMER

(71) Applicant: TOKYO OHKA KOGYO CO., LTD., Kawasaki-shi (JP)

(72) Inventors: Takahiro Senzaki, Kawasaki (JP); Ken Miyagi, Kawasaki (JP); Tsuyoshi Kurosawa, Kawasaki (JP); Daiju Shiono, Kawasaki (JP); Tasuku Matsumiya, Kawasaki (JP); Kenichiro Miyashita, Kawasaki (JP); Katsumi Ohmori, Kawasaki (JP)

(73) Assignee: TOKYO OHKA KOGYO CO., LTD., Kawasaki-Shi (JP)

( * ) Notice: Subject to any disclaimer, the term of this patent is extended or adjusted under 35 U.S.C. 154(b) by 0 days.

(21) Appl. No.: 15/156,170

(22) Filed: May 16, 2016

(65) Prior Publication Data

US 2016/0257838 A1 Sep. 8, 2016

Related U.S. Application Data

(62) Division of application No. 13/790,206, filed on Mar. 8, 2013, now abandoned.

(30) Foreign Application Priority Data

Mar. 14, 2012 (JP) ................................. 2012-057693
Feb. 5, 2013 (JP) ................................. 2013-020932

(51) Int. Cl.
*B05D 3/02* (2006.01)
*B05D 3/06* (2006.01)
(Continued)

(52) U.S. Cl.
CPC ............ *C09D 125/14* (2013.01); *B05D 3/145* (2013.01); *B05D 7/544* (2013.01); *C09D 125/02* (2013.01);
(Continued)

(58) Field of Classification Search
None
See application file for complete search history.

(56) References Cited

U.S. PATENT DOCUMENTS 3,839,308 A 10/1974 Carrock
5,945,517 A 8/1999 Nitta et al.
(Continued)

FOREIGN PATENT DOCUMENTS

JP 09-208554 A 8/1997
JP 11-035551 A 2/1999
(Continued)

OTHER PUBLICATIONS

Office Action in Japanese Application No. 2013-020932, dated Sep. 20, 2016.
(Continued)

*Primary Examiner* — Vu A Nguyen
(74) *Attorney, Agent, or Firm* — Knobbe Martens Olson & Bear LLP

(57) ABSTRACT

An undercoat agent including a block copolymer having a plurality of blocks bonded formed on a substrate. The undercoat agent contains a resin component that includes a structural unit having an aromatic ring and a structural unit having no aromatic ring, and the resin component includes a group which can interact with the substrate and does not include a 3 to 7-membered, ether-containing cyclic group; and a method of forming a pattern of a layer containing a block copolymer. The method includes applying an undercoat agent to a substrate to form a layer containing the
(Continued)

undercoat agent; forming a layer containing a block copolymer having multiple blocks bonded on a surface of the layer containing the undercoat agent, followed by a phase separation of the layer containing the block copolymer; and selectively removing a phase containing at least one block of multiple blocks constituting the block copolymer.

7 Claims, 1 Drawing Sheet

(51) Int. Cl.
  *C09D 125/14*   (2006.01)
  *C09D 143/04*   (2006.01)
  *C09D 133/02*   (2006.01)
  *C09D 133/22*   (2006.01)
  *C09D 133/08*   (2006.01)
  *C09D 135/06*   (2006.01)
  *C09D 133/18*   (2006.01)
  *C09J 133/06*   (2006.01)
  *C09J 133/14*   (2006.01)
  *B05D 3/14*   (2006.01)
  *B05D 7/00*   (2006.01)
  *C09D 125/02*   (2006.01)

(52) U.S. Cl.
  CPC ......... *C09D 133/02* (2013.01); *C09D 133/08* (2013.01); *C09D 133/18* (2013.01); *C09D 133/22* (2013.01); *C09D 135/06* (2013.01); *C09D 143/04* (2013.01); *C09J 133/06* (2013.01); *C09J 133/14* (2013.01)

(56) References Cited

U.S. PATENT DOCUMENTS

| | | | |
|---|---|---|---|
| 6,153,733 A | 11/2000 | Yukawa et al. | |
| 7,521,094 B1 | 4/2009 | Cheng et al. | |
| 8,426,313 B2 | 4/2013 | Millward et al. | |
| 8,481,246 B2 | 7/2013 | Asakawa et al. | |
| 8,822,133 B2 | 9/2014 | Trefonas et al. | |
| 2002/0058204 A1 | 5/2002 | Khojasteh et al. | |
| 2007/0066768 A1* | 3/2007 | Gauthier | C08G 18/10 525/477 |
| 2009/0186234 A1* | 7/2009 | Colburn | C08F 255/00 428/500 |
| 2009/0236309 A1 | 9/2009 | Millward et al. | |
| 2012/0088192 A1* | 4/2012 | Trefonas | G03F 7/0392 430/285.1 |
| 2012/0244474 A1 | 9/2012 | Asakawa et al. | |

FOREIGN PATENT DOCUMENTS

| | | |
|---|---|---|
| JP | 11-035552 A | 2/1999 |
| JP | 11-035573 A | 2/1999 |
| JP | 11-322707 A | 11/1999 |
| JP | 2008-036491 A | 2/2008 |
| JP | A-2011-515537 | 5/2011 |
| JP | A-2012-062365 | 3/2012 |
| JP | A-2012-078830 | 4/2012 |
| WO | WO 2004/074242 A2 | 9/2004 |
| WO | WO 2011/039847 A1 | 4/2011 |

OTHER PUBLICATIONS

Cheng et al., Integration of Polymer Self-Assembly for Lithographic Application, Proceedings of SPIE, vol. 6921, 692127-1 to 692127-8, 2008.
Hinsberg et al., Self-Assembling Materials for Lithographic Patterning: Overview, Status and Moving Forward, Proceedings of SPIE, vol. 7637, 76370G-1 to 76370G-1 1, 2010.
In et al., Langmuir, vol. 22, 7855-7860, 2006.
Lessard et al., Marcomolecules, vol. 41, 3446-3454, 2008.
Office Action in Taiwanese Patent Application No. 102108640, dated Feb. 24, 2016.

* cited by examiner

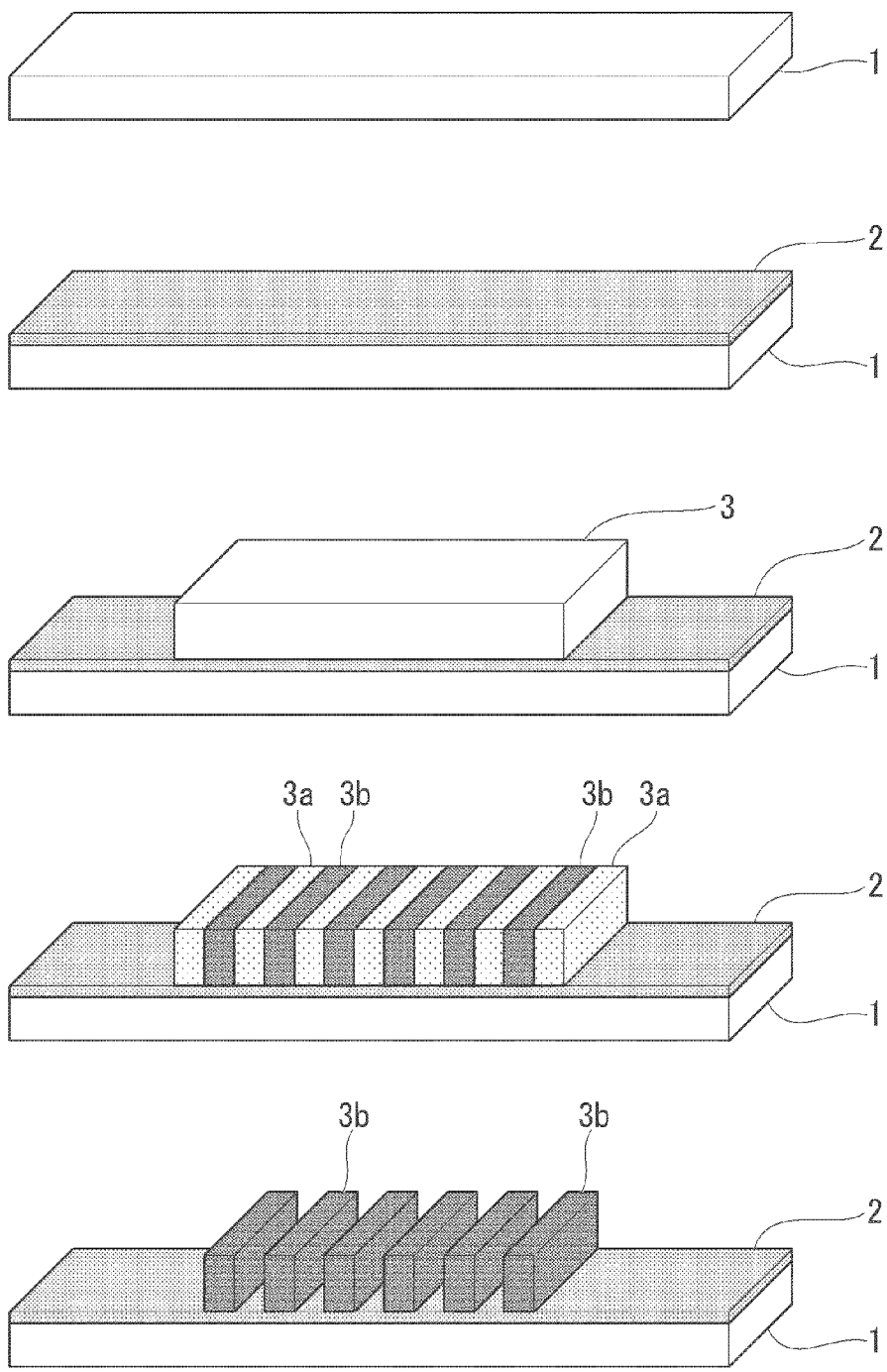

UNDERCOAT AGENT AND METHOD OF FORMING PATTERN OF LAYER CONTAINING BLOCK COPOLYMER

RELATED APPLICATIONS

This application is a divisional of U.S. patent application Ser. No. 13/790,206, filed Mar. 8, 2013, which claims priority to Japanese Patent Application No. 2012-057,693, filed Mar. 14, 2012; and Japanese Patent Application No. 2013-020932, filed Feb. 5, 2013, the entire contents of which are incorporated herein by reference.

TECHNICAL FIELD

The present invention is related to an undercoat agent which is used for phase separating a layer including a block copolymer having a plurality of blocks bonded formed on a substrate, and a method of forming a pattern of a layer containing a block copolymer by using the undercoating agent.

Priority is claimed on Japanese Patent Application No. 2012-057693, filed Mar. 14, 2012, and Japanese Patent Application No. 2013-020932, filed Feb. 5, 2013, the contents of which are incorporated herein by reference.

BACKGROUND ART

Recently, as further miniaturization of large scale integrated circuits (LSI) proceeds, a technology for processing a more delicate structure is demanded. In response to such demand, an attempt has already been started in which a fine pattern is formed using a phase-separated structure formed by self-assembly of a block copolymer having mutually incompatible blocks bonded together.

For using a phase separation of a block copolymer, it is necessary to form a self-assembled nano structure by a microphase separation only in specific regions, and arrange the nano structure in a desired direction. For realizing position control and orientational control, graphoepitaxy to control phase-separated pattern by a guide pattern and chemical epitaxy to control phase-separated pattern by difference in the chemical state of the substrate are proposed (see, for example, Non-Patent Document 1).

One method that has been proposed for achieving favorable phase separation of a block copolymer, thus enabling formation of a very fine pattern, is a method in which a neutral layer having a surface free energy that is between the surface free energy values of two block chains is formed on the substrate, so that the surface free energy of the surface on the substrate with which the block copolymer makes contact is a surface free energy value that is between the surface free energy values of the two block chains (for example, see Patent Document 1).

Further, Non-Patent Document 2 discloses that a method of forming an under layer film by using a compound having heat-crosslinkable property.

DOCUMENTS OF RELATED ART

Patent Document

[Patent Document 1] Japanese Unexamined Patent Application, First Publication No. 2008-36491

Non-Patent Documents

[Non-Patent Document 1] Proceedings of SPIE (U. S.), vol. 7637, pp. 76370G-1 (2010)

[Non-Patent Document 2] Proceedings of SPIE (U. S.), vol. 6921, pp. 692127-1-8 (2008)

SUMMARY OF THE INVENTION

However, in the method disclosed in Patent Document 1, the surface free energy of the neutral layer must be controlled, with the material for the neutral layer being selected in each case so as to have a surface free energy value that is appropriate for the type of block copolymer being used. Accordingly, an undercoat agent that can be used in a simpler manner, and enables formation of a favorable pattern via phase separation of a block copolymer has been keenly sought.

Further, an undercoat agent is not needed for a process such as etching of a substrate, after forming a pattern by phase separation. Therefore, an undercoat agent is required not only to have a function of enabling a satisfactory phase separation of a block copolymer, but also to be capable of forming a thin film which does not affect a later step or is easily removed. However, as described in Non-Patent Document 2 which discloses that the film thickness of the lower-layer film is 5 to 100 nm, crosslinking by heating causes a problem that the film thickness of the lower-layer film increases.

The present invention takes the above circumstances into consideration, with an object of providing an undercoat agent which is capable of forming a thin film and which can be used to produce a substrate provided with a nanostructure on the surface thereof by phase separation of a block copolymer, wherein the nanostructure is designed more freely with respect to the positioning and the orientation thereof; and a pattern formation method for a layer containing a block copolymer using the undercoat agent.

As a result of intensive investigation, the inventors of the present invention discovered that by using an undercoat agent having a specific resin component for performing phase separation of a layer containing a block copolymer, a favorable pattern could be obtained by phase separation without having to control the surface free energy of the layer composed of the undercoat agent, and they also found that a layer composed of the undercoat agent could be formed as a thin film, and they were thus able to complete the present invention.

A first aspect of the present invention is an undercoat agent which is used for phase separating a layer including a block copolymer having a plurality of blocks bonded formed on a substrate, wherein the undercoat agent contains a resin component, the resin component includes a structural unit having an aromatic ring and a structural unit having no aromatic ring, and the resin component includes a group which can interact with the substrate and does not include a 3 to 7-membered, ether-containing cyclic group.

A second aspect of the present invention is a method of forming a pattern of a layer containing a block copolymer, the method including: a step (1) in which the undercoat agent of the first aspect is applied to a substrate to form a layer containing the undercoat agent; a step (2) in which a layer containing a block copolymer having a plurality of blocks bonded is formed on a surface of the layer containing the undercoat agent, followed by a phase separation of the layer containing the block copolymer; and a step (3) in which a phase containing at least one block of the plurality of blocks constituting the block copolymer is selectively removed.

In the present description and claims, the term "aliphatic" is a relative concept used in relation to the term "aromatic", and defines a group or compound that has no aromaticity.

The term "alkyl group" includes linear, branched or cyclic, monovalent saturated hydrocarbon, unless otherwise specified. The same applies for the alkyl group within an alkoxy group.

The term "alkylene group" includes linear, branched or cyclic divalent saturated hydrocarbon, unless otherwise specified.

A "halogenated alkyl group" is a group in which part or all of the hydrogen atoms of an alkyl group is substituted with a halogen atom, and a "halogenated alkylene group" is a group in which part or all of the hydrogen atoms of an alkylene group is substituted with a halogen atom. Examples of the halogen atom include a fluorine atom, a chlorine atom, a bromine atom and an iodine atom.

A "hydroxyalkyl group" is a group in which part or all of the hydrogen atoms within an alkyl group have been substituted with a hydroxyl group.

The term "structural unit" refers to a monomer unit that contributes to the formation of a polymeric compound (resin, polymer, copolymer).

The term "exposure" is used as a general concept that includes irradiation with any form of radiation.

A "block" is a partial structural component, which is composed only of the same type of structural unit bonded together, and constitutes part of a block copolymer.

The term "(meth)acrylic acid" is a generic term that includes either or both of acrylic acid having a hydrogen atom bonded to the α-position and methacrylic acid having a methyl group bonded to the α-position.

The term "(meth)acrylate ester" is a generic term that includes either or both of the acrylate ester having a hydrogen atom bonded to the α-position and the methacrylate ester having a methyl group bonded to the α-position.

The term "(meth)acrylate" is a generic term that includes either or both of the acrylate having a hydrogen atom bonded to the α-position and the methacrylate having a methyl group bonded to the α-position.

According to the undercoat agent of the present invention, by using phase separation of a block copolymer, a substrate provided with a nanostructure on the surface thereof can be simply produced, wherein the nanostructure is more freely designed with respect to the positioning and the orientation thereof. Moreover, when the undercoat agent of the present invention is used, a film having the aforementioned function can be formed as a comparatively thin film on the substrate, and therefore the effects of the layer composed of the undercoat agent on later steps is minimal, and removal of the layer composed of the undercoat agent is comparatively simple.

Further, in the pattern formation method for a layer containing a block copolymer according to the present invention, by using the undercoat agent mentioned above, a substrate provided with a nanostructure on the surface thereof can be produced, wherein the nanostructure is designed more freely with respect to the positioning and the orientation.

BRIEF DESCRIPTION OF THE DRAWINGS

FIG. 1 is a schematic process diagram explaining an embodiment of the pattern formation method for a layer containing a block copolymer according to the present invention.

DETAILED DESCRIPTION OF THE PREFERRED EMBODIMENTS

<<Undercoat Agent>>

The undercoat agent of the first aspect of the present invention contains at least a resin component, and is used for performing phase separation of a layer containing a block copolymer having a plurality of types of blocks bonded formed on a substrate. Specifically, by applying the undercoat agent to the substrate to form a layer composed of the undercoat agent on the substrate, followed by forming a layer containing a block copolymer having a plurality of types of blocks bonded on the undercoat agent, the substrate surface, which has the layer composed of the undercoat agent formed thereon, is able to exhibit a high level of affinity for each of the blocks that constitute the block copolymer.

Descriptions of the phase separation of the layer containing the block copolymer, and the pattern formation method for the layer containing the block copolymer, both of which can use the undercoat agent of the present invention, are presented below within the description of the second aspect.

<Resin Component (A)>

The undercoat agent of the present invention contains at least a resin component (A) (hereafter, frequently referred to as "component (A)").

In the present description and claims, the term "resin component" refers to a polymer having a molecular weight of 1,000 or more. As the molecular weight of the polymer, the weight average molecular weight in terms of the polystyrene equivalent value determined by gel permeation chromatography (GPC) is used.

The component (A) of the present invention includes a structural unit (a1) having an aromatic ring and a structural unit (a2) having no aromatic ring.

Further, the component (A) of the present invention includes a group which can interact with the substrate and does not include a 3 to 7-membered, ether-containing cyclic group. The "group which can interact with the substrate" (hereafter, referred to as "substrate interaction group") may be included in the structural unit (a1) or the structural unit (a2).

[Structural Unit (a1)]

The structural unit (a1) is a structural unit containing an aromatic ring. In the case where the component (A) contains the structural unit (a1) containing an aromatic ring, even when a block copolymer containing a block having various characteristics is used, the component (A) exhibits a moderate level of affinity for the block copolymer.

The aromatic ring preferably has 6 to 18 carbon atoms. Examples of the aromatic ring include aromatic hydrocarbon rings, such as benzene, biphenyl, fluorene, naphthalene, anthracene and phenanthrene; and aromatic hetero rings in which part of the carbon atoms constituting the aforementioned aromatic rings has been substituted with a hetero atom. Examples of the hetero atom within the aromatic hetero rings include an oxygen atom, a sulfur atom and a nitrogen atom.

With respect to the structural unit (a1), there is not particular limitation to the structure of the other portion, as long as the structural unit (a1) has an aromatic ring. Examples of the structural unit (a1) include:

an aromatic compound (a compound containing an aromatic ring) containing a vinyl group;

an aromatic compound containing (meth)acryloyl group; and a phenolic compound which is a component of a novolac resin.

Among these, a structural unit derived from a compound in which one hydrogen atom bonded to a carbon atom constituting an aromatic ring which may have a substituent, has been substituted with a vinyl group; and a structural unit derived from an acrylic acid or ester thereof which may have the hydrogen atom bonded to the carbon atom on the α-position substituted with a substituent and contains an aromatic ring can be preferably used. Here, the vinyl group may be a vinyl group in which a carbon atom bonded to an aromatic ring may be substituted with a substituent.

As the structural unit (a1), styrene or derivatives thereof, vinylnaphthalene or derivatives thereof, or vinylanthracene or derivatives thereof is particularly preferable.

Examples of "styrene and derivatives thereof" include styrene which may have the hydrogen atom bonded to the carbon atom on the α-position substituted with a substituent, and a hydrogen atom bonded to the benzene ring substituted with a substituent other than a hydroxy group (hereafter, styrene which has the hydrogen atom bonded to the carbon atom on the α-position substituted with a substituent is sometimes referred to as "α-substituted styrene", and styrene which does not have the hydrogen atom bonded to the carbon atom on the α-position substituted with a substituent and the aforementioned α-substituted styrene are sometimes collectively referred to as "(α-substituted) styrene", other similar compounds are referred to as above); hydroxystyrene which may have the hydrogen atom bonded to the carbon atom on the α-position substituted with a substituent, and a hydrogen atom bonded to the benzene ring substituted with a substituent other than a hydroxy group (hereafter, sometimes referred to as "(α-substituted) hydroxystyrene"); a compound in which the hydrogen atom within the hydroxy group of (α-substituted) hydroxystyrene is substituted with an organic group; vinylbenzoic acid which may have the hydrogen atom bonded to the carbon atom on the α-position substituted with a substituent, and a hydrogen atom bonded to the benzene ring substituted with a substituent other than a hydroxy group and a carboxy group (hereafter, sometimes referred to as "(α-substituted) vinylbenzoic acid"); and a compound in which the hydrogen atom within the carboxy group of (α-substituted) vinylbenzoic acid is substituted with an organic group.

It is preferable that a hydrogen atom, an alkyl group of 1 to 5 carbon atoms or a halogenated alkyl group of 1 to 5 carbon atoms is bonded to the α-position of the α-substituted styrene, α-substituted hydroxystyrene, or α-substituted vinylbenzoic acid, a hydrogen atom, an alkyl group of 1 to 5 carbon atoms or a fluorinated alkyl group of 1 to 5 carbon atoms is more preferable, and in terms of industrial availability, a hydrogen atom or a methyl group is the most desirable.

As the alkyl group as a substituent on the α-position, a linear or branched alkyl group is preferable, and specific examples include a methyl group, an ethyl group, a propyl group, an isopropyl group, an n-butyl group, an isobutyl group, a tert-butyl group, a pentyl group, an isopentyl group and a neopentyl group.

Specific examples of the halogenated alkyl group as the substituent on the α-position include groups in which part or all of the hydrogen atoms of the aforementioned "alkyl group as the substituent on the α-position" are substituted with halogen atoms. Examples of the halogen atom include a fluorine atom, a chlorine atom, a bromine atom and an iodine atom, and a fluorine atom is particularly desirable.

Hydroxystyrene is a compound which has 1 vinyl group and at least 1 hydroxy group bonded to a benzene ring. The number of hydroxy groups bonded to the benzene ring is preferably 1 to 3, and particularly preferably 1. The bonding position of the hydroxy group on the benzene ring is not particularly limited. When there is 1 hydroxy group, a para-4th position from the bonding position of the vinyl group is preferable. When there are 2 or more hydroxy groups, a desired combination of the bonding positions can be used.

Vinylbenzoic acid is a compound in which one vinyl group is bonded to the benzene ring of benzoic acid. The bonding position of the vinyl group on the benzene ring is not particularly limited.

The substituent other than a hydroxy group and a carboxy group which may be bonded the benzene ring of styrene or a derivative thereof is not particularly limited, and examples thereof include a halogen atom, an alkyl group of 1 to 5 carbon atoms, and a halogenated alkyl group of 1 to 5 carbon atoms. Examples of the halogen atom include a fluorine atom, a chlorine atom, a bromine atom and an iodine atom, and a fluorine atom is particularly desirable.

Examples of "vinylnaphthalene and derivatives thereof" include vinylnaphthalene which may have the hydrogen atom bonded to the carbon atom on the α-position substituted with a substituent, and a hydrogen atom bonded to the naphthalene ring substituted with a substituent other than a hydroxy group (hereafter, sometimes referred to as "(α-substituted) vinylnaphthalene"); vinyl(hydroxynaphthalene) which may have the hydrogen atom bonded to the carbon atom on the α-position substituted with a substituent, and a hydrogen atom bonded to the naphthalene ring substituted with a substituent other than a hydroxy group (hereafter, sometimes referred to as "(α-substituted) vinyl(hydroxynaphthalene)"); and a compound in which the hydrogen atom within the hydroxy group of (α-substituted) vinyl(hydroxynaphthalene) is substituted with a substituent. In the α-substituted vinylnaphthalene or α-substituted vinyl(hydroxynaphthalene), examples of the substituent which substitutes the hydrogen atom bonded to the carbon atom on the α-position is the same as those described above for the substituent of α-substituted styrene.

Vinyl(hydroxynaphthalene) is a compound which has 1 vinyl group and at least 1 hydroxy group bonded to a naphthalene ring. The vinyl group may be bonded to the 1st or 2nd position of the naphthalene ring. The number of hydroxy groups bonded to the naphthalene ring is preferably 1 to 3, and particularly preferably 1. The bonding position of the hydroxy group on the naphthalene ring is not particularly limited. When the vinyl group is bonded to the 1st or 2nd position of the naphthalene ring, the hydroxy group is preferably bonded to either one of the 5th to 8th position of the naphthalene ring. In particular, when the number of hydroxy group is 1, the hydroxy group is preferably bonded to either one of the 5th to 7th position of the naphthalene ring, and more preferably the 5th or 6th position. When there are 2 or more hydroxy groups, a desired combination of the bonding positions can be used.

As the substituent which may be bonded to the naphthalene ring of vinylnaphthalene and derivatives thereof, the same substituents as those described above for the substituent which may be bonded to the benzene ring of the (α-substituted) styrene can be mentioned.

As the "vinylanthracene or derivatives thereof", a vinylanthracene in which the hydrogen atom bonded to the carbon atom on the α-position may be substituted with a substituent, and a hydrogen atom bonded to the anthracene ring may be substituted with a substituent other than a hydroxy group, can be mentioned. The substituent is the same as those described above for the substituent of α-substituted styrene.

An "acrylate ester" refers to a compound in which the terminal hydrogen atom of the carboxy group of acrylic acid ($CH_2=CH-COOH$) has been substituted with an organic group.

In the α-substituted acrylic acid which may have the hydrogen atom bonded to the carbon atom on the α-position substituted with a substituent (hereafter, frequently referred to as "(α-substituted) acrylic acid") or ester thereof, examples of the substituent which substitutes the hydrogen atom bonded to the carbon atom on the α-position is the same as those described above for the substituent of α-vinylnaphthalene, α-substituted vinyl(hydroxynaphthalene), and α-substituted styrene. With respect to the "structural unit derived from an acrylate ester", the "α-position (the carbon atom on the α-position)" refers to the carbon atom having the carbonyl group bonded thereto, unless specified otherwise.

The organic group which the (α-substituted) acrylate ester thereof has is not particularly limited, and the same groups as those described later as an organic group for $X^c$ and $X^d$ can be mentioned.

As the structural unit (a1), structural units represented by general formulas (a1-1) to (a1-4) shown below are particularly preferable.

[Chemical Formula 1]

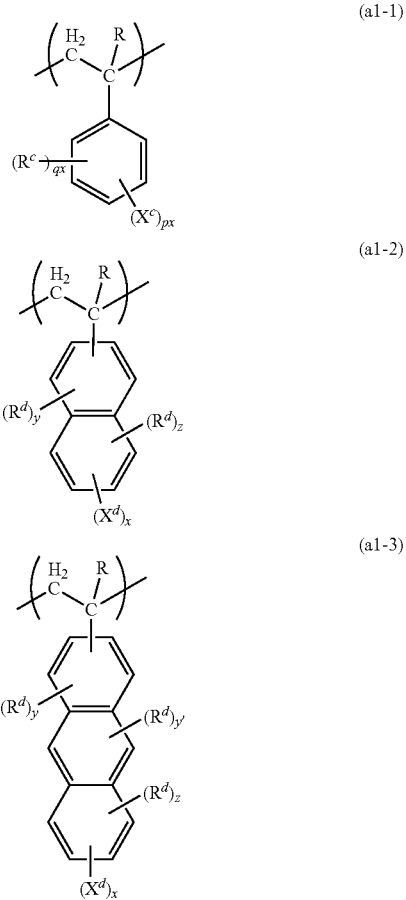

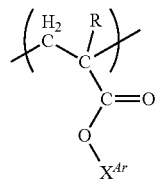

In the formulae, R represents a hydrogen atom, an alkyl group of 1 to 5 carbon atoms or a halogenated alkyl group of 1 to 5 carbon atoms; $X^c$ and $X^d$ each independently represents a hydrogen atom, a hydroxy group, a cyano group or an organic group; $R^c$ and $R^d$ each independently represents a halogen atom, $-COOX^e$ ($X^e$ represents a hydrogen atom or an organic group), an alkyl group of 1 to 5 carbon atoms or a halogenated alkyl group of 1 to 5 carbon atoms; px represents an integer of 0 to 3, qx represents an integer of 0 to 5, and px+qx=1 to 5, provided that, when qx is an integer of 2 or more, the plurality of $R^c$ groups may be the same or different from each other; x represents an integer of 0 to 3, y represents an integer of 0 to 3, y' represents an integer of 0 to 2, z represents an integer of 0 to 4, and in the formula (a1-2), x+y+z=1 to 7, and in the formula (a1-3), x+y+y'+z=1 to 7, provided that, when y+z or y+y'+z is an integer of 2 or more, the plurality of $R^d$ groups may be the same or different from each other; and $X^{Ar}$ represents a monovalent organic group containing an aromatic ring.

In general formulas, the alkyl group and the halogenated alkyl group for R are respectively the same as defined for the alkyl group and the halogenated alkyl group for the substituent which may be bonded to the carbon atom on the α-position of the aforementioned α-substituted styrene. R is preferably a hydrogen atom, an alkyl group of 1 to 5 carbon atoms or a fluorinated alkyl group of 1 to 5 carbon atoms, and most preferably a hydrogen atom or a methyl group.

The organic group for $X^c$ and $X^d$ is not particularly limited, as long as they contains a carbon atom. The organic group may include atoms other than carbon atoms (e.g., a hydrogen atom, an oxygen atom, a nitrogen atom, a sulfur atom, a halogen atom (such as a fluorine atom and a chlorine atom), silicon atom and the like).

As the organic group for $X^c$ and $X^d$, a hydrocarbon group which may have a substituent is preferable, and an alkyl group which may have a substituent is more preferable.

Examples of the alkyl group which may have substituent include an unsubstitued alkyl group, and a substituted alkyl group in which part or all of the hydrogen atoms within an unsubstituted alkyl group has been substituted with a substituent.

The unsubstituted alkyl group may be any of linear, branched or cyclic. In terms of superiority in resolution, an alkyl group of 1 to 10 carbon atoms is preferable, and an alkyl group of 1 to 5 carbon atoms is more preferable. Specific examples include a methyl group, an ethyl group, an n-propyl group, an isopropyl group, an n-butyl group, an isobutyl group, an n-pentyl group, a cyclopentyl group, a hexyl group, a cyclohexyl group, a nonyl group and a decyl group.

Examples of the substituent of the substituented alkyl group include an alkoxy group, a halogen atom, a halogenated alkyl group, a hydroxyl group, an oxo group (=O) and a cyano group.

The alkoxy group as the substituent is preferably an alkoxy group having 1 to 5 carbon atoms, more preferably a methoxy group, an ethoxy group, an n-propoxy group, an iso-propoxy group, an n-butoxy group or a tert-butoxy group, and most preferably a methoxy group or an ethoxy group.

Examples of the halogen atom for the substituent include a fluorine atom, a chlorine atom, a bromine atom and an iodine atom, and a fluorine atom is preferable.

Examples of the halogenated alkyl group for the substituent include groups in which part or all of the hydrogen atoms within the aforementioned alkyl groups has been substituted with the aforementioned halogen atoms.

Further, part of the carbon atoms constituting the unsubsituted or substituted alkyl group may be substituted with a substituent containing a hetero atom. The substituent containing a hetero atom is preferably —O—, —C(=O)—O—, —S—, —S(=O)$_2$—, —S(=O)$_2$—O— or —Si—.

In the formula, the halogen atom for $R^c$ and $R^d$ is preferably a fluorine atom, a chlorine atom, a bromine atom and an iodine atom, and a fluorine atom is preferable.

With respect to —COOX$^e$ in $R^c$ and $R^d$, $X^e$ represents a hydrgen atom or an organic group, and the organic group is the same as the organic group described above for $X^c$ and $X^d$.

The alkyl group of 1 to 5 carbon atoms or halogenated alkyl group of 1 to 5 carbon atoms for $R^c$ and $R^d$ are the same as the alkyl group of 1 to 5 carbon atoms or halogenated alkyl group of 1 to 5 carbon atoms for R.

$X^{Ar}$ represents a monovalent organic group containing an aromatic ring, and examples thereof include a group in which one or more hydrogen atom has been removed from the aforementioned aromatic ring, and a group in which one hydrogen atom has been removed from benzene, naphthalene or anthracene is preferable.

As the structural unit (a1) contained in the component (A), 1 type of structural unit may be used, or 2 or more types may be used.

In the component (A), the amount of the structural unit (a1) based on the combined total of all structural units constituting the component (A) is preferably 10 to 95 mol %, more preferably 20 to 90 mol %, still more preferably 30 to 90 mol %, and most preferably 50 to 85 mol %.

When the amount of the structural unit (a1) is at least as large as the lower limit of the above-mentioned range, the layer containing the block copolymer and constituting an upper layer is satisfactorily subjected to phase separation. On the other hand, when the amount of the structural unit (a1) is no more than the upper limit of the above-mentioned range, a good balance can be reliably achieved with the structural unit (a2).

[Structural Unit (a2)]

The structural unit (a2) is a structural unit having no aromatic ring. When the component (A) contains both the structural unit (a1) and the structural unit (a2), the component (A) exhibits affinity for any of the structural units constituting the block copolymer.

There is no particularly limitation on the structural unit (a2), as long as the structural unit (a2) does not have the aromatic ring described above in relation to the structural unit (a1) in the structure thereof. Examples thereof includes:

A structural unit derived from an acrylic acid or ester thereof which may have the hydrogen atom bonded to the carbon atom on the α-position substituted with a substituent and has no aromatic ring;

A structural unit derived from an acrylamide or derivatives thereof which may have the hydrogen atom bonded to the carbon atom on the α-position substituted with a substituent and has no aromatic ring;

A structural unit which is derived from a cycloolefine or derivatives thereof and has no aromatic ring; and A structural unit which is derived from a vinylsulfonate ester or derivatives thereof and has no aromatic ring.

Among these, a structural unit derived from an acrylic acid or an ester thereof which may have the hydrogen atom bonded to the carbon atom on the α-position substituted with a substituent, or a structural unit derived from an acrylamide or a derivative thereof in which the hydrogen atom bonded to the carbon atom on the α-position may be substituted with a substituent is preferable.

Examples of "acrylamide and derivatives thereof" include acrylamide in which the hydrogen atom bonded to the carbon atom on the α-position may be substituted with a substituent (hereafter, sometimes referred to as (α-substituted) acrylamide), and a compound in which either or both terminal hydrogen atoms on the amino group of (α-substituted) acrylamide is substituted with a substituent.

As the substituent to be bonded to the carbon atom on the α-position of acrylamide and derivatives thereof, the same substituents as those described above for the substituent to be bonded to the carbon atom on the α-position of an α-substituted styrene can be mentioned.

As the substituent which substitutes either or both terminal hydrogen atoms on the amino group of (α-substituted) acrylamide, an organic group is preferable. The organic group is not particularly limited, and examples thereof include the same organic groups as those described above for (α-substituted) acrylate ester.

Examples of the compound in which either or both terminal hydrogen atoms on the amino group of (α-substituted) acrylamide is substituted with a substituent include a compound in which —C(=O)—O— bonded to the carbon atom on the α-position of the aforementioned (α-substituted) acrylate ester is replaced by —C(=O)—N($R^b$)— (in the formula, $R^b$ represents a hydrogen atom or an alkyl group of 1 to 5 carbon atoms).

In the formula, the alkyl group for $R^b$ is preferably linear or branched.

As the structural unit (a2), structural units represented by general formulas (a2-1) and (a2-2) shown below are particularly preferable.

[Chemical Formula 2]

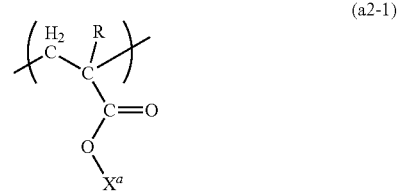

(a2-1)

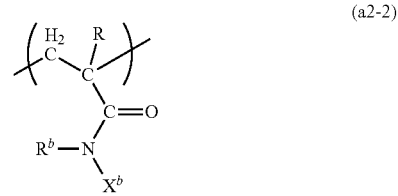

(a2-2)

In the formulas, R is the same as defined above; $X^a$ and $X^b$ each independently represents a hydrogen atom or an organic group which does not contain an aromatic ring; and $R^b$ represents a hydrogen atom or an alkyl group of 1 to 5 carbon atoms.

In the formulas, $X^a$ and $X^b$ each independently represents a hydrogen atom or an organic group. The organic group is not particularly limited, as long as they contains a carbon atom and does not contain an aromatic ring. The organic group may include atoms other than carbon atoms (e.g., a hydrogen atom, an oxygen atom, a nitrogen atom, a sulfur atom, a halogen atom (such as a fluorine atom and a chlorine atom), silicon atom and the like). The organic group for $X^a$ and $X^b$ is the same organic group as described above for $X^c$ and $X^d$.

In the formulas, examples of the alkyl group of 1 to 5 carbon atoms represented by $R^b$ include the same alkyl group of 1 to 5 carbon atoms as those described above for R.

As the structural unit (a2) contained in the component (A), 1 type of structural unit may be used, or 2 or more types may be used.

In the component (A), the amount of the structural unit (a2) based on the combined total of all structural units constituting the component (A) is preferably 5 to 90 mol %, more preferably 10 to 80 mol %, still more preferably 10 to 70 mol %, and most preferably 15 to 50 mol %.

When the amount of the structural unit (a2) is at least as large as the lower limit of the above-mentioned range, the layer containing the block copolymer constituting an upper layer is satisfactorily subjected to phase separation. On the other hand, when the amount of the structural unit (a2) is no more than the upper limit of the above-mentioned range, a good balance can be reliably achieved with the structural unit (a1).

{Ether-containing Cyclic Group}

The component (A) of the present invention does not include a 3 to 7-membered, ether-containing cyclic group. By virtue of the undercoat agent of the present invention not containing ether-containing cyclic group, polymerization reaction caused by the cleavage of the ether-containing cyclic group during heating-drying process after applying the undercoat agent on a substrate does not occur. Therefore, for example, by applying the undercoat agent on a substrate, followed by drying and washing (rinse) with an appropriate solvent, the thickness of the layer composed of the undercoat agent can be reduced.

Here, the "ether-containing cyclic group" refers to a cyclic group including a structure in which a carbon atom within the cyclic hydrocarbon group has been replaced with an oxygen atom (cyclic ether). Provided that, the cyclic group which includes a cyclic ether structure and falls under the definition of "lactone-containing cyclic group" described later is not regarded as the "ether-containing cyclic group".

The component (A) of the present invention includes the structural units (a1) and (a2), and therefore, these structural units do not include a 3 to 7-membered, ether-containing cyclic group. For example, when the structural units (a1) and (a2) are structural units represented by the formula (a1-1) to (a1-4), and (a2-1) to (a2-2), the organic groups for $X^a$ to $X^d$, $R^b$ to $R^d$, and $X^{Ar}$ do not include an ether-containing cyclic group.

{Substrate Interaction Group}

The component (A) of the present invention includes a substrate interaction group. By including the substrate interaction group within the component (A), the undercoat agent containing the component (A) interacts with the substrate, thereby forming a strong film (a layer composed of the undercoat agent) on the substrate, and as a result, the layer containing the block copolymer can undergo favorable phase separation on top of the layer composed of the undercoat agent. By including the substrate interaction group within the component (A), an undercoat agent containing a component (A) interacts with the surface of the substrate, and then a monomolecular film is formed by self-assembly. As a result, a layer composed of an undercoat agent becomes a very thin film, and does not become an impediments in a later step.

In the present invention, the "group that can interact with the substrate", that is, the "substrate interaction group" describes a group that can interact chemically or physically with the substrate, and this group can be selected appropriately in accordance with the type of substrate being used. Examples of the types of interaction between the substrate and the substrate interaction group include covalent bonding interactions, ionic bonding interactions, hydrogen bonding interactions, electrostatic interactions, hydrophobic interactions, and van der Waals force interactions.

Specific examples of such substrate interaction groups include a carboxy group, a cyano group, an amino group, a trialkoxysilyl group, a dialkoxysilyl group, and a monoalkoxysilyl group and the like. Among these, a carboxy group, a cyano group, an amino group or a trialkoxysilyl group is preferable. As the alkoxy group in the trialkoxysilyl group, a methoxy group or an ethoxy group is preferable, and a methoxy group is particularly preferable.

In the present invention, a substrate interaction group is preferably a lactone-containing cyclic group.

The term "lactone-containing cyclic group" refers to a cyclic group including a ring containing a —O—C(=O)— structure (lactone ring). The term "lactone ring" refers to a single ring containing a —O—C(=O)— structure, and this ring is counted as the first ring. A lactone-containing cyclic group in which the only ring structure is the lactone ring is referred to as a monocyclic group, and groups containing other ring structures are described as polycyclic groups regardless of the structure of the other rings. The lactone-containing cyclic group may be either a monocyclic group or a polycyclic group.

The lactone-containing cyclic group for $R^1$ is not particularly limited, and an arbitrary structural unit may be used. Specific examples include structural units represented by general formulas (1c-r-1) to (1c-r-7) shown below. Hereafter, "*" represents a valence bond.

[Chemical Formula 3]

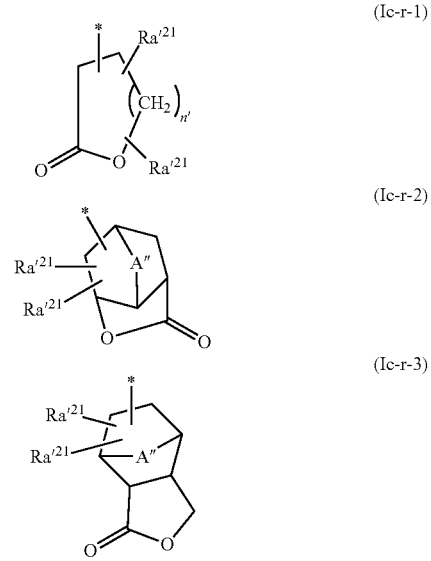

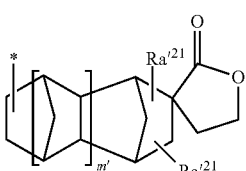
(Ic-r-4)

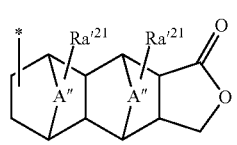
(Ic-r-5)

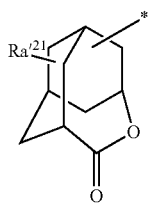
(Ic-r-6)

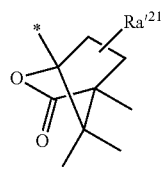
(Ic-r-7)

In the formulas, each Ra'$^{21}$ independently represents a hydrogen atom, an alkyl group, an alkoxy group, a halogen atom, a halogenated alkyl group, a hydroxy group, —COOR", —OC(=O)R", a hydroxyalkyl group or a cyano group; R" represents a hydrogen atom or an alkyl group; A" represents an oxygen atom, a sulfur atom or an alkylene group of 1 to 5 carbon atoms which may contain an oxygen atom or a sulfur atom; n' represents an integer of 0 to 2; and m' represents 0 or 1.

In general formulas (1c-r-1) to (1c-r-7), A" represents an oxygen atom, a sulfur atom or an alkylene group of 1 to 5 carbon atoms which may contain an oxygen atom (—O—) or a sulfur atom (—S—). As the alkylene group of 1 to 5 carbon atoms for A", a linear or branched alkylene group is preferable, and examples thereof include a methylene group, an ethylene group, an n-propylene group and an isopropylene group. Examples of alkylene groups that contain an oxygen atom or a sulfur atom include the aforementioned alkylene groups in which —O— or —S— is bonded to the terminal of the alkylene group or interposed within the alkyl group. Specific examples of such alkylene groups include —O—CH$_2$—, —CH$_2$—O—CH$_2$—, —S—CH$_2$— and —CH$_2$—S—CH$_2$—. As A", an alkylene group of 1 to 5 carbon atoms or —O— is preferable, more preferably an alkylene group of 1 to 5 carbon atoms, and most preferably a methylene group. Each Ra'$^{21}$ independently represents an alkyl group, an alkoxy group, a halogen atom, a halogenated alkyl group, —COOR", —OC(=O)R", a hydroxyalkyl group or a cyano group.

The alkyl group for Ra'$^{21}$ is preferably an alkyl group of 1 to 5 carbon atoms.

The alkoxy group for Ra'$^{21}$ is preferably an alkoxy group of 1 to 6 carbon atoms.

Further, the alkoxy group is preferably a linear or branched alkoxy group. Specific examples of the alkoxy groups include the aforementioned alkyl groups for Ra'$^{21}$ having an oxygen atom (—O—) bonded thereto.

As examples of the halogen atom for Ra'$^{21}$, a fluorine atom, chlorine atom, bromine atom and iodine atom can be given. Among these, a fluorine atom is preferable.

Examples of the halogenated alkyl group for Ra'$^{21}$ include groups in which part or all of the hydrogen atoms within the aforementioned alkyl groups for Ra'$^{21}$ has been substituted with the aforementioned halogen atoms. As the halogenated alkyl group, a fluorinated alkyl group is preferable, and a perfluoroalkyl group is particularly desirable.

With respect to —COOR" and —OC(=O)R" for Ra'$^{21}$, R" represents a hydrogen atom or an alkyl group.

In the present invention, among these, the group represented by general formula (1c-r-1) or (1c-r-2) is preferable.

Specific examples of the group represented by the aforementioned general formulas (1c-r-1) to (1c-r-7) are shown below.

[Chemical Formula 4]

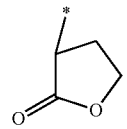
(r-Ic-1-1)

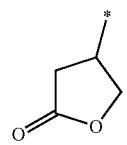
(r-Ic-1-2)

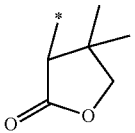
(r-Ic-1-3)

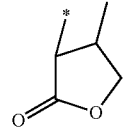
(r-Ic-1-4)

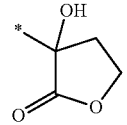
(r-Ic-1-5)

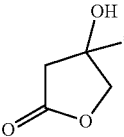
(r-Ic-1-6)

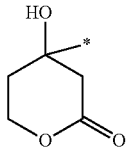
(r-Ic-1-7)

-continued
(r-Ic-2-1)
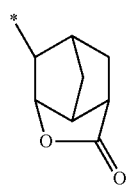
(r-Ic-2-2)
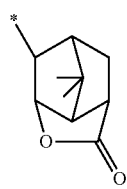
(r-Ic-2-3)
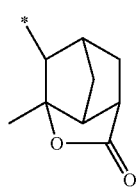
(r-Ic-2-4)
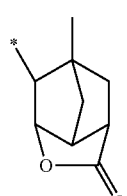
(r-Ic-2-5)
(r-Ic-2-6)
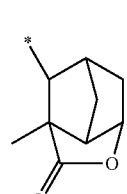
(r-Ic-2-7)
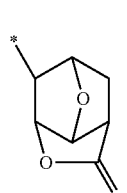
(r-Ic-2-8)
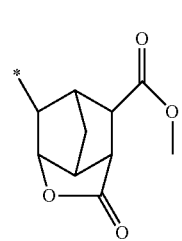
-continued
(r-Ic-2-9)
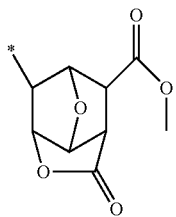
(r-Ic-2-10)
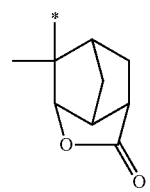
(r-Ic-2-11)
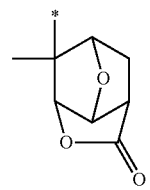
(r-Ic-2-12)
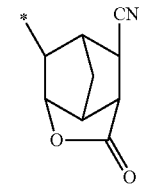
(r-Ic-2-13)
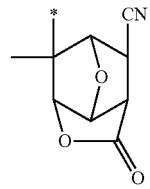
(r-Ic-3-1)
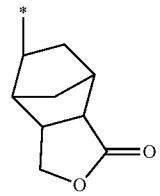
(r-Ic-3-2)
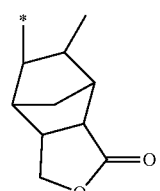
(r-Ic-3-3)
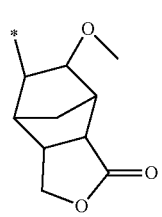

-continued
(r-Ic-3-4)
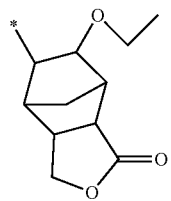
(r-Ic-3-5)
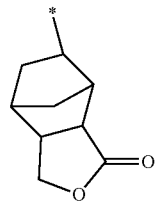
(r-Ic-4-1)
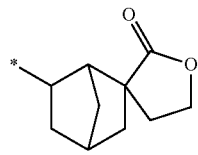
(r-Ic-4-2)
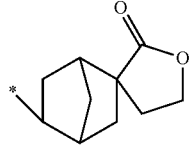
(r-Ic-4-3)
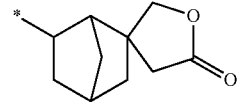
(r-Ic-4-4)
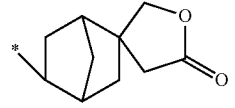
(r-Ic-4-5)
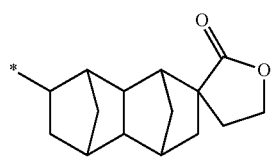
(r-Ic-4-6)
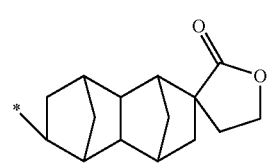
(r-Ic-4-7)
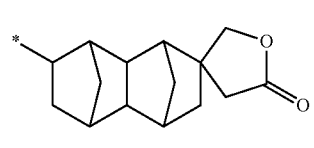
(r-Ic-4-8)
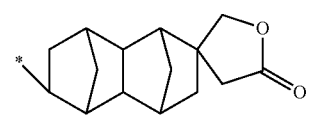
-continued
(r-Ic-4-9)
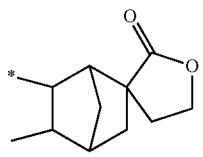
(r-Ic-5-1)
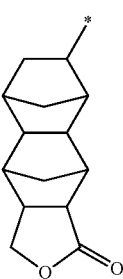
(r-Ic-5-2)
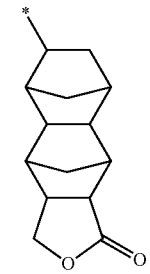
(r-Ic-5-3)
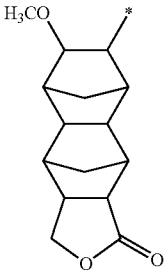
(r-Ic-5-4)
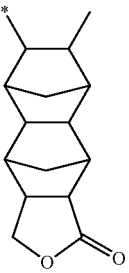
(r-Ic-6-1)
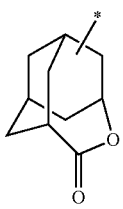

(r-Ic-7-1)

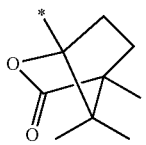

In the present invention, among the examples shown above, as the lactone-containing cyclic group, groups represented by general formulas (r-1c-1-1) to (r-1c-1-7), and (r-1c-2-1) to (r-1c-2-13) is preferable, and groups represented by general formulas (r-1c-1-1) to (r-1c-1-7) are particularly preferable.

In the present invention, as the substrate interaction group may be an organic group containing a fluorine atom. As the organic group containing a fluorine atom is preferably a hydrocarbon group containing a fluorine atom.

The hydrocarbon group containing a fluorine atom may be linear, branched or cyclic, and preferably has 1 to 20 carbon atoms, more preferably 1 to 15 carbon atoms, and most preferably 1 to 10 carbon atoms.

It is preferable that the hydrocarbon group having a fluorine atom has 25% or more of the hydrogen atoms within the hydrocarbon group fluorinated, more preferably 50% or more, and most preferably 60% or more, as the hydrophobicity of the resist film during immersion exposure is enhanced.

Among these, in the present invention, a fluorinated hydrocarbon group of 1 to 5 carbon atoms is particularly preferable, and a methyl group, —$CH_2$—$CF_3$, —$CH_2$—$CF_2$—$CF_3$, —$CH(CF_3)_2$, —$CH_2$—$CH_2$—$CF_3$, and —$CH_2$—$CH_2$—$CF_2$—$CF_2$—$CF_2$—$CF_3$ are most preferable.

As described above, the substrate interaction group may be included in the structural unit (a1) or the structural unit (a2). Among these, the substrate interaction group is preferably included in the structural unit (a2). Hereafter, the structural unit (a2) containing a substrate interaction group is referred to as a structural unit (a21).

As the structural unit (a21), those represented by formulas (a21-1) and (a21-2) shown below are preferable.

[Chemical Formula 5]

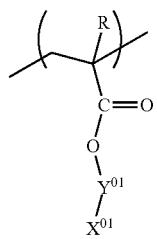

(a21-1)

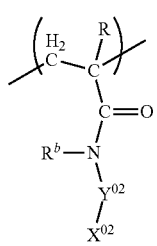

(a21-2)

In the formulas, R and $R^b$ are the same as defined above; $Y^{01}$ represents a single bond or a divalent linking group which does not contain an aromatic ring; $X^{01}$ represents a hydrogen atom, a carboxyl group, a cyano group, an amino group, a trialkoxysilyl group, a lactone-containing cyclic group or an organic group containing a fluorine atom, provided that, when $X^{01}$ is a hydrogen atom, $Y^{01}$ represents a single bond, and when $X^{01}$ is a carboxy group, a cyano group, an amino group or a trialkoxysilyl group, $Y^{01}$ represents a divalent linking group which does not have an aromatic ring; $Y^{02}$ represents a divalent linking group which does not have an aromatic ring; and $X^{02}$ represents a carboxy group, a cyano group, an amino group or a trialkoxysilyl group.

In the formulas, $Y^{01}$ may be a single bond or a divalent linking group which does not contain an aromatic ring. The divalent linking group for $Y^{01}$ is not particularly limited, as long as it does not contain an aromatic ring, and preferable examples thereof include: a divalent hydrocarbon group which does not contain an aromatic ring and may have a substituent; and a divalent linking group which does not contain an aromatic ring and contains a hetero atom.

(Divalent Hydrocarbon Group which May have a Substituent)

The hydrocarbon group as a divalent linking group which does not have an aromatic ring is preferably an aliphatic hydrocarbon group.

An "aliphatic hydrocarbon group" refers to a hydrocarbon group that has no aromaticity. The aliphatic hydrocarbon group may be saturated or unsaturated. In general, the aliphatic hydrocarbon group is preferably saturated.

As specific examples of the aliphatic hydrocarbon group, a linear or branched aliphatic hydrocarbon group, and an aliphatic hydrocarbon group containing a ring in the structure thereof can be given.

The linear or branched aliphatic hydrocarbon group preferably has 1 to 10 carbon atoms, more preferably 1 to 8, and still more preferably 1 to 5.

As the linear aliphatic hydrocarbon group, a linear alkylene group is preferable, and specific examples include a methylene group [—$CH_2$—], an ethylene group [—$(CH_2)_2$—], a trimethylene group [—$(CH_2)_3$—], a tetramethylene group [—$(CH_2)_4$—] and a pentamethylene group [—$(CH_2)_5$—].

As the branched aliphatic hydrocarbon group, a branched alkylene group is preferable, and specific examples include alkylalkylene groups, e.g., alkylmethylene groups such as —$CH(CH_3)$—, —$CH(CH_2CH_3)$—, —$C(CH_3)_2$—, —$C(CH_3)(CH_2CH_3)$—, —$C(CH_3)(CH_2CH_2CH_3)$—, and —$C(CH_2CH_3)_2$—; alkylethylene groups such as —$CH(CH_3)CH_2$—, —$CH(CH_3)CH(CH_3)$—, —$C(CH_3)_2CH_2$—, —$CH(CH_2CH_3)CH_2$—, and —$C(CH_2CH_3)_2$—$CH_2$—; alkyltrimethylene groups such as —$CH(CH_3)CH_2CH_2$—, and —$CH_2CH(CH_3)CH_2$—; and alkyltetramethylene groups such as —$CH(CH_3)CH_2CH_2CH_2$—, and —$CH_2CH(CH_3)CH_2CH_2$—. As the alkyl group within the alkylalkylene group, a linear alkyl group of 1 to 5 carbon atoms is preferable.

The linear or branched aliphatic hydrocarbon group may or may not have a substituent (a group or an atom other than a hydrogen atom) for substituting a hydrogen atom. Examples of the substituent include a fluorine atom, a fluorinated alkyl group of 1 to 5 carbon atoms, and an oxo group (=O).

As examples of the hydrocarbon group containing a ring in the structure thereof, a cyclic aliphatic hydrocarbon group which may have a substituent containing a hetero atom (a group in which two hydrogen atoms have been removed from an aliphatic hydrocarbon ring), a group in which the cyclic aliphatic hydrocarbon group is bonded to the terminal of a linear or branched aliphatic hydrocarbon group, and a group in which the cyclic aliphatic group is interposed within a linear or branched aliphatic hydrocarbon group, can be given. As the linear or branched aliphatic hydrocarbon group, the same groups as those described above can be used.

The cyclic aliphatic hydrocarbon group preferably has 3 to 20 carbon atoms, and more preferably 3 to 12 carbon atoms.

The cyclic aliphatic hydrocarbon group may be either a polycyclic group or a monocyclic group. As the monocyclic aliphatic hydrocarbon group, a group in which 2 hydrogen atoms have been removed from a monocycloalkane is preferable. The monocycloalkane preferably has 3 to 6 carbon atoms, and specific examples thereof include cyclopentane and cyclohexane. As the polycyclic aliphatic hydrocarbon group, a group in which two hydrogen atoms have been removed from a polycycloalkane is preferable, and the polycyclic group preferably has 7 to 12 carbon atoms. Examples of the polycycloalkane include adamantane, norbornane, isobornane, tricyclodecane and tetracyclododecane.

The cyclic aliphatic hydrocarbon group may or may not have a substituent (a group or an atom other than a hydrogen atom) for substituting a hydrogen atom. Examples of substituents include an alkyl group, an alkoxy group, a halogen atom, a halogenated alkyl group, a hydroxyl group and an oxo group (=O).

The alkyl group as the substituent is preferably an alkyl group of 1 to 5 carbon atoms, and a methyl group, an ethyl group, a propyl group, an n-butyl group or a tert-butyl group is most desirable.

The alkoxy group as the substituent is preferably an alkoxy group having 1 to 5 carbon atoms, more preferably a methoxy group, an ethoxy group, an n-propoxy group, an iso-propoxy group, an n-butoxy group or a tert-butoxy group, and most preferably a methoxy group or an ethoxy group.

Examples of the halogen atom for the substituent include a fluorine atom, a chlorine atom, a bromine atom and an iodine atom, and a fluorine atom is preferable.

Examples of the halogenated alkyl group for the substituent include groups in which part or all of the hydrogen atoms within the aforementioned alkyl groups has been substituted with the aforementioned halogen atoms.

In the cyclic aliphatic hydrocarbon group, part of the carbon atoms constituting the ring structure thereof may be substituted with a substituent containing a hetero atom. The substituent containing a hetero atom is preferably —O—, —C(=O)—O—, —S—, —S(=O)$_2$—, or —S(=O)$_2$—O—.

(Divalent Linking Group Containing a Hetero Atom)

With respect to a "divalent linking group containing a hetero atom" for $Y^0$, a hetero atom is an atom other than carbon and hydrogen, and examples thereof include an oxygen atom, a nitrogen atom, a sulfur atom and a halogen atom.

Examples of the divalent linking group containing a hetero atom include —O—, —C(=O)—O—, —C(=O)—, —O—C(=O)—O—, —C(=O)—NH—, —NH— (H may be substituted with a substituent such as an alkyl group or an acyl group), —S—, —S(=O)$_2$—, —S(=O)$_2$—O—, —NH—C(=O)—, =N—, and a group represented by general formula —Y$^{21}$—O—Y$^{22}$—, —[Y$^{21}$—C(=O)—O]$_{m'}$—Y$^{22}$—, —C(=O)—O—Y$^{22}$— or —Y$^{21}$—O—C(=O)—Y$^{22}$— [in the formulae, each of Y$^{21}$ and Y$^{22}$ independently represents a divalent hydrocarbon group which may have a substituent; O represents an oxygen atom; and m' represents an integer of 0 to 3].

When $Y^0$ represents —NH—, H may be substituted with a substituent such as an alkyl group, an acyl group or the like. The substituent (an alkyl group, an aryl group or the like) preferably has 1 to 10 carbon atoms, more preferably 1 to 8, and most preferably 1 to 5.

Each of $Y^{21}$ and $Y^{22}$ independently represents a divalent hydrocarbon group which may have a substituent. As the divalent hydrocarbon group, the same groups as those described above for the "divalent hydrocarbon group which may have a substituent" for $Y^0$ can be mentioned.

As $Y^{21}$, a linear aliphatic hydrocarbon group is preferable, more preferably a linear alkylene group, still more preferably a linear alkylene group of 1 to 5 carbon atoms, and a methylene group or an ethylene group is particularly desirable.

As $Y^{22}$, a linear or branched aliphatic hydrocarbon group is preferable, and a methylene group, an ethylene group or an alkylmethylene group is more preferable. The alkyl group within the alkylmethylene group is preferably a linear alkyl group of 1 to 5 carbon atoms, more preferably a linear alkyl group of 1 to 3 carbon atoms, and most preferably a methyl group.

In the group represented by the formula —[Y$^{21}$—C(=O)—O]$_{m'}$—Y$^{22}$—, m' represents an integer of 0 to 3, preferably an integer of 0 to 2, more preferably 0 or 1, and particularly preferably 1. Namely, it is particularly desirable that the group represented by the formula —[Y$^{21}$—C(=O)—O]$_{m'}$—Y$^{22}$— is a group represented by the formula —Y$^{21}$—C(=O)—O—Y$^{22}$—. Among these, a group represented by the formula —(CH$_2$)$_{a'}$—C(=O)—O—(CH$_2$)$_{b'}$— is preferable. In the formula, a' is an integer of 1 to 10, preferably an integer of 1 to 8, more preferably an integer of 1 to 5, still more preferably 1 or 2, and most preferably 1. b' is an integer of 1 to 10, preferably an integer of 1 to 8, more preferably an integer of 1 to 5, still more preferably 1 or 2, and most preferably 1.

As the divalent linking group containing a hetero atom, a linear group containing an oxygen atom as the hetero atom e.g., a group containing an ether bond or an ester bond is preferable, and a group represented by the aforementioned formula —Y$^{21}$—O—Y$^{22}$—, —[Y$^{21}$—C(=O)—O]$_{m'}$—Y$^{22}$— or —Y$^{21}$—O—C(=O)—Y$^{22}$— is more preferable.

Among the aforementioned examples, as the divalent linking group for $Y^{01}$, a linear or branched alkylene group, a divalent alicyclic hydrocarbon group or a divalent linking group containing a hetero atom is particularly desirable. Among these, a linear or branched alkylene group or a divalent linking group containing an ester bond (—C(=O)—O—) is more preferable.

In the formulas, $X^{01}$ represents a hydrogen atom, a carboxy group, a cyano group, an amino group or a trialkoxysilyl group, and an alkoxy group in the trialkoxysilyl group is the same as described above, and as the trialkoxysilyl group, a trimethoxysilyl group is preferable.

In the formulas, $Y^{02}$ represents a divalent linking group which does not contain an aromatic ring, and is the same as the divalent linking group which does not have an aromatic ring described above for $Y^{01}$.

The trialkoxysilyl group for $X^{02}$ is the same as the trialkoxysiliy group for $X^{01}$.

Specific examples of the structural unit (a21) are shown below. In the formulas, R is the same as defined above.

[Chemical Formula 6]
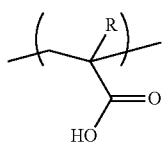
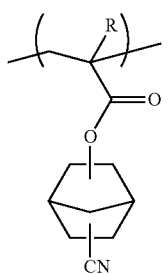
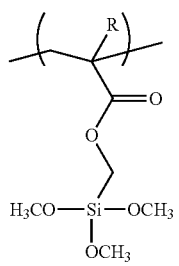
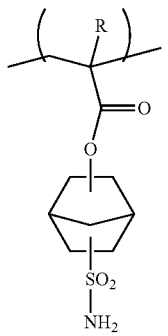
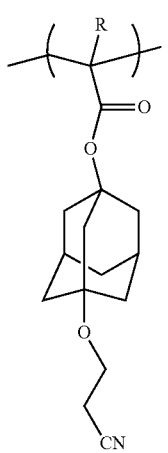
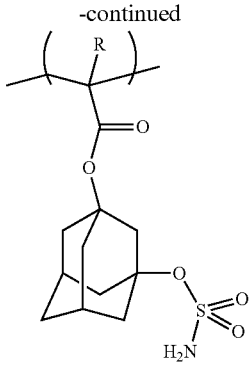
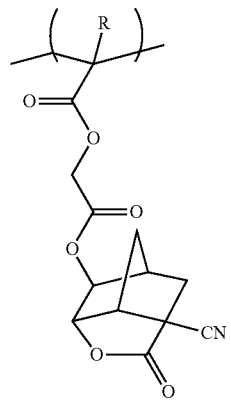
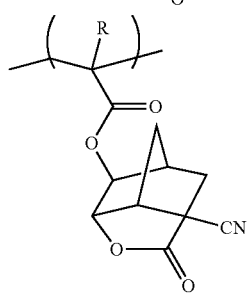
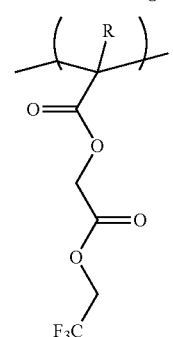
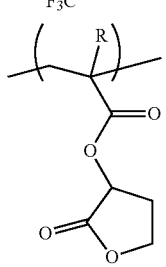
As the structural unit (a21), one type of structural unit may be used, or two or more types may be used in combination.

In the structural unit (a2), the amount of the structural unit (a21) is preferably 5 to 100 mol %, and more preferably 10 to 100 mol %. Namely, the structural unit (a2) may consist of the structural unit (a21).

The weight average molecular weight (Mw) (the polystyrene equivalent value determined by gel permeation chromatography) of the component (A) is not particularly limited, but is preferably 1,000 to 200,000, more preferably 1,500 to 200,000, and most preferably 2,000 to 150,000. When the weight average molecular weight is no more than the upper limit of the above-mentioned range, the undercoat agent containing the component (A) exhibits a satisfactory solubility in an organic solvent described later, thereby achieving an excellent applicability on the substrate. On the other hand, when the weight average molecular weight is at least as large as the lower limit of the above-mentioned range, the composition exhibits an excellent production stability and an excellent applicability on the substrate.

Further, the dispersity (Mw/Mn) is not particularly limited, but is preferably 1.0 to 5.0, more preferably 1.0 to 3.0, and most preferably 1.0 to 2.5. Here, Mn is the number average molecular weight.

The component (A) can be obtained, for example, by a conventional radical polymerization or the like of the monomers corresponding with each of the structural units, using a radical polymerization initiator such as azobisisobutyronitrile (AIBN).

Furthermore, in the component (A), by using a chain transfer agent such as HS—$CH_2$—$CH_2$—$CH_2$—$C(CF_3)_2$—OH, a —$C(CF_3)_2$—OH group can be introduced at the terminals of the component (A).

As the monomers for deriving the corresponding structural units, commercially available monomers may be used, or the monomers may be synthesized by a conventional method.

In the undercoat agent of the present invention, as the component (A), one type may be used, or two or more types may be used in combination.

In the undercoat agent of the present invention, the amount of the component (A) can be appropriately adjusted depending on the desired thickness of the layer composed of the undercoat agent, and the like.

<Optional Components>

[Acidic Compound Component; Component (G)]

The undercoat agent of the present invention may further include an acidic compound component (G) (hereafter, frequently referred to as "component (G)"), in addition to the component (A). When the undercoat agent contains the component (G), an interaction is likely to occur between a substrate interaction group within the component (A) and a substrate, thereby improving the adhesion of the layer composed of the undercoat agent to the substrate. By virtue of the interaction being likely to occur, after applying the undercoat agent on the substrate, it becomes possible to conduct heating for the purpose of promoting interaction at a low temperature, or the heating time can be shortened, thereby enabling simplification of work processes and shortening of work process time.

In the present invention, an acidic compound refers to a compound which exhibits acidity itself, i.e., a compound that acts as a proton donor.

In the present invention, as the component (G), an acidic salt having an acid strength sufficient for exerting the aforementioned effects (hereafter, referred to as "component (G1)") or an acid other than acidic salts (acids which do not form a salt, acids which are not ionic; hereafter, referred to as "component (G2)") can be used.

[Component (G1)]

Examples of the component (G1) include an ionic compound (salt compound) having a nitrogen-containing cation and a counteranion. The component (G1) itself exhibits acidity even in the form of a salt, and acts as a proton donor.

Hereafter, the cation moiety and the anion moiety of the component (G1) will be described.

(Cation Moiety of Component (G1))

The cation moiety of the component (G1) is not particularly limited as long as it contains a nitrogen atom. As a preferable example, a cation represented by general formula (G1c-1) shown below can be mentioned.

[Chemical Formula 7]

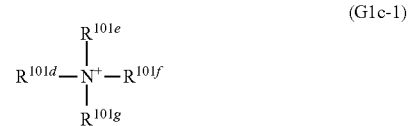

In the formula, $R^{101d}$, $R^{101e}$, $R^{101f}$ and $R^{101g}$ each independently represents a hydrogen atom, a linear, branched or cyclic alkyl group, an alkenyl group, an oxoalkyl group or an oxoalkenyl group of 1 to 12 carbon atoms, an aryl group or an arylalkyl group of 6 to 20 carbon atoms, an aralkyl group of 7 to 12 carbon atoms or an aryloxoalkyl group, and part or all of the hydrogen atoms of these groups may be substituted with a halogen atom, an alkoxy group or a sulfur atom. $R^{101d}$ and $R^{101e}$, or $R^{101d}$, $R^{101e}$ and $R^{101f}$ may be mutually bonded with the nitrogen atom to form a ring, provided that, when a ring is formed, each of $R^{101d}$ and $R^{101e}$, or each of $R^{101d}$, $R^{101e}$ and $R^{101f}$ independently represents an alkylene group of 3 to 10 carbon atoms, or forms a hetero aromatic ring containing the nitrogen atom in the ring thereof.

In formula (G1c-1), $R^{101d}$, $R^{101f}$, $R^{101e}$ and $R^{101g}$ independently represents a hydrogen atom, a linear, branched or cyclic alkyl group, an alkenyl group, an oxoalkyl group or an oxoalkenyl group of 1 to 12 carbon atoms, an aryl group or an arylalkyl group of 6 to 20 carbon atoms, an aralkyl group of 7 to 12 carbon atoms or an aryloxoalkyl group.

The alkyl group for $R^{101d}$ to $R^{101g}$ preferably has 1 to 10 carbon atoms, and a methyl group, an ethyl group, a propyl group or a butyl group is particularly desirable.

The alkenyl group for $R^{101d}$ to $R^{101g}$ preferably has 2 to 10 carbon atoms, more preferably 2 to 5, and still more preferably 2 to 4. Specific examples thereof include a vinyl group, a propenyl group (an allyl group), a butynyl group, a 1-methylpropenyl group and a 2-methylpropenyl group.

The oxoalkyl group for $R^{101d}$ to $R^{101g}$ preferably has 2 to 10 carbon atoms, and examples thereof include a 2-oxoethyl group, a 2-oxopropyl group, a 2-oxocyclopentyl group and a 2-oxocyclohexyl group.

Examples of the oxoalkenyl group for $R^{101d}$ to $R^{101g}$ include an oxo-4-cyclohexenyl group and a 2-oxo-4-propenyl group.

The aryl group for $R^{101d}$ to $R^{101g}$ preferably has 5 to 30 carbon atoms, more preferably 5 to 20, still more preferably 6 to 15, and most preferably 6 to 12. Here, the number of carbon atoms within a substituent(s) is not included in the number of carbon atoms of the aryl group. Specifically a phenyl group or a naphthyl group is preferable. Examples of the arylalkyl group include aryl groups in which one or more hydrogen atoms have been substituted with an alkyl group (preferably an alkyl group of 1 to 5 carbon atoms).

Examples of the aralkyl group and aryloxyalkyl group for $R^{101d}$ to $R^{101g}$ include a benzyl group, a phenylethyl group, a phenethyl group, a 2-phenyl-2-oxoethyl group, a 2-(1-naphthyl)-2-oxoethyl group and a 2-(2-naphthyl)-2-oxoethyl group.

The hydrogen atoms within the alkyl group, the alkenyl group, the oxoalkyl group, the oxoalkenyl group, the aryl group, the arylalkyl group, the aralkyl group and the aryloxyalkyl group for $R^{101d}$ to $R^{101g}$ may or may not be substituted with a halogen atom such as a fluorine atom, an alkoxy group or a sulfur atom.

When $R^{101d}$ to $R^{101g}$ are constituted of only a combination of alkyl groups and hydrogen atoms, in terms of storage stability and lithography properties, it is preferable that part of the hydrogen atoms of the alkyl group is substituted with a halogen atom such as a fluorine atom, an alkoxy group or a sulfur atom.

Further, $R^{101d}$ and $R^{101e}$, or $R^{101d}$, $R^{101e}$ and $R^{101f}$ may be mutually bonded to form a ring with the nitrogen atom. Examples of the formed ring include a piperidine ring, a hexamethylene imine ring, an azole ring, a pyridine ring, a pyrimidine ring, an azepine ring, a pyrazine ring, a quinoline ring and a benzoquinoline ring.

Further, the ring may contain an oxygen atom in the ring skeleton thereof, and specific examples of preferable rings which contain an oxygen atom include an oxazole ring and an isooxazole ring.

Among these examples, as the cation moiety represented by the aforementioned formula (G1c-1), a nitrogen-containing cation having a pKa of 7 or less is preferable.

In the present invention, pKa refers to an acid dissociation constant which is generally used as a parameter which shows the acid strength of an objective substance. The pKa value of the cation of the component (G1) can be determined by a conventional method. Alternatively, the pKa value can be estimated by calculation using a conventional software such as "ACD/Labs" (trade name; manufactured by Advanced Chemistry Development, Inc.).

The pKa of the component (G1) is preferably 7 or less, and the pKa value can be appropriately selected depending on the type and pKa of the counteranion, so that is becomes a weak base relative to the counteranion. Specifically, the pKa of the cation is preferably from −2 to 7, more preferably from −1 to 6.5, and still more preferably 0 to 6. When the pKa is no more than the upper limit of the above-mentioned range, the basicity of the cation can be rendered satisfactorily weak, and the component (G1) itself becomes an acidic compound. Further, when the pKa is at least as large as the lower limit of the above-mentioned range, a salt can be more reliably formed with the counteranion, and it becomes possible to appropriately control the acidity of the component (G1).

As a cation which satisfies the above pKa, a cation represented by any one of the following general formulae (G1c-11) to (G1c-13) is particularly desirable.

[Chemical Formula 8]

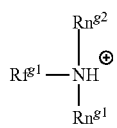

(G1c-11)

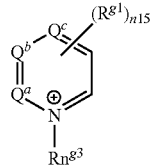

(G1c-12)

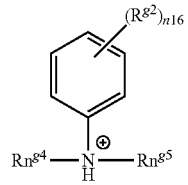

(G1c-13)

In the formulae, $Rf^{g1}$ represents a fluorinated alkyl group of 1 to 12 carbon atoms; $Rn^{g1}$ and $Rn^{g2}$ each independently represents a hydrogen atom or an alkyl group of 1 to 5 carbon atoms, provided that $Rn^{g1}$ and $R^{g2}$ may be mutually bonded to form a ring; $Q^a$ to $Q^c$ each independently represents a carbon atom or a nitrogen atom; $Rn^{g3}$ represents a hydrogen atom or a methyl group; $Rn^{g4}$ and $Rn^{g5}$ each independently represents an aromatic hydrocarbon group or an alkyl group of 1 to 5 carbon atoms; $R^{g1}$ and $R^{g2}$ each independently represents a hydrocarbon group; n15 and n16 each independently represents an integer of 0 to 4, provided that, when n15 and n16 is 2 or more, the plurality of $R^{g1}$ and $R^{g2}$ which substitute the hydrogen atoms of the adjacent carbon atom may be bonded to form a ring.

In formula (G1c-11), $Rf^{g1}$ represents a fluorinated alkyl group of 1 to 12 carbon atoms, and is preferably a fluorinated alkyl group of 1 to 5 carbon atoms in which 50% or more of the hydrogen atoms of the alkyl group have been fluorinated.

In formula (G1c-11), $Rn^{g1}$ and $Rn^{g2}$ each independently represents a hydrogen atom or an alkyl group of 1 to 5 carbon atoms, and the alkyl group is the same as defined for the alkyl groups having 1 to 5 carbon atoms explained above in relation to the aforementioned formula (G1c-1). Further, in the case where both $Rn^{g1}$ and $Rn^{g2}$ represent an alkyl group, the alkyl groups for $Rn^{g1}$ and $Rn^{g2}$ may be mutually bonded to form a ring with $NH^+$ in the formula.

In formula (G1c-13), $Rn^{g4}$ and $Rn^{g5}$ each independently represents an aromatic hydrocarbon group or an alkyl group of 1 to 5 carbon atoms. The aromatic hydrocarbon group and the alkyl group are the same as defined for the aryl group and the alkyl group of 1 to 5 carbon atoms for $R^{101d}$, $R^{101e}$, $R^{101f}$ and $R^{101g}$ in the aforementioned formula (G1c-1).

In formulae (G1c-12) and (G1c-13), n15 and n16 each independently represents an integer of 0 to 4, preferably an integer of 0 to 2, and more preferably 0.

In formulae (G1c-12) and (G1c-13), $R^{g1}$ and $R^{g2}$ each independently represents a hydrocarbon group, and is preferably an alkyl group or alkenyl group of 1 to 12 carbon atoms. The alkyl group and the alkenyl group are the same as defined for those described in the explanation of formula (G1c-1).

When n15 and n16 are 2 or more, the plurality of $R^{g1}$ and $R^{g2}$ may be the same or different from each other. Further, when n15 and n16 is 2 or more, the plurality of $R^{g1}$ and $R^{g2}$ which substitute the hydrogen atoms of the adjacent carbon atom may be bonded to form a ring. Examples of the formed ring include a benzene ring and a naphthalene ring. That is, the compound represented by formula (G1c-12) or (G1c-13) may be a condensed ring compound formed by condensation of 2 or more rings.

Specific examples of compounds represented by any one of the aforementioned formulae (G1c-11) to (G1c-13) are shown below.

[Chemical Formula 9]

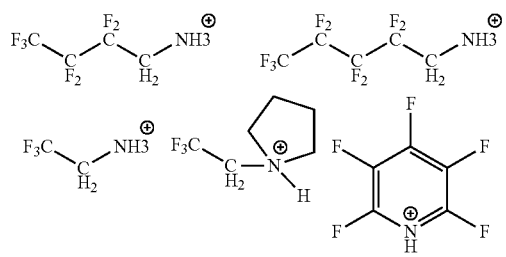

[Chemical Formula 10]

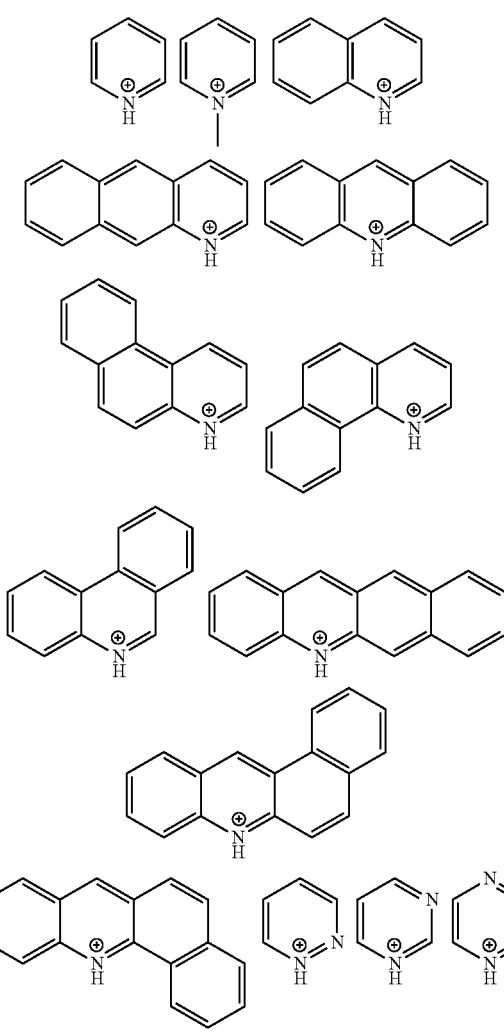

[Chemical Formula 11]

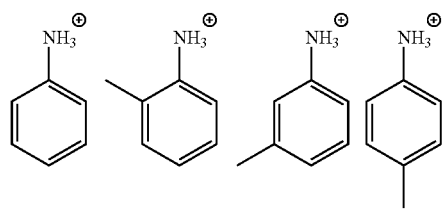

-continued

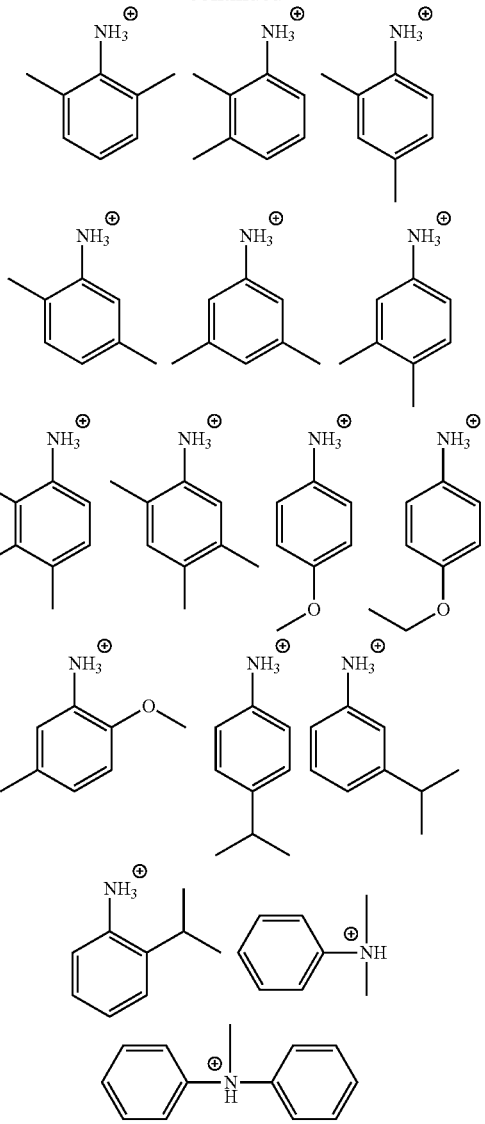

(Anion Moiety of Component (G1))

The anion moiety of the component (G1) is not particularly limited, and any of those generally used the anion moiety of a salt used in a resist composition may be appropriately selected for use.

Among these, as the anion moiety of the component (G1), those which forms a salt with the aforementioned cation moiety for the component (G1) to form a component (G1) that exerts the effects obtained by including the aforementioned component (G) is preferable.

That is, the anion moiety of the component (G1) preferably has a strong acidity. Specifically, the pKa of the anion moiety is more preferably 0 or less, still more preferably −15 to −1, and particularly preferably −13 to −3. When the pKa of the anion moiety is no more than 0, the acidity of the anion can be rendered satisfactorily strong relative to a cation having a pKa of 7 or less, and the component (G1) itself becomes an acidic compound. On the other hand, when the pKa of the anion moiety is −15 or more, deterioration of the storage stability caused by the component (G1) being excessively acidic can be prevented.

As the anion moiety of the component (G1), an anion moiety having at least one anion group selected from a sulfonate anion, a carboxylate anion, a sulfonylimide anion, a bis(alkylsulfonyl)imide anion and a tris(alkylsulfonyl) methide anion is preferable.

Specific examples include anions represented by general formula: "$R^{4"}SO_3^-$ (wherein $R^{4"}$ represents a linear, branched or cyclic alkyl group which may have a substituent, a halogenated alkyl group, an aryl group or an alkenyl group)".

In the aforementioned general formula "$R^{4"}SO_3^-$", $R^{4"}$ represents a linear, branched or cyclic alkyl group which may have a substituent, a halogenated alkyl group, an aryl group or an alkenyl group.

The linear or branched alkyl group for the aforementioned $R^{4"}$ preferably has 1 to 10 carbon atoms, more preferably 1 to 8, and most preferably 1 to 4.

The cyclic alkyl group for the aforementioned $R^{4"}$ preferably has 4 to 15 carbon atoms, more preferably 4 to 10 carbon atoms, and most preferably 6 to 10 carbon atoms.

When $R^{4"}$ represents an alkyl group, examples of "$R^{4"}SO_3^-$" include alkylsulfonates, such as methanesulfonate, n-propanesulfonate, n-butanesulfonate, n-octanesulfonate, 1-adamantanesulfonate, 2-norbornanesulfonate and d-camphor-10-sulfonate.

The halogenated alkyl group for the aforementioned $R^{4"}$ is an alkyl group in which part or all of the hydrogen atoms thereof have been substituted with a halogen atom. The alkyl group preferably has 1 to 5 carbon atoms, and is preferably a linear or branched alkyl group, and more preferably a methyl group, an ethyl group, a propyl group, an isopropyl group, an n-butyl group, a tert-butyl group, a tert-pentyl group or an isopentyl group. Examples of the halogen atom which substitutes the hydrogen atoms include a fluorine atom, a chlorine atom, an iodine atom and a bromine atom. In the halogenated alkyl group, it is preferable that 50 to 100% of all hydrogen atoms within the alkyl group (prior to halogenation) have been substituted with a halogen atom, and it is preferable that all hydrogen atoms have been substituted with a halogen atom.

As the halogenated alkyl group, a fluorinated alkyl group is preferable. The fluorinated alkyl group preferably has 1 to 10 carbon atoms, more preferably 1 to 8 carbon atoms, and most preferably 1 to 4 carbon atoms.

Further, the fluorination ratio of the fluorinated alkyl group is preferably from 10 to 100%, more preferably from 50 to 100%, and it is most preferable that all hydrogen atoms are substituted with fluorine atoms because the acid strength increases.

Specific examples of such fluorinated alkyl groups include a trifluoromethyl group, a heptafluoro-n-propyl group and a nonafluoro-n-butyl group.

The aryl group for $R^{4"}$ is preferably an aryl group of 6 to 20 carbon atoms.

The alkenyl group for $R^{4"}$ is preferably an alkenyl group of 2 to 10 carbon atoms.

With respect to $R^{4"}$, the expression "may have a substituent" means that part of or all of the hydrogen atoms within the aforementioned linear, branched or cyclic alkyl group, halogenated alkyl group, aryl group or alkenyl group may be substituted with substituents (atoms other than hydrogen atoms, or groups).

$R^{4"}$ may have one substituent, or two or more substituents.

Examples of the substituent include a halogen atom, a hetero atom, an alkyl group, and a group represented by the formula $X^3$-Q'- (in the formula, Q' represents a divalent linking group containing an oxygen atom; and $X^3$ represents a hydrocarbon group of 3 to 30 carbon atoms which may have a substituent).

Examples of halogen atoms and alkyl groups include the same halogen atoms and alkyl groups as those described above with respect to the halogenated alkyl group for $R^{4"}$.

Examples of hetero atoms include an oxygen atom, a nitrogen atom, and a sulfur atom.

In the group represented by formula $X^3$-Q'-, Q' represents a divalent linking group containing an oxygen atom.

Q' may contain an atom other than an oxygen atom. Examples of atoms other than oxygen include a carbon atom, a hydrogen atom, a sulfur atom and a nitrogen atom.

Examples of divalent linkage groups containing an oxygen atom include non-hydrocarbon, oxygen atom-containing linkage groups such as an oxygen atom (an ether bond; —O—), an ester bond (—C(=O)—O—), an amide bond (—C(=O)—NH—), a carbonyl group (—C(=O)—) and a carbonate group (—O—C(=O)—O—); and a combination of any of the aforementioned non-hydrocarbon, oxygen atom-containing linkage groups with an alkylene group. Furthermore, the combinations may have a sulfonyl group (—SO₂—) bonded thereto.

Specific examples of the combinations of the aforementioned non-hydrocarbon, hetero atom-containing linking groups and an alkylene group include —$R^{91}$—O—, —$R^{92}$—O—C(=O)—, —C(=O)—O—$R^{93}$—O—C(=O)—, —SO₂—O—$R^{94}$—O—C(=O)—, —$R^{95}$—SO₂—O—$R^{94}$—O—C(=O)— (in the formulas, each of $R^{91}$ to $R^{95}$ independently represents an alkylene group).

The alkylene group for $R^{91}$ to $R^{95}$ is preferably a linear or branched alkylene group, and preferably has 1 to 12 carbon atoms, more preferably 1 to 5, and particularly preferably 1 to 3.

Specific examples of the alkylene group include a methylene group [—CH₂—]; alkylmethylene groups such as —CH(CH₃)—, —CH(CH₂CH₃)—, —C(CH₃)₂—, —C(CH₃)(CH₂CH₃)—, —C(CH₃)(CH₂CH₂CH₃)— and —C(CH₂CH₃)₂—; an ethylene group [—CH₂CH₂—]; alkylethylene groups such as —CH(CH₃)CH₂—, —CH(CH₃)CH(CH₃)—, —C(CH₃)₂CH₂— and —CH(CH₂CH₃)CH₂—; a trimethylene group (n-propylene group)[—CH₂CH₂CH₂—]; alkyltrimethylene groups such as —CH(CH₃)CH₂CH₂— and —CH₂CH(CH₃)CH₂—; a tetramethylene group [—CH₂CH₂CH₂CH₂—]; alkyltetramethylene groups such as —CH(CH₃)CH₂CH₂CH₂— and —CH₂CH(CH₃)CH₂CH₂—; and a pentamethylene group [—CH₂CH₂CH₂CH₂CH₂—].

As Q', a divalent linking group containing an ester bond or an ether bond is preferable, and —$R^{91}$—O—, —$R^{92}$—O—C(=O)— or —C(=O)—O—$R^{93}$—O—C(=O)— is more preferable.

In the group represented by the formula $X^3$-Q'-, $X^3$ represents a hydrocarbon group of 1 to 30 carbon atoms which may have a substituent.

The hydrocarbon group for $X^3$ may be either an aromatic hydrocarbon group or an aliphatic hydrocarbon group.

The aromatic hydrocarbon group is a hydrocarbon group having an aromatic ring. The aromatic hydrocarbon group preferably has 5 to 30 carbon atoms, more preferably 5 to 20, still more preferably 6 to 15, and most preferably 6 to 12. Here, the number of carbon atoms within a substituent(s) is not included in the number of carbon atoms of the aromatic hydrocarbon group.

Specific examples of aromatic hydrocarbon groups include an aryl group which is an aromatic hydrocarbon ring having one hydrogen atom removed therefrom, such as a phenyl group, a biphenyl group, a fluorenyl group, a naphthyl group, an anthryl group or a phenanthryl group; and an alkylaryl group such as a benzyl group, a phenethyl group, a 1-naphthylmethyl group, a 2-naphthylmethyl group, a 1-naphthylethyl group, or a 2-naphthylethyl group. The alkyl chain within the arylalkyl group preferably has 1 to 4 carbon atom, more preferably 1 or 2, and most preferably 1.

The aromatic hydrocarbon group may have a substituent. For example, part of the carbon atoms constituting the aromatic ring within the aromatic hydrocarbon group may be substituted with a hetero atom, or a hydrogen atom bonded to the aromatic ring within the aromatic hydrocarbon group may be substituted with a substituent.

In the former example, a heteroaryl group in which part of the carbon atoms constituting the ring within the aforementioned aryl group has been substituted with a hetero atom such as an oxygen atom, a sulfur atom or a nitrogen atom, and a heteroarylalkyl group in which part of the carbon atoms constituting the aromatic hydrocarbon ring within the aforementioned arylalkyl group has been substituted with the aforementioned hetero atom can be used.

In the latter example, as the substituent for the aromatic hydrocarbon group, an alkyl group, an alkoxy group, a halogen atom, a halogenated alkyl group, a hydroxyl group, an oxygen atom (=O) or the like can be used.

The alkyl group as the substituent for the aromatic hydrocarbon group is preferably an alkyl group of 1 to 5 carbon atoms, and a methyl group, an ethyl group, a propyl group, an n-butyl group or a tert-butyl group is particularly desirable.

The alkoxy group as the substituent for the aromatic hydrocarbon group is preferably an alkoxy group having 1 to 5 carbon atoms, more preferably a methoxy group, an ethoxy group, an n-propoxy group, an iso-propoxy group, an n-butoxy group or a tert-butoxy group, and most preferably a methoxy group or an ethoxy group.

Examples of the halogen atom as the substituent for the aromatic hydrocarbon group include a fluorine atom, a chlorine atom, a bromine atom and an iodine atom, and a fluorine atom is preferable.

Example of the halogenated alkyl group as the substituent for the aromatic hydrocarbon group includes a group in which part or all of the hydrogen atoms within the aforementioned alkyl group have been substituted with the aforementioned halogen atoms.

The aliphatic hydrocarbon group for $X^3$ may be either a saturated aliphatic hydrocarbon group, or an unsaturated aliphatic hydrocarbon group. Further, the aliphatic hydrocarbon group may be linear, branched or cyclic.

In the aliphatic hydrocarbon group for $X^3$, part of the carbon atoms constituting the aliphatic hydrocarbon group may be substituted with a substituent group containing a hetero atom, or part or all of the hydrogen atoms constituting the aliphatic hydrocarbon group may be substituted with a substituent group containing a hetero atom.

As the "hetero atom" for $X^3$, there is no particular limitation as long as it is an atom other than carbon and hydrogen. Examples of hetero atoms include a halogen atom, an oxygen atom, a sulfur atom and a nitrogen atom. Examples of the halogen atom include a fluorine atom, a chlorine atom, an iodine atom and a bromine atom.

The substituent group containing a hetero atom may consist of a hetero atom, or may be a group containing a group or atom other than a hetero atom.

Specific examples of the substituent group for substituting a part of the carbon atoms include —O—, —C(=O)—O—, —C(=O)—, —O—C(=O)—O—, —C(=O)—NH—, —NH— (the H may be substituted with a substituent such as an alkyl group or an acyl group), —S—, —S(=O)$_2$— and —S(=O)$_2$—O—. When the aliphatic hydrocarbon group is cyclic, the aliphatic hydrocarbon group may contain any of these substituent groups in the ring structure.

Examples of the substituent group for substituting part or all of the hydrogen atoms include an alkoxy group, a halogen atom, a halogenated alkyl group, a hydroxyl group, an oxygen atom (=O) and a cyano group.

The aforementioned alkoxy group is preferably an alkoxy group having 1 to 5 carbon atoms, more preferably a methoxy group, an ethoxy group, an n-propoxy group, an iso-propoxy group, an n-butoxy group or a tert-butoxy group, and most preferably a methoxy group or an ethoxy group.

Examples of the aforementioned halogen atom include a fluorine atom, a chlorine atom, a bromine atom and an iodine atom, and a fluorine atom is preferable.

Example of the aforementioned halogenated alkyl group includes a group in which a part or all of the hydrogen atoms within an alkyl group of 1 to 5 carbon atoms (e.g., a methyl group, an ethyl group, a propyl group, an n-butyl group or a tert-butyl group) have been substituted with the aforementioned halogen atoms.

As the aliphatic hydrocarbon group, a linear or branched saturated hydrocarbon group, a linear or branched monovalent unsaturated hydrocarbon group, or a cyclic aliphatic hydrocarbon group (aliphatic cyclic group) is preferable.

The linear saturated hydrocarbon group (alkyl group) preferably has 1 to 20 carbon atoms, more preferably 1 to 15, and most preferably 1 to 10. Specific examples include a methyl group, an ethyl group, a propyl group, a butyl group, a pentyl group, a hexyl group, a heptyl group, an octyl group, a nonyl group, a decyl group, an undecyl group, a dodecyl group, a tridecyl group, an isotridecyl group, a tetradecyl group, a pentadecyl group, a hexadecyl group, an isohexadecyl group, a heptadecyl group, an octadecyl group, a nonadecyl group, an icosyl group, a henicosyl group and a docosyl group.

The branched saturated hydrocarbon group (alkyl group) preferably has 3 to 20 carbon atoms, more preferably 3 to 15, and most preferably 3 to 10. Specific examples include a 1-methylethyl group, a 1-methylpropyl group, a 2-methylpropyl group, a 1-methylbutyl group, a 2-methylbutyl group, a 3-methylbutyl group, a 1-ethylbutyl group, a 2-ethylbutyl group, a 1-methylpentyl group, a 2-methylpentyl group, a 3-methylpentyl group and a 4-methylpentyl group.

The unsaturated hydrocarbon group preferably has 2 to 10 carbon atoms, more preferably 2 to 5, still more preferably 2 to 4, and particularly preferably 3. Examples of linear monovalent unsaturated hydrocarbon groups include a vinyl group, a propenyl group (an allyl group) and a butynyl group. Examples of branched monovalent unsaturated hydrocarbon groups include a 1-methylpropenyl group and a 2-methylpropenyl group.

Among the above-mentioned examples, as the unsaturated hydrocarbon group, a propenyl group is particularly desirable.

The aliphatic cyclic group may be either a monocyclic group or a polycyclic group. The aliphatic cyclic group preferably has 3 to 30 carbon atoms, more preferably 5 to 30, still more preferably 5 to 20, particularly preferably 6 to 15, and most preferably 6 to 12.

Examples thereof include groups in which one or more of the hydrogen atoms have been removed from a monocycloalkane; and groups in which one or more of the hydrogen atoms have been removed from a polycycloalkane such as a bicycloalkane, a tricycloalkane, or a tetracycloalkane. Specific examples include groups in which one or more hydrogen atoms have been removed from a monocycloalkane such as cyclopentane or cyclohexane; and groups in which one or more hydrogen atoms have been removed from a polycycloalkane such as adamantane, norbornane, isobornane, tricyclodecane or tetracyclododecane.

When the aliphatic cyclic group does not contain a hetero atom-containing substituent group in the ring structure thereof, the aliphatic cyclic group is preferably a polycyclic group, more preferably a group in which one or more hydrogen atoms have been removed from a polycycloalkane, and a group in which one or more hydrogen atoms have been removed from adamantane is particularly desirable.

When the aliphatic cyclic group contains a hetero atom-containing substituent group in the ring structure thereof, the hetero atom-containing substituent group is preferably —O—, —C(=O)—O—, —S—, —S(=O)$_2$— or —S(=O)$_2$—O—. Specific examples of such aliphatic cyclic groups include groups represented by formulas (L1) to (L6) and (S1) to (S4) shown below.

[Chemical Formula 12]

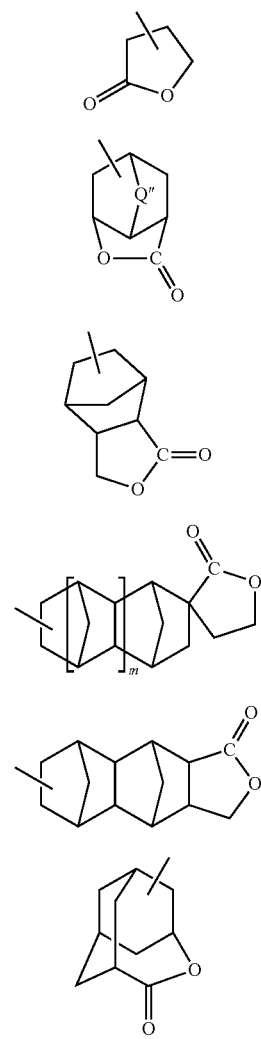

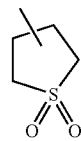
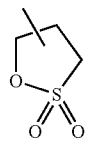

In the formulas, Q" represents an alkylene group of 1 to 5 carbon atoms, —O—, —S—, —O—R$^{94}$— or —S—R$^{95}$— (R$^{94}$ and R$^{95}$ each independently represent an alkylene group of 1 to 5 carbon atoms); and m represents 0 or 1.

As the alkylene group for Q", R$^{94}$ and R$^{95}$, the same alkylene groups as those described above for R$^{91}$ to R$^{93}$ can be used.

In these aliphatic cyclic groups, part of the hydrogen atoms bonded to the carbon atoms constituting the ring structure may be substituted with a substituent. Examples of substituents include an alkyl group, an alkoxy group, a halogen atom, a halogenated alkyl group, a hydroxyl group and an oxygen atom (=O).

As the alkyl group, an alkyl group of 1 to 5 carbon atoms is preferable, and a methyl group, an ethyl group, a propyl group, an n-butyl group or a tert-butyl group is particularly desirable.

As the alkoxy group and the halogen atom, the same groups as the substituent groups for substituting part or all of the hydrogen atoms can be used.

As X$^3$, a cyclic group which may have a substituent is preferable. The cyclic group may be either an aromatic hydrocarbon group which may have a substituent, or a cyclic alkyl group which may have a substituent, and an aliphatic cyclic group which may have a substituent is preferable.

As the aromatic hydrocarbon group, a naphthyl group which may have a substituent, or a phenyl group which may have a substituent is preferable. As the substituent, a fluorine atom is preferable.

As the cyclic aliphatic group which may have a substituent, a polycyclic alkyl group which may have a substituent is preferable. As the polycyclic alkyl group, the aforementioned group in which one or more hydrogen atoms have been removed from a polycycloalkane, and groups represented by formulas (L2) to (L7), (S3) and (S4) are preferable.

Among these examples, as the aforementioned $R^{4\prime\prime\prime}$, a halogenated alkyl group or a group having $X^3$-Q'- as a substituent is preferable.

When the $R^{4\prime\prime\prime}$ group has $X^3$-Q'- as a substituent, as $R^{4\prime\prime\prime}$, a group represented by the formula: $X^3$-Q'-$Y^3$— (in the formula, Q' and $X^3$ are the same as defined above, and $Y^3$ represents an alkylene group of 1 to 4 carbon atoms which may have a substituent or a fluorinated alkylene group of 1 to 4 carbon atoms which may have a substituent is preferable.

In the group represented by the formula $X^3$-Q'-$Y^3$—, as the alkylene group for $Y^3$, the same alkylene group as those described above for Q' in which the number of carbon atoms is 1 to 4 can be used.

As the fluorinated alkylene group, the aforementioned alkylene group in which part or all of the hydrogen atoms has been substituted with fluorine atoms can be used.

Specific examples of $Y^3$ include —$CF_2$—, —$CF_2CF_2$—, —$CF_2CF_2CF_2$—, —$CF(CF_3)CF_2$—, —$CF(CF_2CF_3)$—, —$C(CF_3)_2$—, —$CF_2CF_2CF_2CF_2$—, —$CF(CF_3)CF_2CF_2$—, —$CF_2CF(CF_3)CF_2$—, —$CF(CF_3)CF(CF_3)$—, —$C(CF_3)_2CF_2$—, —$CF(CF_2CF_3)CF_2$—, —$CF(CF_2CF_2CF_3)$—, —$C(CF_3)(CF_2CF_3)$—; —CHF—, —$CH_2CF_2$—, —$CH_2CH_2CF_2$—, —$CH_2CF_2CF_2$—, —$CH(CF_3)CH_2$—, —$CH(CF_2CF_3)$—, —$C(CH_3)(CF_3)$—, —$CH_2CH_2CH_2CF_2$—, —$CH_2CH_2CF_2CF_2$—, —$CH(CF_3)CH_2CH_2$—, —$CH_2CH(CF_3)CH_2$—, —$CH(CF_3)CH(CF_3)$—, —$C(CF_3)_2CH_2$—; —$CH_2$—, —$CH_2CH_2$—, —$CH_2CH_2CH_2$—, —$CH(CH_3)CH_2$—, —$CH(CH_2CH_3)$—, —$C(CH_3)_2$—, —$CH_2CH_2CH_2CH_2$—, —$CH(CH_3)$ $CH_2CH_2$—, —$CH_2CH(CH_3)CH_2$—, —$CH(CH_3)CH$ $(CH_3)$—, —$C(CH_3)_2CH_2$—, —$CH(CH_2CH_3)CH_2$—, —CH $(CH_2CH_2CH_3)$— and —$C(CH_3)(CH_2CH_3)$—.

As $Y^3$, a fluorinated alkylene group is preferable, and a fluorinated alkylene group in which the carbon atom bonded to the adjacent sulfur atom is fluorinated is particularly desirable. Examples of such fluorinated alkylene groups include —$CF_2$—, —$CF_2CF_2$—, —$CF_2CF_2CF_2$—, —CF $(CF_3)CF_2$—, —$CF_2CF_2CF_2CF_2$—, —$CF(CF_3)CF_2CF_2$—, —$CF_2CF(CF_3)CF_2$—, —$CF(CF_3)CF(CF_3)$—, —$C(CF_3)_2$ $CF_2$—, —$CF(CF_2CF_3)CF_2$—; —$CH_2CF_2$—, —$CH_2CH_2CF_2$—, —$CH_2CF_2CF_2$—; —$CH_2CH_2CH_2CF_2$—, —$CH_2CH_2CF_2CF_2$— and —$CH_2CF_2CF_2CF_2$—. Of these, —$CF_2$—, —$CF_2CF_2$—, —$CF_2CF_2CF_2$— or $CH_2CF_2CF_2$— is preferable, —$CF_2$—, —$CF_2CF_2$— or —$CF_2CF_2CF_2$— is more preferable, and —$CF_2$— is particularly preferable.

The alkylene group or fluorinated alkylene group may have a substituent. The alkylene group or fluorinated alkylene group "has a substituent" means that part or all of the hydrogen atoms or fluorine atoms in the alkylene group or fluorinated alkylene group has been substituted with groups other than hydrogen atoms and fluorine atoms.

Examples of substituents which the alkylene group or fluorinated alkylene group may have include an alkyl group of 1 to 4 carbon atoms, an alkoxy group of 1 to 4 carbon atoms, and a hydroxyl group.

Specific examples of groups represented by formula $R^{4\prime\prime\prime}SO_3^-$ in which $R^{4\prime\prime\prime}$ represents $X^3$-Q'-$Y^3$— include anions represented by the following formulae (b1) to (b9).

[Chemical Formula 13]

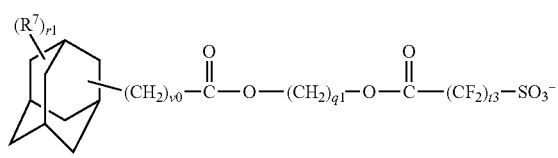
(b1)

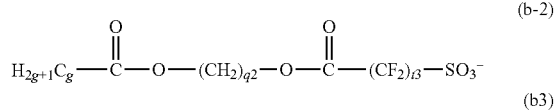
(b-2)

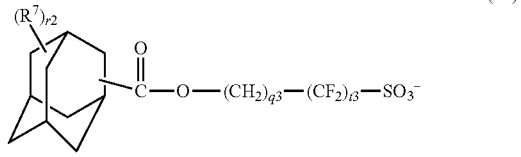
(b3)

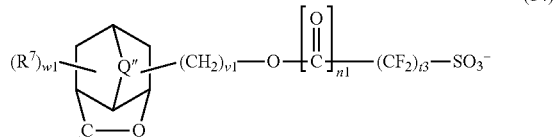
(b4)

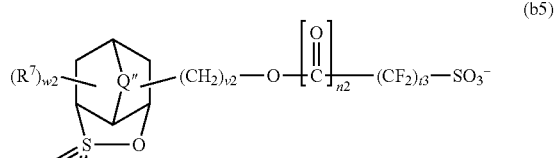
(b5)

[Chemical Formula 14]

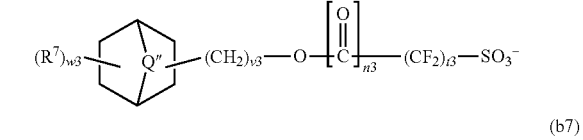
(b6)

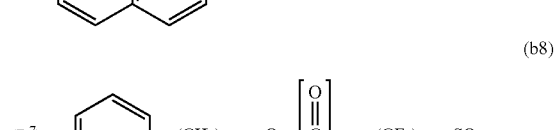
(b7)

(b8)

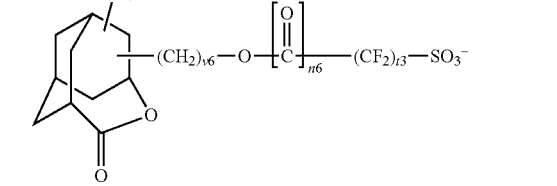
(b9)

In the formulae, q1 and q2 each independently represents an integer of 1 to 5; q3 represents an integer of 1 to 12; t3 represents an integer of 1 to 3; r1 and r2 each independently represents an integer of 0 to 3; g represents an integer of 1 to 20; $R^7$ represents a substituent; n1 to n6 each independently represents 0 or 1; v0 to v6 each independently represents an integer of 0 to 3; w1 to w6 each independently represents an integer of 0 to 3; and Q" is the same as defined above.

As the substituent for $R^7$, the same groups as those which the aforementioned aliphatic hydrocarbon group or aromatic hydrocarbon group for $X^3$ may have as a substituent can be used.

If there are two or more of the $R^7$ group, as indicated by the values r1, r2, and w1 to w6, then the two or more of the $R^7$ groups may be the same or different from each other.

Further, as preferable examples of the anion moiety of the component (G1), an anion represented by general formula (G1a-3) shown below and an anion moiety represented by general formula (G1a-4) shown below can also be mentioned.

[Chemical Formula 15]

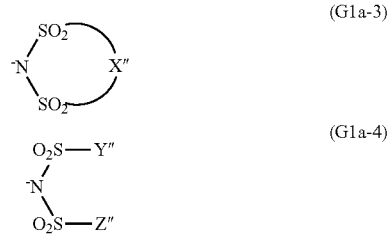

(G1a-3)

(G1a-4)

In the formulas, X" represents an alkylene group of 2 to 6 carbon atoms in which at least one hydrogen atom has been substituted with a fluorine atom; and Y" and Z" each independently represents an alkyl group of 1 to 10 carbon atoms in which at least one hydrogen atom has been substituted with a fluorine atom.

In formula (G1a-3), X" represents a linear or branched alkylene group in which at least one hydrogen atom has been substituted with a fluorine atom, and the alkylene group preferably has 2 to 6 carbon atoms, more preferably 3 to 5 carbon atoms, and most preferably 3 carbon atoms.

In formula (G1a-4), each of Y" and Z" independently represents a linear or branched alkyl group in which at least one hydrogen atom has been substituted with a fluorine atom, and the alkyl group preferably has 1 to 10 carbon atoms, more preferably 1 to 7 carbon atoms, and most preferably 1 to 3 carbon atoms.

The smaller the number of carbon atoms of the alkylene group for X" or those of the alkyl group for Y" and Z" within the above-mentioned range of the number of carbon atoms, the more the solubility in a resist solvent is improved.

Further, in the alkylene group for X" or the alkyl group for Y" and Z", it is preferable that the number of hydrogen atoms substituted with fluorine atoms is as large as possible because the acid strength increases and the transparency to high energy radiation of 200 nm or less or electron beam is improved.

The amount of fluorine atoms within the alkylene group or alkyl group, i.e., fluorination ratio, is preferably from 70 to 100%, more preferably from 90 to 100%, and it is particularly desirable that the alkylene group or alkyl group be a perfluoroalkylene or perfluoroalkyl group in which all hydrogen atoms are substituted with fluorine atoms.

As the anion moiety of the component (G1), an anion represented by the aforementioned formula "$R^{4'''}SO_3^-$" (in particular, any one of anions represented by the aforementioned formulae (b1) to (b9) which is a group in which $R^{4'''}$ is "$X^3$-$Q'$-$Y^3$—") or an anion represented by the aforementioned formula (G1a-3) is most preferable.

As the component (G1), one type of compound may be used alone, or two or more types may be used in combination.

In the undercoat agent, the amount of the component (G1) within the component (G) is preferably 40% by weight or more, still more preferably 70% by weight or more, and may be even 100% by weight. When the amount of the component (G1) is at least as large as the lower limit of the above-mentioned range, the effects of the present invention are improved.

In the undercoat agent, the amount of the component (G1), relative to 100 parts by weight of the component (A) is preferably from 0.5 to 30 parts by weight, more preferably from 1 to 20 parts by weight, and most preferably from 2 to 15 parts by weight. When the amount of the component (G1) is within the above-mentioned range, the effects of the present invention are improved.

[Component (G2)]

The component (G2) is a component which does not fall under the definition of the component (G1), and the component (G2) itself exhibits acidity, so as to act as a proton donor. Examples of the component (G2) include a non-ionic acid which does not form a salt.

As the component (G2), there is no particular limitation, and as the component (G2), an imine acid or a sulfonic acid compound is preferable, and examples thereof include sulfonylimide, bis(alkylsulfonyl)imide, tris(alkylsulfonyl)methide, and any of these compounds which have a fluorine atom.

In particular, a compound represented by any one of general formulae (G2-1) to (G2-3) shown below (preferably a compound represented by general formula (G2-2)), a compound in which an anion represented by any one of general formulae (b1) to (b9) described above has "—$SO_3^-$" replaced by "—$SO_3H$", a compound in which an anion represented by general formula (G1a-3) or (G1a-4) described above has "N" replaced by "NH", and camphorsulfonic acid are preferable. Other examples include acid components such as a fluorinated alkyl group-containing carboxylic acid, a higher fatty acid, a higher alkylsulfonic acid, and a higher alkylarylsulfonic acid.

[Chemical Formula 16]

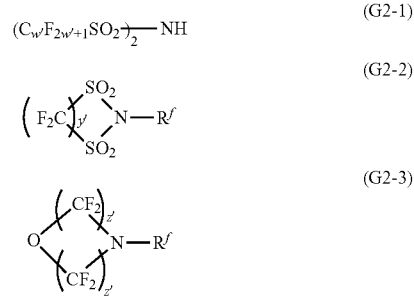

(G2-1)

(G2-2)

(G2-3)

In formula (G2-1), w' represents an integer of 1 to 5. In formula (G2-2), $R^f$ represents a hydrogen atom or an alkyl group (provided that part or all of the hydrogen atoms within the alkyl group may be substituted with a fluorine atom, a hydroxy group, an alkoxy group, a carboxy group or an amino group); and y' represents 2 or 3. In formula (G2-3), $R^f$ is the same as defined above; and z' represents 2 or 3.

Examples of compounds represented by the aforementioned formula (G2-1) include $(C_4F_9SO_2)_2NH$ and $(C_3F_7SO_2)_2NH$.

In the aforementioned formula (G2-2), the alkyl group for $R^f$ preferably has 1 or 2 carbon atoms, and more preferably 1.

Examples of the alkoxy group which may substitute the hydrogen atom(s) within the alkyl group include a methoxy group and an ethoxy group.

Examples of a compound represented by the aforementioned formula (G2-2) include a compound represented by a chemical formula (G2-21) shown below.

[Chemical Formula 17]

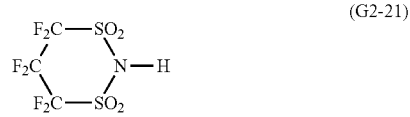

(G2-21)

In the aforementioned formula (G2-3), $R^f$ is the same as defined for $R^f$ in formula (G2-2).

Examples of a compound represented by the aforementioned formula (G2-3) include a compound represented by a chemical formula (G2-31) shown below.

[Chemical Formula 18]

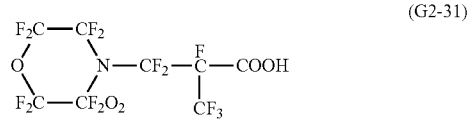

(G2-31)

As the fluorinated alkyl group-containing carboxylic group, for example, $C_{10}F_{21}COOH$ can be mentioned.

Examples of the higher fatty acid include higher fatty acids having an alkyl group of 8 to 20 carbon atoms, and specific examples thereof include dodecanoic acid, tetradecanoic acid, and stearic acid.

The alkyl group of 8 to 20 carbon atoms may be either linear or branched. Further, the alkyl group of 8 to 20 carbon atoms may have a phenylene group, an oxygen atom or the like interposed within the chain thereof. Furthermore, the alkyl group of 8 to 20 carbon atoms may have part of the hydrogen atoms substituted with a hydroxy group or a carboxy group.

Examples of the higher alkylsulfonic acid include sulfonic acids having an alkyl group preferably with an average of 9 to 21 carbon atoms, more preferably 12 to 18 carbon atoms, and specific examples thereof include decanesulfonic acid, dodecanesulfonic acid, tetradecanesulfonic acid, pentadecanesulfonic acid and octadecanesulfonic acid.

Examples of the higher alkylarylsulfonic acid include alkylbenzenesulfonic acids and alkylnaphthalenesulfonic acids having an alkyl group preferably with an average of 6 to 18 carbon atoms, more preferably 9 to 15 carbon atoms, and specific examples thereof include dodecylbenzenesulfonic acid and decylnaphthalenesulfonic acid.

Examples of the acid components include alkyldiphenyletherdisulfonic acids preferably with an average of 6 to 18 carbon atoms, more preferably 9 to 15, and preferable examples thereof include dodecyldiphenyletherdisulfonic acid.

Examples of the component (G2) other than those described above include organic carboxylic acid, a phosphorus oxo acid or derivative thereof.

Examples of suitable organic carboxylic acids include acetic acid, malonic acid, citric acid, malic acid, succinic acid, benzoic acid, and salicylic acid.

Examples of phosphorus oxo acids include phosphoric acid, phosphonic acid and phosphinic acid. Among these, phosphonic acid is particularly desirable.

Examples of phosphorous oxo acid derivatives include esters in which a hydrogen atom within the above-mentioned oxo acids is substituted with a hydrocarbon group. Examples of the hydrocarbon group include an alkyl group of 1 to 5 carbon atoms and an aryl group of 6 to 15 carbon atoms.

Examples of phosphoric acid derivatives include phosphoric acid esters such as di-n-butyl phosphate and diphenyl phosphate.

Examples of phosphonic acid derivatives include phosphonic acid esters such as dimethyl phosphonate, di-n-butyl phosphonate, phenyl phosphonate, diphenyl phosphonate and dibenzyl phosphonate.

Examples of phosphinic acid derivatives include phosphinic acid esters such as phenylphosphinic acid.

When the component (G) includes a component (G2), as the component (G2), one type of compound may be used, or two or more types may be used in combination. Among these, as the component (G2), at least one member selected from the group consisting of sulfonylimide, bis(alkylsulfonyl)imide, tris(alkylsulfonyl)methide and any of these compounds having a fluorine atom is preferable, and it is most preferable to use at least one of these compounds having a fluorine atom.

Further, when the undercoat agent contains the component (G2), the amount of the component (G2) relative to 100 parts by weight of the component (A) is preferably within a range from 0.5 to 20 parts by weight, more preferably from 1 to 15 parts by weight, and still more preferably from 1 to 10 parts by weight. When the amount of the component (G2) is within the above-mentioned range, the effects of the present invention are improved.

[Acid Generator Component; Component (B)]

The undercoat agent of the present invention may further include an acid generator component (B) (hereafter, frequently referred to as "component (B)"). Differing from the component (G), the component (B) generates acid upon heating or exposure. The component (B) itself does not need to exhibit acidity, and is decomposed by heat or light, so as to function as acid.

As the component (B), there is no particular limitation, and any of the known acid generators used in conventional chemically amplified resist compositions can be used.

As the acid generator, a thermal acid generator which generates acid upon heating and a photoacid generator which generates acid upon exposure can be mentioned. Examples of such acid generators are numerous, and include onium salt acid generators such as iodonium salts and sulfonium salts; oxime sulfonate acid generators; diazomethane acid generators such as bisalkyl or bisaryl sulfonyl diazomethanes and poly(bis-sulfonyl)diazomethanes; nitrobenzylsulfonate acid generators; iminosulfonate acid generators; and disulfone acid generators.

These acid generator components are generally known as photoacid generators (PAG), but also function as thermal acid generators (TAG). Therefore, the acid generator component usable in the present invention can be appropriately selected from those which have been conventionally known as acid generators for chemically amplified resist compositions.

A "thermal acid generator which generates acid upon heating" refers to a component which generates acid upon heating, i.e., 200° C. or lower, and more preferably at 50 to 150° C. By selecting a component which generates acid at 200° C. or higher, controlling generation of acid becomes easy. More preferably, by selecting a component which generates acid at 50° C. or higher, the stability in the undercoat agent becomes excellent.

As the onium salt acid generator for the component (B), those which have at least one anion group selected from a sulfonate anion, a carboxylate anion, a sulfonylimide anion, a bis(alkylsulfonyl)imide anion, a tris(alkylsulfonyl)methide anion and a fluorinated antimonic acid ion within the anion moiety is preferable. More specifically, the same anion moieties as those described above for the component (G1), and hexafluoroantimonic acid ion can be mentioned.

Further, as the cation moiety, a cation moiety represented by general formula (b-c1) or (b-c2) shown below is preferable.

[Chemical Formula 19]

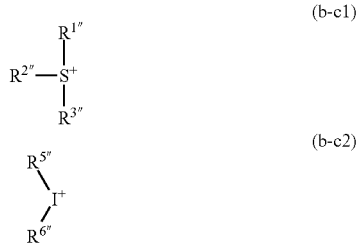

In the formulae, $R^{1''}$ to $R^{3''}$, $R^{5'''}$ and $R^{6'''}$ each independently represents an aryl group which may have a substituent, an alkyl group which may have a substituent or an alkenyl group which may have a substituent, provided that, in formula (b-1), two of $R^{1''}$ to $R^{3''}$ may be mutually bonded to form a ring with the sulfur atom.

In formula (b-1), $R^{1''}$ to $R^{3''}$ each independently represents an aryl group which may have a substituent, an alkyl group which may have a substituent or an alkenyl group which may have a substituent. Two of $R^{1''}$ to $R^{3''}$ may be mutually bonded to form a ring with the sulfur atom.

Examples of the aryl group for $R^{1''}$ to $R^{3''}$ include an unsubstituted aryl group of 6 to 20 carbon atoms; a substituted aryl group in which part or all of the hydrogen atoms of the aforementioned unsubstituted aryl group has been substituted with an alkyl group, an alkoxy group, a halogen atom, a hydroxy group, an oxo group (=O), an aryl group, an alkoxyalkyloxy group, an alkoxycarbonylalkyloxy group, —C(=O)—O—$R^{6t}$, —O—C(=O)—$R^{7t}$ or —O—$R^{8t}$. Each of $R^{6t}$, $R^{7t}$ and $R^{8t}$ independently represents a linear or branched saturated hydrocarbon group of 1 to 25 carbon atoms, a cyclic saturated hydrocarbon group of 3 to 20 carbon atoms or a linear or branched, aliphatic unsaturated hydrocarbon group of 2 to 5 carbon atoms.

The unsubstituted aryl group for $R^{1''}$ to $R^{3''}$ is preferably an aryl group having 6 to 10 carbon atoms because it can be synthesized at a low cost. Specific examples thereof include a phenyl group and a naphthyl group.

The alkyl group as the substituent for the substituted aryl group represented by $R^{1''}$ to $R^{3''}$ is preferably an alkyl group having 1 to 5 carbon atoms, and a methyl group, an ethyl group, a propyl group, an n-butyl group, or a tert-butyl group is particularly desirable.

The alkoxy group as the substituent for the substituted aryl group is preferably an alkoxy group having 1 to 5 carbon atoms, and a methoxy group, an ethoxy group, an n-propoxy group, an iso-propoxy group, an n-butoxy group or a tert-butoxy group is particularly desirable.

The halogen atom as the substituent for the substituted aryl group is preferably a fluorine atom.

As the aryl group as the substituent for the substituted aryl group, the same aryl groups as those described for $R^{1''}$ to $R^{3''}$ can be mentioned.

Examples of alkoxyalkyloxy groups as the substituent for the substituted aryl group include groups represented by a general formula shown below:

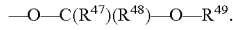

In the formula, $R^{47}$ and $R^{48}$ each independently represents a hydrogen atom or a linear or branched alkyl group; and $R^{49}$ represents an alkyl group.

The alkyl group for $R^{47}$ and $R^{48}$ preferably has 1 to 5 carbon atoms, and may be either linear or branched, and is preferably an ethyl group or a methyl group, and most preferably a methyl group.

It is preferable that at least one of $R^{47}$ and $R^{48}$ be a hydrogen atom. It is particularly desirable that at least one of $R^{47}$ and $R^{48}$ be a hydrogen atom, and the other be a hydrogen atom or a methyl group.

The alkyl group for $R^{49}$ preferably has 1 to 15 carbon atoms, and may be linear, branched or cyclic.

The linear or branched alkyl group for $R^{49}$ preferably has 1 to 5 carbon atoms. Examples thereof include a methyl group, an ethyl group, a propyl group, an n-butyl group and a tert-butyl group.

The cyclic alkyl group for $R^{49}$ preferably has 4 to 15 carbon atoms, more preferably 4 to 12, and most preferably 5 to 10. Specific examples thereof include groups in which one or more hydrogen atoms have been removed from a monocycloalkane or a polycycloalkane such as a bicycloalkane, tricycloalkane or tetracycloalkane, and which may or may not be substituted with an alkyl group of 1 to 5 carbon atoms, a fluorine atom or a fluorinated alkyl group. Examples of the monocycloalkane include cyclopentane and cyclohexane. Examples of polycycloalkanes include adamantane, norbornane, isobornane, tricyclodecane and tetracyclododecane. Among these, a group in which one or more hydrogen atoms have been removed from adamantane is preferable.

Examples of the alkoxycarbonylalkyloxy group as the substituent for the substituted aryl group include groups represented by a general formula shown below:

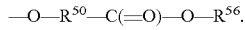

In the formula, $R^{50}$ represents a linear or branched alkylene group, and $R^{56}$ represents a tertiary alkyl group.

The linear or branched alkylene group for $R^{50}$ preferably has 1 to 5 carbon atoms, and examples thereof include a methylene group, an ethylene group, a trimethylene group, a tetramethylene group and a 1,1-dimethylethylene group.

The alkyl group for $R^{56}$ is a tertiary alkyl group, and examples thereof include a 2-methyl-2-adamantyl group, a 2-ethyl-2-adamantyl group, a 1-methyl-1-cyclopentyl group, a 1-ethyl-1-cyclopentyl group, a 1-methyl-1-cyclohexyl group, a 1-ethyl-1-cyclohexyl group, a 1-(1-adamantyl)-1-methylethyl group, a 1-(1-adamantyl)-1-methylpropyl group, a 1-(1-adamantyl)-1-methylbutyl group, a 1-(1-adamantyl)-1-methylpentyl group, a 1-(1-cyclopentyl)-1-methylethyl group, a 1-(1-cyclopentyl)-1-methylpropyl group, a 1-(1-cyclopentyl)-1-methylbutyl group, a 1-(1-cyclopentyl)-1-methylpentyl group, a 1-(1-cyclohexyl)-1-methylethyl group, a 1-(1-cyclohexyl)-1-methylpropyl group, a 1-(1-cyclohexyl)-1-methylbutyl group, a 1-(1-cyclohexyl)-1-methylpentyl group, a tert-butyl group, a tert-pentyl group and a tert-hexyl group.

Further, a group in which $R^{56}$ in the group represented by the aforementioned general formula: O—$R^{50}$—C(=O)—O—$R^{56}$ has been substituted with $R^{56'}$ can also be mentioned. $R^{56'}$ represents a hydrogen atom, an alkyl group, a fluorinated alkyl group or an aliphatic cyclic group which may contain a hetero atom.

The alkyl group for $R^{56'}$ is the same as defined for the alkyl group for the aforementioned $R^{49}$.

Examples of the fluorinated alkyl group for $R^{56'}$ include groups in which part or all of the hydrogen atoms within the alkyl group for $R^{49}$ has been substituted with a fluorine atom.

Examples of the aliphatic cyclic group for $R^{56'}$ which may contain a hetero atom include an aliphatic cyclic group which does not contain a hetero atom, an aliphatic cyclic group containing a hetero atom in the ring structure, and an aliphatic cyclic group in which a hydrogen atom has been substituted with a hetero atom.

As an aliphatic cyclic group for $R^{56'}$ which does not contain a hetero atom, a group in which one or more hydrogen atoms have been removed from a monocycloalkane or a polycycloalkane such as a bicycloalkane, a tricycloalkane or a tetracycloalkane can be mentioned. Examples of the monocycloalkane include cyclopentane and cyclohexane. Examples of polycycloalkanes include adamantane, norbornane, isobornane, tricyclodecane and tetracyclododecane. Among these, a group in which one or more hydrogen atoms have been removed from adamantane is preferable.

Specific examples of the aliphatic cyclic group for $R^{56'}$ containing a hetero atom in the ring structure include groups represented by the aforementioned formulae (L1) to (L6) and (S1) to (S4).

As the aliphatic cyclic group for $R^{56'}$ in which a hydrogen atom has been substituted with a hetero atom, an aliphatic cyclic group in which a hydrogen atom has been substituted with an oxygen atom (=O) can be mentioned.

In formulae —C(=O)—O—$R^{6'}$, —O—C(=O)—$R^{7'}$ and —O—$R^{8'}$, $R^{6'}$, $R^{7'}$ and $R^{8'}$ each independently represents a linear or branched saturated hydrocarbon group of 1 to 25 atoms, a cyclic saturated hydrocarbon group of 3 to 20 carbon atoms or a linear or branched, aliphatic unsaturated hydrocarbon group of 2 to 5 carbon atoms.

The linear or branched, saturated hydrocarbon group preferably has 1 to 25 carbon atoms, more preferably 1 to 15, and still more preferably 4 to 10.

Examples of the linear, saturated hydrocarbon group include a methyl group, an ethyl group, a propyl group, a butyl group, a pentyl group, a hexyl group, a heptyl group, an octyl group, a nonyl group and a decyl group.

Examples of the branched, saturated hydrocarbon group include a 1-methylethyl group, a 1-methylpropyl group, a 2-methylpropyl group, a 1-methylbutyl group, a 2-methylbutyl group, a 3-methylbutyl group, a 1-ethylbutyl group, a 2-ethylbutyl group, a 1-methylpentyl group, a 2-methylpentyl group, a 3-methylpentyl group and a 4-methylpentyl group, but excluding tertiary alkyl groups.

The linear or branched, saturated hydrocarbon group may have a substituent. Examples of the substituent include an alkoxy group, a halogen atom, a halogenated alkyl group, a hydroxyl group, an oxygen atom (=O), a cyano group and a carboxy group.

The alkoxy group as the substituent for the linear or branched saturated hydrocarbon group is preferably an alkoxy group having 1 to 5 carbon atoms, more preferably a methoxy group, an ethoxy group, an n-propoxy group, an iso-propoxy group, an n-butoxy group or a tert-butoxy group, and most preferably a methoxy group or an ethoxy group.

Examples of the halogen atom as the substituent for the linear or branched, saturated hydrocarbon group include a fluorine atom, a chlorine atom, a bromine atom and an iodine atom, and a fluorine atom is preferable.

Example of the halogenated alkyl group as the substituent for the linear or branched, saturated hydrocarbon group includes a group in which part or all of the hydrogen atoms within the aforementioned linear or branched, saturated hydrocarbon group have been substituted with the aforementioned halogen atoms.

The cyclic saturated hydrocarbon group of 3 to 20 carbon atoms for $R^{6'}$, $R^{7'}$ and $R^{8'}$ may be either a polycyclic group or a monocyclic group, and examples thereof include groups in which one hydrogen atom has been removed from a monocycloalkane, and groups in which one hydrogen atom has been removed from a polycycloalkane (e.g., a bicycloalkane, a tricycloalkane or a tetracycloalkane). More specific examples include groups in which one hydrogen atom has been removed from a monocycloalkane such as cyclopentane, cyclohexane, cycloheptane or cyclooctane; and groups in which one hydrogen atoms has been removed from a polycycloalkane such as adamantane, norbornane, isobornane, tricyclodecane or tetracyclododecane.

The cyclic, saturated hydrocarbon group may have a substituent. For example, part of the carbon atoms constituting the ring within the cyclic alkyl group may be substituted with a hetero atom, or a hydrogen atom bonded to the ring within the cyclic alkyl group may be substituted with a substituent.

In the former example, a heterocycloalkane in which part of the carbon atoms constituting the ring within the aforementioned monocycloalkane or polycycloalkane has been substituted with a hetero atom such as an oxygen atom, a sulfur atom or a nitrogen atom, and one or more hydrogen atoms have been removed therefrom, can be used. Further, the ring may contain an ester bond (—C(=O)—O—). More specific examples include a lactone-containing monocyclic group, such as a group in which one hydrogen atom has been removed from γ-butyrolactone; and a lactone-containing polycyclic group, such as a group in which one hydrogen atom has been removed from a bicycloalkane, tricycloalkane or tetracycloalkane containing a lactone ring.

In the latter example, as the substituent, the same substituent groups as those for the aforementioned linear or branched alkyl group, or an alkyl group of 1 to 5 carbon atoms can be used.

Alternatively, $R^{6'}$, $R^{7'}$ and $R^{8'}$ may be a combination of a linear or branched alkyl group and a cyclic group.

Examples of the combination of a linear or branched alkyl group with a cyclic alkyl group include groups in which a cyclic alkyl group as a substituent is bonded to a linear or branched alkyl group, and groups in which a linear or branched alkyl group as a substituent is bonded to a cyclic alkyl group.

Examples of the linear aliphatic unsaturated hydrocarbon group for $R^{6'}$, $R^{7'}$ and $R^{8'}$ include a vinyl group, a propenyl group (an allyl group) and a butynyl group.

Examples of the branched aliphatic unsaturated hydrocarbon group for $R^{6'}$, $R^{7'}$ and $R^{8'}$ include a 1-methylpropenyl group and a 2-methylpropenyl group.

The aforementioned linear or branched, aliphatic unsaturated hydrocarbon group may have a substituent. Examples of substituents include the same substituents as those which the aforementioned linear or branched alkyl group may have.

Among the aforementioned examples, as $R^{7t}$ and $R^{8t}$, in terms of improvement in lithography properties and shape of the resist pattern, a linear or branched, saturated hydrocarbon group of 1 to 15 carbon atoms or a cyclic saturated hydrocarbon group of 3 to 20 carbon atoms is preferable.

Examples of the alkyl group for $R^{1'''}$ to $R^{3'''}$ include linear, branched or cyclic alkyl groups of 1 to 10 carbon atoms. Among these, alkyl groups of 1 to 5 carbon atoms are preferable as the resolution becomes excellent. Specific examples thereof include a methyl group, an ethyl group, an n-propyl group, an isopropyl group, an n-butyl group, an isobutyl group, an n-pentyl group, a cyclopentyl group, a hexyl group, a cyclohexyl group, a nonyl group, and a decyl group, and a methyl group is most preferable because it is excellent in resolution and can be synthesized at a low cost.

The alkyl group for $R^{1'''}$ to $R^{3'''}$ may have part or all of the hydrogen atoms substituted with an alkoxy group, a halogen atom, a hydroxy group, an oxo group (=O), an aryl group, an alkoxyalkyloxy group, an alkoxycarbonylalkyloxy group, $C(=O)-O-R^{6t}$, $-O-C(=O)-R^{7t}$ or $-O-R^{8t}$. As the alkoxy group, the halogen atom, the aryl group, the alkoxyalkyloxy group, the alkoxycarbonylalkyloxy group, $-C(=O)-O-R^{6t}$, $-O-C(=O)-R^{7t}$ and $-O-R^{8t}$, the same substituents as those described above for substituting aryl group for $R^{1'''}$ to $R^{3'''}$ can be used.

The alkenyl group for $R^{1'''}$ to $R^{3'''}$ preferably has 2 to 10 carbon atoms, more preferably 2 to 5, and still more preferably 2 to 4. Specific examples thereof include a vinyl group, a propenyl group (an allyl group), a butynyl group, a 1-methylpropenyl group and a 2-methylpropenyl group.

When two of $R^{1'''}$ to $R^{3'''}$ are bonded to each other to form a ring with the sulfur atom, it is preferable that the two of $R^{1'''}$ to $R^{3'''}$ form a 3 to 10-membered ring including the sulfur atom, and it is particularly desirable that the two of $R^{1'''}$ to $R^{3'''}$ form a 5 to 7-membered ring including the sulfur atom.

Preferable examples of the cation moiety of the compound represented by the aforementioned formula (b-c1) are shown below.

[Chemical Formula 20]

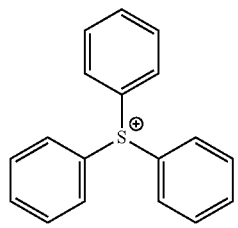

(ca-1-1)

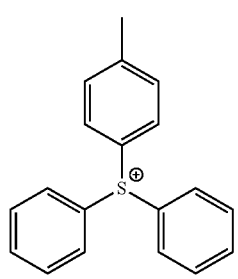

(ca-1-2)

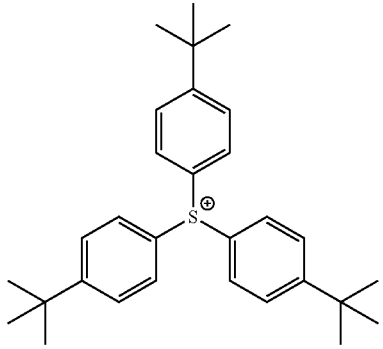

(ca-1-3)

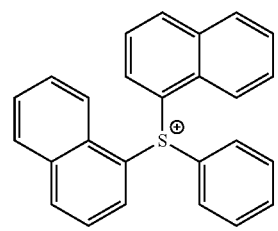

(ca-1-4)

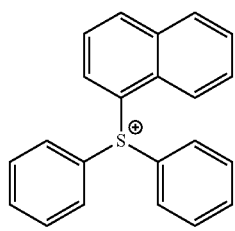

(ca-1-5)

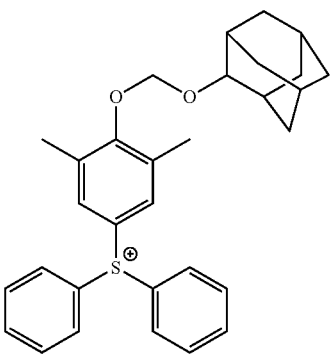

(ca-1-6)

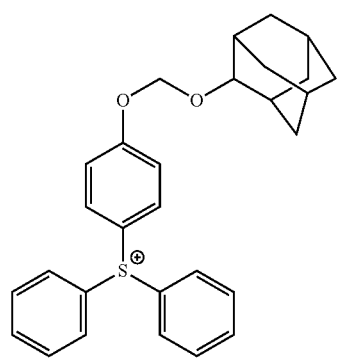

(ca-1-7)

(ca-1-8)
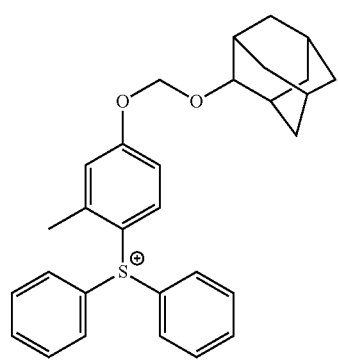
(ca-1-9)
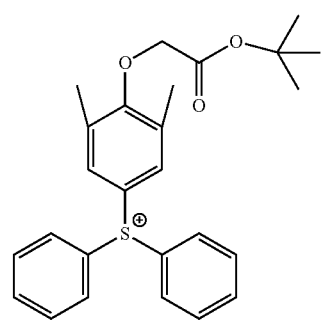
(ca-1-10)
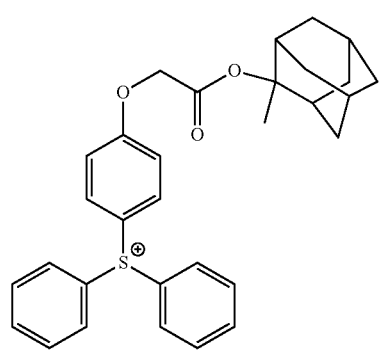
(ca-1-11)
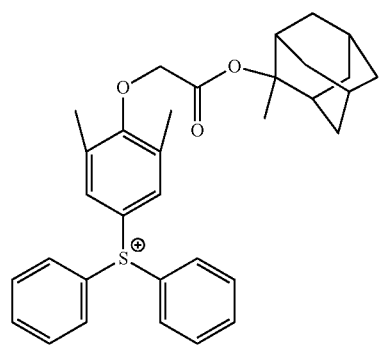
(ca-1-12)
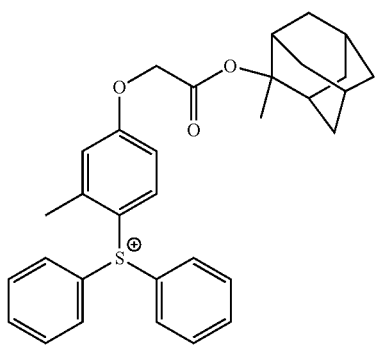
(ca-1-13)
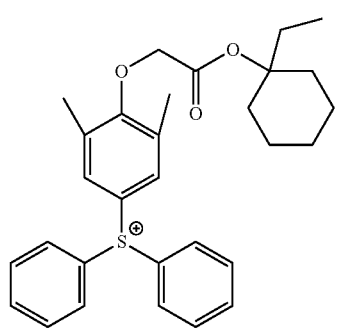
(ca-1-14)
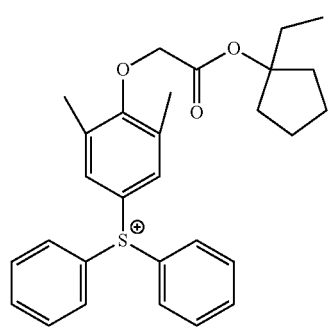
(ca-1-15)
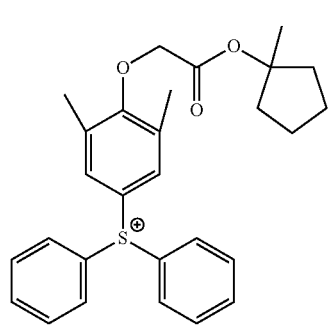

(ca-1-16)
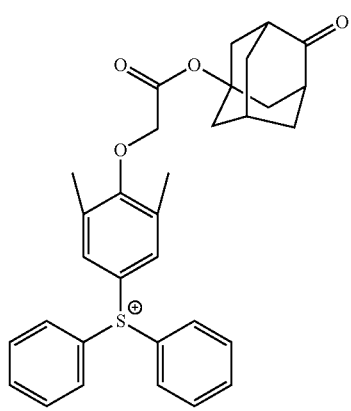
[Chemical Formula 21]
(ca-1-17)
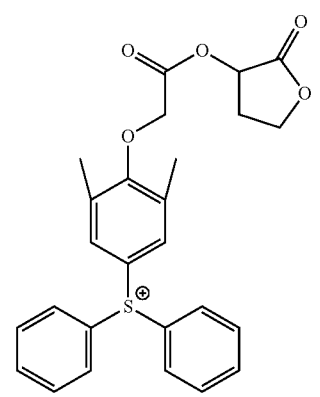
(ca-1-18)
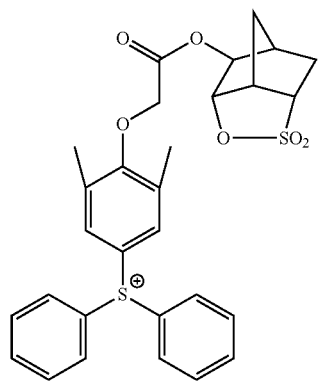
(ca-1-19)
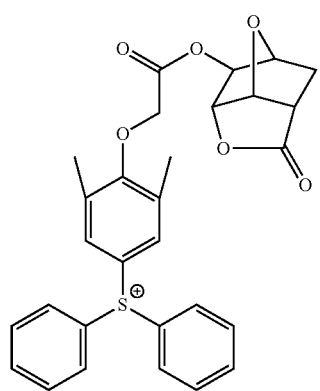
(ca-1-20)
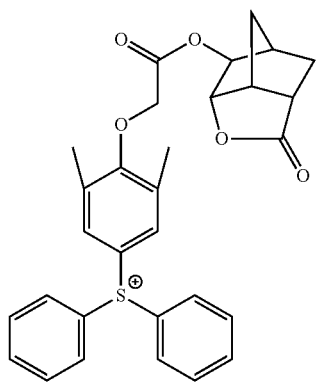
(ca-1-21)
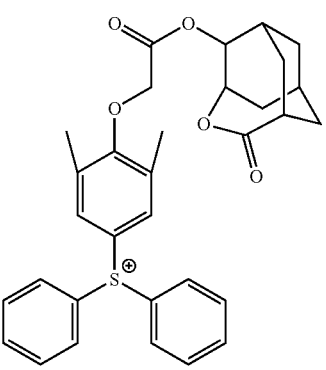
(ca-1-22)
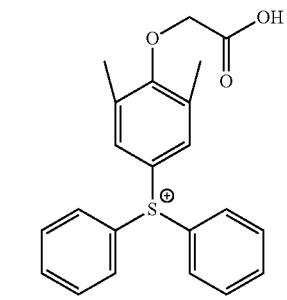
(ca-1-23)
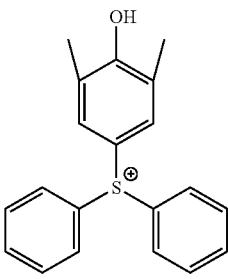
(ca-1-24)
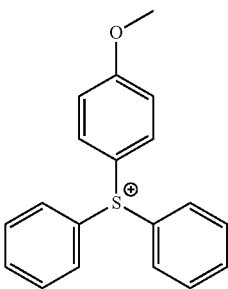

(ca-1-25)
(ca-1-26)
(ca-1-27)
(ca-1-28)
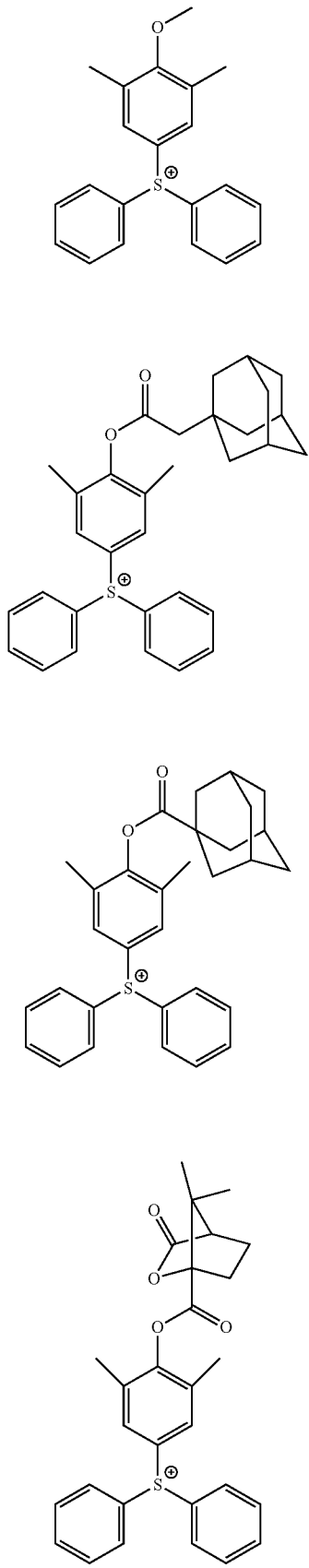
[Chemical Formula 22]
(ca-1-29)
(ca-1-30)
(ca-1-31)
(ca-1-32)
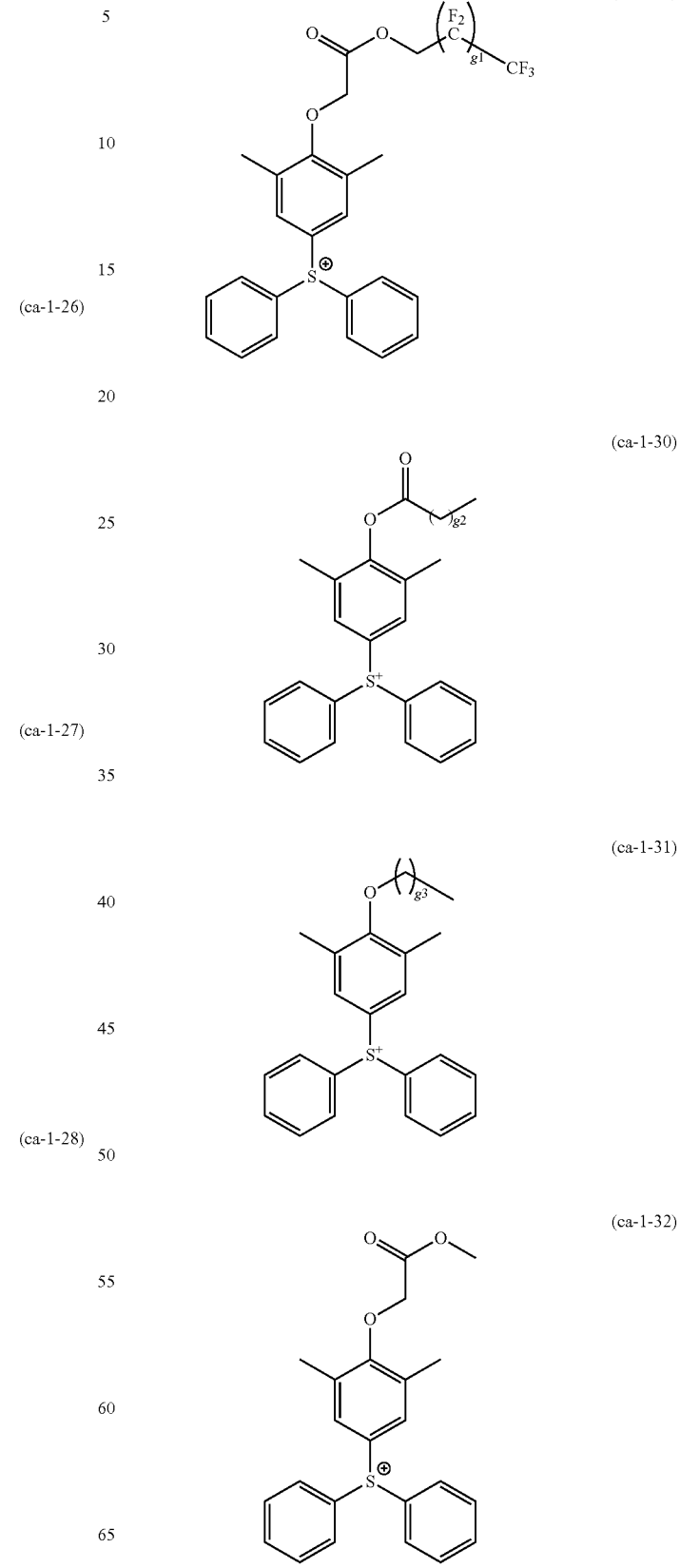

(ca-1-33)
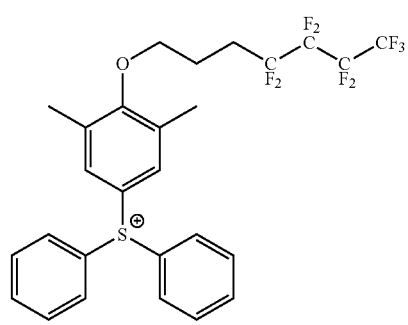
(ca-1-34)
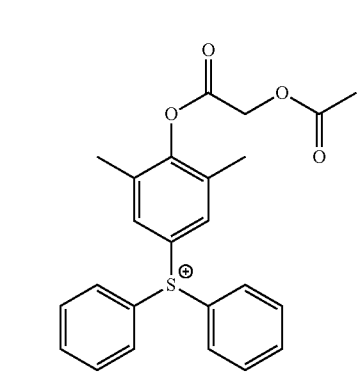
(ca-1-35)
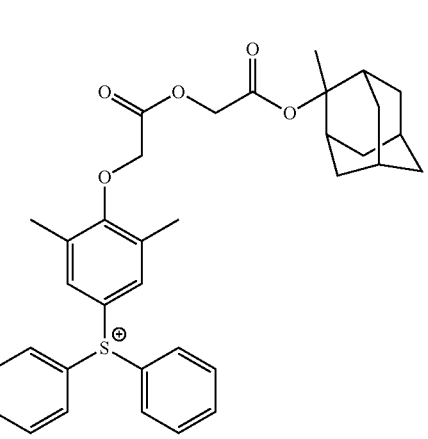
(ca-1-37)
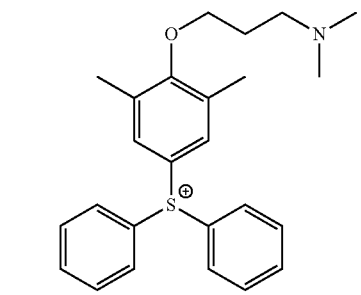
(ca-1-38)
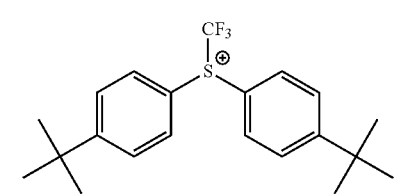
(ca-1-39)
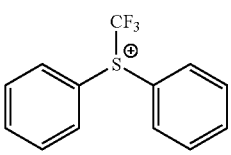
(ca-1-40)
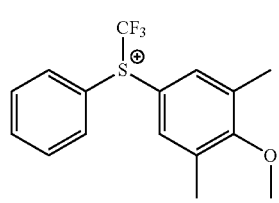
(ca-1-41)
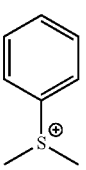
(ca-1-42)
(ca-1-43)
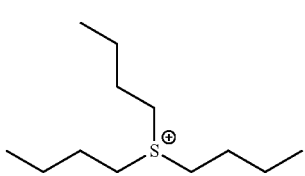
(ca-1-44)
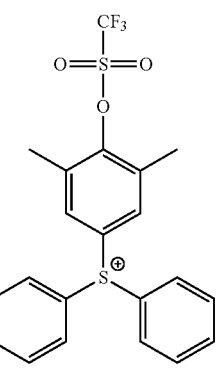

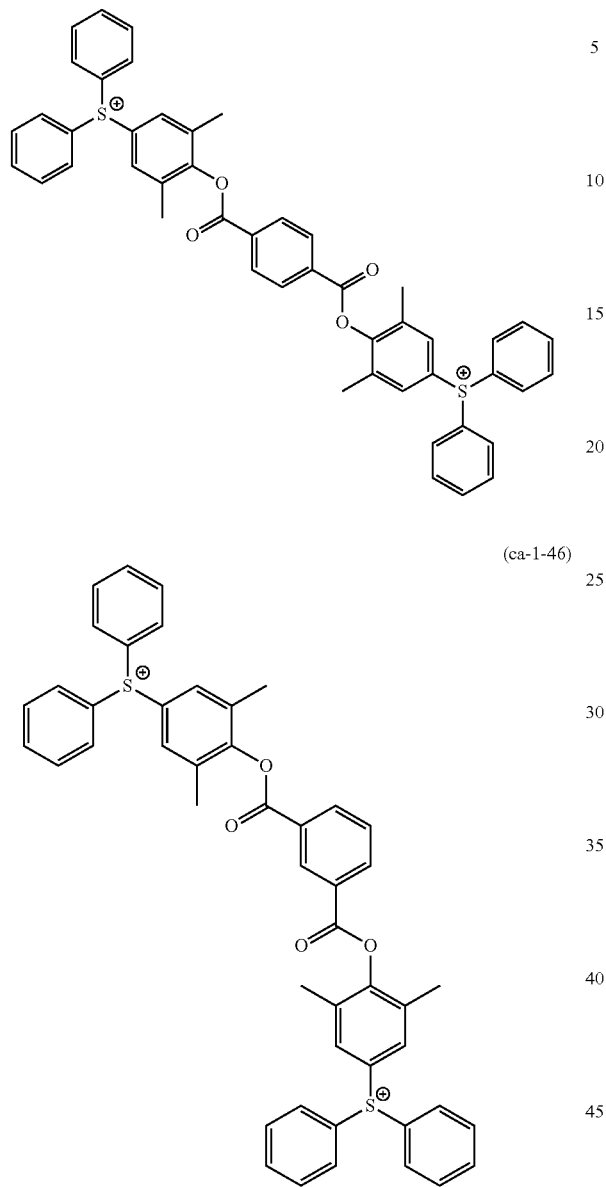
(ca-1-45)
(ca-1-46)
In the formulas, g1, g2 and g3 represent recurring numbers, wherein g1 is an integer of 1 to 5, g2 is an integer of 0 to 20, and g3 is an integer of 0 to 20.
[Chemical Formula 23]
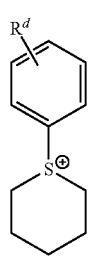
(ca-1-47)
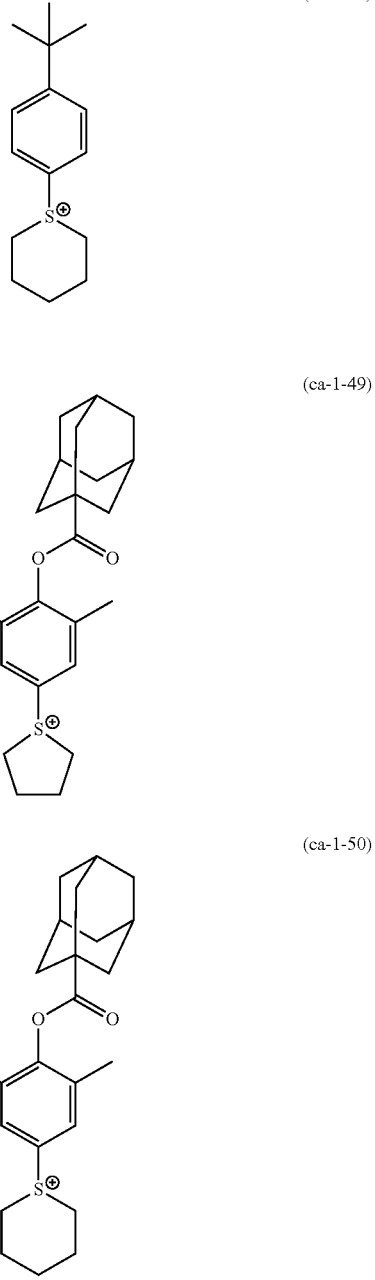
(ca-1-48)
(ca-1-49)
(ca-1-50)
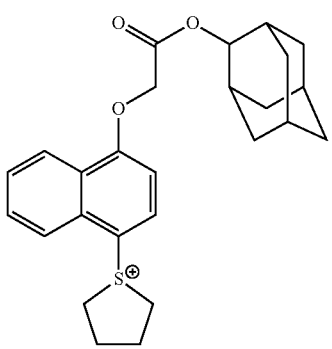
(ca-1-51)

(ca-1-52)

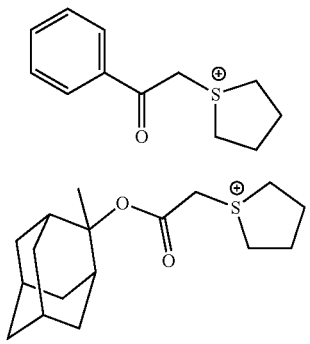

(ca-1-53)

In formula (ca-1-47), $R^d$ represents a substituent. Examples of the substituent include those described above in the explanation of the aforementioned substituted aryl group (an alkyl group, an alkoxy group, an alkoxyalkyloxy group, an alkoxycarbonylalkyloxy group, a halogen atom, a hydroxy group, an oxo group (=O), an aryl group, $-C(=O)-O-R^{6\prime}$, $-O-C(=O)-R^{7\prime}$ and $-O-R^{8\prime}$.

In formula (b-c2), $R^{5\prime\prime\prime}$ and $R^{6\prime\prime\prime}$ each independently represents an aryl group which may have a substituent, an alkyl group which may have a substituent or an alkenyl group which may have a substituent.

As the aryl group for $R^{5\prime\prime\prime}$ and $R^{6\prime\prime\prime}$, the same aryl groups as those described above for $R^{1\prime\prime\prime}$ to $R^{3\prime\prime\prime}$ can be used.

As the alkyl group for $R^{5\prime\prime\prime}$ and $R^{6\prime\prime\prime}$, the same alkyl groups as those described above for $R^{1\prime\prime\prime}$ to $R^{3\prime\prime\prime}$ can be used.

As the alkenyl group for $R^{5\prime\prime\prime}$ to $R^{6\prime\prime\prime}$, the same alkenyl groups as those described above for $R^{1\prime\prime\prime}$ to $R^{3\prime\prime\prime}$ can be used.

Specific examples of the cation moiety of the compound represented by general formula (b-c2) include diphenyliodonium and bis(4-tert-butylphenyl)iodonium.

In the present description, an oximesulfonate acid generator is a compound having at least one group represented by general formula (B-1) shown below, and has a feature of generating acid by irradiation of radial rays (exposure). Such oximesulfonate acid generators may be selected appropriately from the various oximesulfonate acid generators widely used within conventional chemically amplified resist compositions.

[Chemical Formula 24]

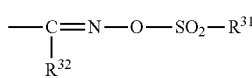

(B-1)

In the formula (B-1), $R^{31}$ and $R^{32}$ each independently represents an organic group.

The organic group for $R^{31}$ and $R^{32}$ refers to a group containing a carbon atom, and may include atoms other than carbon atoms (e.g., a hydrogen atom, an oxygen atom, a nitrogen atom, a sulfur atom, a halogen atom (such as a fluorine atom and a chlorine atom) and the like).

As the organic group for $R^{31}$, a linear, branched, or cyclic alkyl group or aryl group is preferable. The alkyl group or the aryl group may have a substituent. The substituent is not particularly limited, and examples thereof include a fluorine atom and a linear, branched, or cyclic alkyl group having 1 to 6 carbon atoms. The alkyl group or the aryl group "has a substituent" means that part or all of the hydrogen atoms of the alkyl group or the aryl group is substituted with a substituent.

The alkyl group preferably has 1 to 20 carbon atoms, more preferably 1 to 10 carbon atoms, still more preferably 1 to 8 carbon atoms, particularly preferably 1 to 6 carbon atoms, and most preferably 1 to 4 carbon atoms. As the alkyl group, a partially or completely halogenated alkyl group (hereinafter, sometimes referred to as a "halogenated alkyl group") is particularly desirable. The "partially halogenated alkyl group" refers to an alkyl group in which part of the hydrogen atoms are substituted with halogen atoms and the "completely halogenated alkyl group" refers to an alkyl group in which all of the hydrogen atoms are substituted with halogen atoms. Examples of halogen atoms include fluorine atoms, chlorine atoms, bromine atoms and iodine atoms, and fluorine atoms are particularly desirable. In other words, the halogenated alkyl group is preferably a fluorinated alkyl group.

The aryl group preferably has 4 to 20 carbon atoms, more preferably 4 to 10 carbon atoms, and most preferably 6 to 10 carbon atoms. As the aryl group, partially or completely halogenated aryl group is particularly desirable. The "partially halogenated aryl group" refers to an aryl group in which some of the hydrogen atoms are substituted with halogen atoms and the "completely halogenated aryl group" refers to an aryl group in which all of hydrogen atoms are substituted with halogen atoms.

As $R^{31}$, an alkyl group of 1 to 4 carbon atoms which has no substituent or a fluorinated alkyl group of 1 to 4 carbon atoms is particularly desirable.

As the organic group for $R^{32}$, a linear, branched, or cyclic alkyl group, an aryl group, or a cyano group is preferable. As the alkyl group or the aryl group for $R^{32}$, the same alkyl groups or aryl groups as those described above for $R^{31}$ can be used.

As $R^{32}$, a cyano group, an alkyl group of 1 to 8 carbon atoms having no substituent or a fluorinated alkyl group of 1 to 8 carbon atoms is particularly desirable.

Preferable examples of the oxime sulfonate-based acid generator include compounds represented by general formula (B-2) or (B-3) shown below.

[Chemical Formula 25]

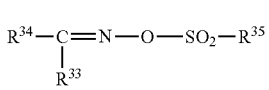

(B-2)

In the formula (B-2), $R^{33}$ represents a cyano group, an alkyl group having no substituent or a halogenated alkyl group; $R^{34}$ represents a group containing an aryl group; an alkyl group or a halogenated alkyl group for $R^{34}$ and $R^{35}$ may be mutually bonded to form a ring; and $R^{35}$ represents an alkyl group having no substituent or a halogenated alkyl group.

[Chemical Formula 26]

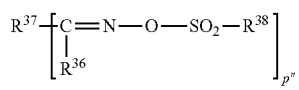

(B-3)

In the formula (B-3), $R^{36}$ represents a cyano group, an alkyl group having no substituent or a halogenated alkyl group; $R^{37}$ represents a divalent or trivalent aromatic hydrocarbon group; $R^{38}$ represents an alkyl group having no substituent or a halogenated alkyl group; and p" represents 2 or 3.

In general formula (B-2), the alkyl group having no substituent or the halogenated alkyl group for $R^{33}$ preferably has 1 to 10 carbon atoms, more preferably 1 to 8 carbon atoms, and most preferably 1 to 6 carbon atoms.

As $R^{33}$, a halogenated alkyl group is preferable, and a fluorinated alkyl group is more preferable.

The fluorinated alkyl group for $R^{33}$ preferably has 50% or more of the hydrogen atoms thereof fluorinated, more preferably 70% or more, and most preferably 90% or more.

Examples of the group containing an aryl group for $R^{34}$ include groups in which one hydrogen atom has been removed from an aromatic hydrocarbon ring, such as a phenyl group, a biphenyl group, a fluorenyl group, a naphthyl group, an anthryl group, and a phenantryl group, and heteroaryl groups in which some of the carbon atoms constituting the ring(s) of these groups are substituted with hetero atoms such as an oxygen atom, a sulfur atom, and a nitrogen atom. Of these, a fluorenyl group is preferable.

The aryl group for $R^{34}$ may have a substituent such as an alkyl group of 1 to 10 carbon atoms, a halogenated alkyl group, or an alkoxy group. The alkyl group and halogenated alkyl group as the substituent preferably has 1 to 8 carbon atoms, and more preferably 1 to 4 carbon atoms. Further, the halogenated alkyl group is preferably a fluorinated alkyl group.

The alkyl group having no substituent or the halogenated alkyl group for $R^{35}$ preferably has 1 to 10 carbon atoms, more preferably 1 to 8 carbon atoms, and most preferably 1 to 6 carbon atoms.

As $R^{35}$, a halogenated alkyl group is preferable, and a fluorinated alkyl group is more preferable.

In terms of enhancing the strength of the acid generated, the fluorinated alkyl group for $R^{35}$ preferably has 50% or more of the hydrogen atoms fluorinated, more preferably 70% or more, still more preferably 90% or more. A completely fluorinated alkyl group in which 100% of the hydrogen atoms are substituted with fluorine atoms is particularly desirable.

In general formula (B-3), as the alkyl group having no substituent and the halogenated alkyl group for $R^{36}$, the same alkyl group having no substituent and the halogenated alkyl group described above for $R^{33}$ can be used.

Examples of the divalent or trivalent aromatic hydrocarbon group for $R^{37}$ include groups in which one or two hydrogen atoms have been removed from the aryl group for $R^{34}$.

As the alkyl group having no substituent or the halogenated alkyl group for $R^{38}$, the same one as the alkyl group having no substituent or the halogenated alkyl group for $R^{35}$ can be used.

p" is preferably 2.

Specific examples of suitable oxime sulfonate acid generators include α-(p-toluenesulfonyloxyimino)-benzyl cyanide, α-(p-chlorobenzenesulfonyloxyimino)-benzyl cyanide, α-(4-nitrobenzenesulfonyloxyimino)-benzyl cyanide, α-(4-nitro-2-trifluoromethylbenzenesulfonyloxyimino)-benzyl cyanide, α-(benzenesulfonyloxyimino)-4-chlorobenzyl cyanide, α-(benzenesulfonyloxyimino)-2,4-dichlorobenzyl cyanide, α-(benzenesulfonyloxyimino)-2,6-dichlorobenzyl cyanide, α-(benzenesulfonyloxyimino)-4-methoxybenzyl cyanide, α-(2-chlorobenzenesulfonyloxyimino)-4-methoxybenzyl cyanide, α-(benzenesulfonyloxyimino)-thien-2-yl acetonitrile, α-(4-dodecylbenzenesulfonyloxyimino)benzyl cyanide, α-[(p-toluenesulfonyloxyimino)-4-methoxyphenyl]acetonitrile, α-[(dodecylbenzenesulfonyloxyimino)-4-methoxyphenyl]acetonitrile, α-(tosyloxyimino)-4-thienyl cyanide, α-(methylsulfonyloxyimino)-1-cyclopentenyl acetonitrile, α-(methylsulfonyloxyimino)-1-cyclohexenyl acetonitrile, α-(methylsulfonyloxyimino)-1-cycloheptenyl acetonitrile, α-(methylsulfonyloxyimino)-1-cyclooctenyl acetonitrile, α-(trifluoromethylsulfonyloxyimino)-1-cyclopentenyl acetonitrile, α-(trifluoromethylsulfonyloxyimino)-cyclohexyl acetonitrile, α-(ethylsulfonyloxyimino)-ethyl acetonitrile, α-(propylsulfonyloxyimino)-propyl acetonitrile, α-(cyclohexylsulfonyloxyimino)-cyclopentyl acetonitrile, α-(cyclohexylsulfonyloxyimino)-cyclohexyl acetonitrile, α-(cyclohexylsulfonyloxyimino)-1-cyclopentenyl acetonitrile, α-(ethylsulfonyloxyimino)-1-cyclopentenyl acetonitrile, α-(isopropylsulfonyloxyimino)-1-cyclopentenyl acetonitrile, α-(n-butylsulfonyloxyimino)-1-cyclopentenyl acetonitrile, α-(ethylsulfonyloxyimino)-1-cyclohexenyl acetonitrile, α-(isopropylsulfonyloxyimino)-1-cyclohexenyl acetonitrile, α-(n-butylsulfonyloxyimino)-1-cyclohexenyl acetonitrile, α-(methylsulfonyloxyimino)-phenyl acetonitrile, α-(methylsulfonyloxyimino)-p-methoxyphenyl acetonitrile, α-(trifluoromethylsulfonyloxyimino)-phenyl acetonitrile, α-(trifluoromethylsulfonyloxyimino)-p-methoxyphenyl acetonitrile, α-(ethylsulfonyloxyimino)-p-methoxyphenyl acetonitrile, α-(propylsulfonyloxyimino)-p-methylphenyl acetonitrile, and α-(methylsulfonyloxyimino)-p-bromophenyl acetonitrile.

Further, oxime sulfonate acid generators disclosed in Japanese Unexamined Patent Application, First Publication No. Hei 9-208554 (Chemical Formulas 18 and 19 shown in paragraphs [0012] to [0014]) and oxime sulfonate acid generators disclosed in WO 2004/074242A2 (Examples 1 to 40 described at pages 65 to 85) may be preferably used.

Furthermore, as preferable examples, the following can be used.

[Chemical Formula 27]

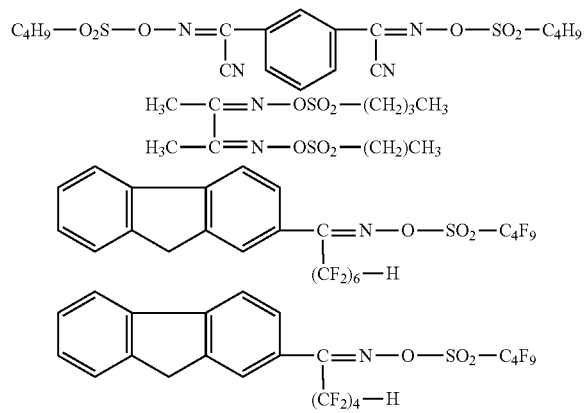

Of the aforementioned diazomethane-based acid generators, specific examples of suitable bisalkyl or bisaryl sulfonyl diazomethanes include bis(isopropylsulfonyl)diazomethane, bis(p-toluenesulfonyl)diazomethane, bis(1,1-dimethylethylsulfonyl)diazomethane, bis(cyclohexylsulfonyl)diazomethane, and bis(2,4-dimethylphenylsulfonyl)diazomethane.

Further, diazomethane-based acid generators disclosed in Japanese Unexamined Patent Application, First Publication No. Hei 11-035551, Japanese Unexamined Patent Application, First Publication No. Hei 11-035552 and Japanese Unexamined Patent Application, First Publication No. Hei 11-035573 may be preferably used.

Furthermore, as poly(bis-sulfonyl)diazomethanes, those disclosed in Japanese Unexamined Patent Application, First Publication No. Hei 11-322707, including 1,3-bis(phenylsulfonyldiazomethylsulfonyl)propane, 1,4-bis(phenylsulfonyldiazomethylsulfonyl)butane, 1,6-bis(phenylsulfonyldiazomethylsulfonyl)hexane, 1,10-bis(phenylsulfonyldiazomethylsulfonyl)decane, 1,2-bis(cyclohexylsulfonyldiazomethylsulfonypethane, 1,3-bis(cyclohexylsulfonyldiazomethylsulfonyl)propane, 1,6-bis(cyclohexylsulfonyldiazomethylsulfonyl)hexane, and 1,10-bis(cyclohexylsulfonyldiazomethylsulfonyl)decane, may be mentioned.

As the component (B), one type of these acid generators may be used alone, or two or more types may be used in combination.

In the case where the undercoat agent contains the component (B), when the component (B) is a thermal acid generator, the amount of the component (B) relative to 100 parts by weight of the component (A) is preferably within a range from 0.5 to 30 parts by weight, more preferably from 1 to 20 parts by weight. When the component (B) is a photoacid generator, the amount of the component (B) is preferably within a range from 0.5 to 30 parts by weight, more preferably from 1 to 20 parts by weight. When the amount of the component (B) is within the above-mentioned range, the effect of the present invention is satisfactorily exerted, and when the amount of the component (B) is at least as large as the lower limit of the above-mentioned range, the amount of the component (A) in the undercoat agent does not decrease.

When the undercoat agent contains the component (B), the amount of the component (B) based on the total of the component (G) and the component (B) is preferably 50% by weight or less, and more preferably 20% by weight or more.

If desired, other miscible additives can also be added to the undercoat agent of the present invention. Examples of such miscible additives include additive resins for improving the performance of the layer composed of the undercoat agent, surfactants for improving the applicability, dissolution inhibitors, plasticizers, stabilizers, colorants, halation prevention agents, dyes, sensitizers, base amplifiers and basic compound.

[Organic Solvent; Component (S)]

The undercoat agent of the present invention can be prepared by dissolving the materials for the undercoat agent in an organic solvent (hereafter, referred to as "component (S)").

The component (S) may be any organic solvent which can dissolve the respective components to give a uniform solution, and one or more kinds of any organic solvent can be appropriately selected from those which have been conventionally known as solvents for a film composition containing a resin as a main component.

Examples thereof include lactones such as γ-butyrolactone; ketones such as acetone, methyl ethyl ketone, cyclohexanone, methyl-n-pentyl ketone, methyl isopentyl ketone, and 2-heptanone; polyhydric alcohols, such as ethylene glycol, diethylene glycol, propylene glycol and dipropylene glycol; compounds having an ester bond, such as ethylene glycol monoacetate, diethylene glycol monoacetate, propylene glycol monoacetate, and dipropylene glycol monoacetate; polyhydric alcohol derivatives including compounds having an ether bond, such as a monoalkylether (e.g., monomethylether, monoethylether, monopropylether or monobutylether) or monophenylether of any of these polyhydric alcohols or compounds having an ester bond (among these, propylene glycol monomethyl ether acetate (PGMEA) and propylene glycol monomethyl ether (PGME) are preferable); cyclic ethers such as dioxane; esters such as methyl lactate, ethyl lactate (EL), methyl acetate, ethyl acetate, butyl acetate, methyl pyruvate, ethyl pyruvate, methyl methoxypropionate, and ethyl ethoxypropionate; and aromatic organic solvents such as anisole, ethylbenzylether, cresylmethylether, diphenylether, dibenzylether, phenetole, butylphenylether, ethylbenzene, diethylbenzene, pentylbenzene, isopropylbenzene, toluene, xylene, cymene and mesitylene.

These solvents can be used individually, or in combination as a mixed solvent.

Among these, propylene glycol monomethyl ether acetate (PGMEA), propylene glycol monomethyl ether (PGME), cyclohexanone and ethyl lactate (EL) are preferable.

Further, among the mixed solvents, a mixed solvent obtained by mixing PGMEA with a polar solvent is preferable. The mixing ratio (weight ratio) of the mixed solvent can be appropriately determined, taking into consideration the compatibility of the PGMEA with the polar solvent, but is preferably in the range of 1:9 to 9:1, more preferably from 2:8 to 8:2. For example, when EL is mixed as the polar solvent, the PGMEA:EL weight ratio is preferably from 1:9 to 9:1, and more preferably from 2:8 to 8:2. Alternatively, when PGME is mixed as the polar solvent, the PGMEA:PGME is preferably from 1:9 to 9:1, more preferably from 2:8 to 8:2, and still more preferably 3:7 to 7:3. Alternatively, when PGME and cyclohexanone is mixed as the polar solvent, the PGMEA:(PGME+cyclohexanone) weight ratio is preferably from 1:9 to 9:1, more preferably from 2:8 to 8:2, and still more preferably 3:7 to 7:3.

Further, as the component (S), a mixed solvent of γ-butyrolactone with PGMEA, EL or the aforementioned mixed solvent of PGMEA with a polar solvent, is also preferable. The mixing ratio (former:latter) of such a mixed solvent is preferably from 70:30 to 95:5.

The amount of the component (S) is not particularly limited, and is appropriately adjusted to a concentration which enables coating of a coating solution to a substrate, depending on the thickness of the coating film. In general, the organic solvent is used in an amount such that the solid content of the undercoat agent becomes within the range from 1 to 20% by weight, and preferably from 2 to 15% by weight.

<<Method of Forming Pattern of Layer Containing Block Copolymer>>

The second aspect of the present invention is a method of forming a pattern of a layer containing a block copolymer, including: a step (1) in which the aforementioned undercoat agent of the first aspect of the present invention is applied to a substrate to form a layer composed of the undercoat agent;

a step (2) in which a layer containing a block copolymer having a plurality of blocks bonded is formed on a surface of the layer composed of the undercoat agent, followed by a phase separation of the layer containing the block copolymer; and a step (3) in which a phase composed of at least one block of the plurality of blocks constituting the block copolymer is selectively removed (hereafter, simply referred to as "method of forming a pattern").

Hereinbelow, the method of forming a pattern according to the present invention will be specifically described, with reference to the drawings. However, the present invention is not limited to these embodiments.

FIG. 1 shows an example of one embodiment of the method of forming a pattern according to the present invention.

In this embodiment, the undercoat agent of the first aspect is applied to a substrate 1 to form a layer 2 composed of the undercoat agent (step (1)). Next, a layer 3 containing a block copolymer having a plurality of blocks bonded is formed, for example, by applying the block copolymer on a surface of the layer 2 composed of the undercoat agent, followed by a phase separation of the layer 3 containing the block copolymer (step (2)). Finally, a phase 3a of at least one block of the plurality of blocks constituting the block copolymer is selectively removed from the layer 3 containing the block copolymer, thereby forming a pattern (step (3)).

[Step (1)]

There are no particular limitations on the substrate 1, provided that the substrate does not dissolve or mix when the undercoat agent or the block copolymer is applied, and the types of conventional materials used as the substrates for electronic components and the like can be used.

Specific examples of the substrate 1 include metal substrates formed from metal such as silicon wafer, gold, copper, chromium, iron or aluminum or the like, metal oxide substrates formed by oxidation of the above metals, glass substrates, and polymer films (such as polyethylene, polyethylene terephthalate, polyimide and benzocyclobutene). In those cases where an undercoat agent having a trialkoxysilyl group as the substrate interaction group is used in the step (2), as a substrate 1, a silicon wafer is preferably used.

Further, the size and the shape of the substrate is not particularly limited. The substrate 1 does not necessarily need to have a smooth surface, and a substrate made of various materials and having various shapes can be appropriately selected for use. For example, a multitude of shapes can be used, such as a substrate having a curved surface, a plate having an uneven surface, and a thin sheet.

Further, as the substrate 1, any one of the above-mentioned substrates provided with an inorganic and/or organic film on the surface thereof may be used, and a substrate provided with an organic film is preferable. As the inorganic film, an inorganic anti-reflection film (inorganic BARC) can be used. As the organic film, an organic anti-reflection film (organic BARC) can be used.

An inorganic film can be formed, for example, by coating an in organic anti-reflection film composition such as a silicon-based material (e.g., SOG film material, SiON film material and the like) on a substrate, followed by baking. The undercoat agent of the present invention is preferably used for an SOG substrate coated by an SOG film material and an SiON substrate coated by an SiON film material.

An organic film can be formed, for example, by dissolving a resin component and the like for forming the film in an organic solvent to obtain an organic film-forming material, coating the organic film-forming material on a substrate using a spinner or the like, and baking under heating conditions preferably in the range of 200 to 300° C. for 30 to 300 seconds, more preferably for 60 to 180 seconds. The organic film-forming material does not need to have susceptibility to light or electron beam like a resist film, and the organic film-forming material may or may not have such susceptibility. More specifically, a resist or a resin generally used in the production of a semiconductor device or a liquid crystal display device can be used.

Further, it is preferable that the organic film-forming material can be subjected to etching, particularly dry etching, so that, by etching the organic film using a pattern composed of a block copolymer, the pattern can be transferred to the organic film, and an organic film pattern can be formed. It is particularly desirable to use an organic film-forming material which can be subjected to oxygen plasma etching or the like. As such an organic film-forming material, a material conventionally used for forming an organic film such as an organic BARC can be used. Examples of such an organic film-forming material include the ARC series manufactured by Brewer Science Ltd., the AR series manufactured by Rohm and Haas Company, and the SWK series manufactured by Tokyo Ohka Kogyo Co., Ltd.

The undercoat agent of the first aspect of the present invention contains a substrate interaction group, and therefore, even when a substrate 1 on which an organic film as described above has been formed, the layer 2 composed of the undercoat agent can satisfactorily interact with the substrate 1, and hence, the layer 2 composed of the undercoat agent becomes a film having excellent strength and adhesion property.

Further the surface of the substrate 1 may be washed in advance. By washing the surface of the substrate, the neutralization reaction treatment in a later step may be satisfactorily performed.

As the washing treatment, a conventional method may be used, and examples thereof include an oxygen plasma treatment, an ozone oxidation treatment, an acid alkali treatment, and a chemical modification treatment.

The method of applying the undercoat agent to the substrate 1 to form a layer 2 composed of the undercoat agent is not particularly limited, and the layer 2 can be formed by a conventional method.

For example, the undercoat agent can be applied to the substrate 1 by a conventional method using a spinner or the like to form a coating film on the substrate 1, followed by drying, thereby forming a layer 2 composed of the undercoat agent.

Drying the coating film can be conducted so as to volatilize the organic solvent (component (S)) contained in the undercoat agent, and examples of the drying method include a method of conducting baking.

The baking temperature is preferably 80 to 300° C., more preferably 100 to 270° C., and still more preferably 120 to 250° C. The baking time is preferably 30 to 500 seconds, and more preferably 60 to 240 seconds.

In those cases where the undercoat agent includes the aforementioned component (G) or an acid generator that generates acid upon heating as the aforementioned component (B), a favorable layer 2 composed of the undercoat agent can be obtained under the action of the acidic compound or the acid even if the aforementioned baking time is shortened. When the component (B) in the undercoat agent is a photo acid generator, light or an electron beam or the like may be irradiated onto the layer before or after baking to generate the acid. Irradiation can be conducted by a normal method.

When a layer 2 composed of the undercoat agent is formed on the surface of a substrate 1, the surface of the substrate 1 is neutralized. As a result, it becomes possible to prevent only phases of specific block within the layer 3 (which is composed of a block copolymer and is formed on the layer 2) to come into contact with the surface of the substrate.

As a result, by a phase separation of the layer 3 containing the block copolymer, a cylinder structure, dot structure or gyroid structure which is freely oriented on the surface of the substrate can be formed.

Furthermore, after the step (1) and before the step (2) (prior to forming a layer 3 composed of the block copolymer), a guide pattern having a predetermined pattern may be formed in advance on the layer 2 composed of the undercoat agent. As a result, it becomes possible to control the arrangement of the phase separation structure, depending on the shape and surface properties of the guide pattern. For example, in the case of a block copolymer where a random fingerprint-patterned phase separation structure is formed without using a guide pattern, by introducing a trench pattern of a resist film on the surface of the substrate, a phase separation structure arranged along the trench can be obtained. The guide pattern can be introduced in accordance with the above-described principle. Further, when the surface of the guide pattern has affinity for any of the polymers constituting the block copolymer, a phase separation structure having a lamellar structure or a cylinder structure arranged in the perpendicular direction of the surface of the substrate can be more reliably formed.

More specifically, for example, a resist composition is applied to the surface of the substrate using a spinner or the like, and a prebake (post applied bake (PAB)) is conducted under temperature conditions of 80 to 150° C. for 40 to 120 seconds, preferably 60 to 90 seconds. Then, for example, using an ArF exposure apparatus or the like, the resist film is selectively exposed to an ArF excimer laser through a desired mask pattern, followed by post exposure bake (PEB) under temperature conditions of 80 to 150° C. for 40 to 120 seconds, preferably 60 to 90 seconds. Subsequently, developing is conducted using an alkali developing solution such as a 0.1 to 10% by weight aqueous solution of tetramethylammonium hydroxide (TMAH), preferably followed by rinsing with pure water, and drying. If desired, bake treatment (post bake) can be conducted following the developing. In this manner, a guide pattern that is faithful to the mask pattern can be formed.

The height of the guide pattern from the surface of the substrate (or the surface of the neutralization film) is preferably at least as large as the thickness of the layer containing the block copolymer which is formed on the surface of the substrate. The height of the guide pattern from the surface of the substrate (or the surface of the neutralization film) can be appropriately adjusted by the film thickness of the resist film formed by applying the resist composition for forming a guide pattern.

The resist composition for forming the guide pattern can be appropriately selected from resist compositions or a modified product thereof typically used for forming a resist pattern which have affinity for any of the polymers constituting the block copolymer. With respect to the resist composition, a positive resist composition which forms a positive pattern by dissolving and removing the exposed portions, or a negative resist composition which forms a negative pattern by dissolving and removing the unexposed portions can be used, and a negative resist composition is preferable. As the negative resist composition, for example, a resist composition containing an acid generator component and a base component which exhibits decreased solubility in a developing solution containing an organic solvent by the action of acid, and the base component is a resin component which contains a structural unit that is decomposed by the action of acid to increase polarity.

When a solution of the block copolymer is cast onto the surface of the substrate having a guide pattern formed, and a heat treatment is conducted to cause a phase separation. Therefore, the resist composition for forming a guide pattern is preferably capable of forming a resist film which exhibits solvent resistance and heat resistance.

[Step (2)]

The method for forming a layer 3 containing a block copolymer having a plurality of blocks bonded, on the layer 2 composed of the undercoat agent is not particularly limited, and for example, a method in which a composition containing a block copolymer is applied onto the layer 2 composed of the undercoat agent can be used. As the method of applying, the same method as those described above for applying the undercoat agent can be used.

In the present invention, the lower limit of the thickness of the layer 3 containing the block copolymer is not particularly limited, as long as it is sufficient for causing phase separation. In consideration of the size of periodic structure of phase separation structure to be formed and the uniformity of the nano structure, the thickness of the layer is preferably 5 nm or more, and more preferably 10 nm or more.

(Composition Containing Block Copolymer)

Block Copolymer

In the present invention, a block copolymer is a polymeric material in which plurality of constituent parts (i.e., block) in which only the structural units of the same type have been bonded, are bonded. As the blocks constituting the block copolymer, 2 types of blocks may be used, or 3 or more types of blocks may be used. In the present invention, the plurality of blocks constituting the block copolymer are not particularly limited, as long as they are combinations capable of causing phase separation. However, it is preferable to use a combination of blocks which are mutually incompatible. Further, it is preferable to use a combination in which a phase of at least one block amongst the plurality of blocks constituting the block copolymer can be easily subjected to selective removal as compared to the phases of other blocks.

Examples of the block copolymer includes:

a block copolymer having a block composed of a structural unit derived from styrene or a derivative thereof bonded to a block composed of a structural unit derived from a (α-substituted)acrylate ester;

a block copolymer having a block composed of a structural unit derived from styrene or a derivative thereof bonded to a block composed of a structural unit derived from siloxane or derivative thereof; and a block copolymer having a block composed of a structural unit derived from alkyleneoxyde bonded to a block composed of a structural unit derived from a (α-substituted) acrylate ester.

The structural unit derived from styrene or a derivative thereof and the structural unit derived from a (α-substituted) acrylate ester are the same as defined above.

Examples of the siloxane derivative include dimethylsiloxane, diethylsiloxane, diphenylsiloxane, and methylphenylsiloxane.

Examples of the alkylene oxide include ethylene oxide, propylene oxide, isopropylene oxide and butylene oxide.

Among these as a block copolymer, it is preferable to use a block copolymer having a block composed of a structural unit derived from styrene or a derivative thereof bonded to a block composed of a structural unit derived from a (meth)acrylate ester.

Specific examples thereof include a polystyrene-polymethyl methacrylate (PS-PMMA) block copolymer, a polystyrene-polyethyl methacrylate block copolymer, a polystyrene-(poly-t-butyl methacrylate) block copolymer, a polystyrene-polymethacrylic acid block copolymer, a polystyrene-polymethyl acrylate block copolymer, a polystyrene-polyethyl acrylate block copolymer, a polystyrene-(poly-t-butyl acrylate) block copolymer, and a polystyrene-polyacrylic acid block copolymer. Among these, PS-PMMA block copolymer is particularly preferable.

The weight average molecular weight (Mw) (the polystyrene equivalent value determined by gel permeation chromatography) of each polymer constituting the block copolymer is not particularly limited as long as it is large enough to cause phase separation. The weight average molecular weight is preferably 5,000 to 500,000, more preferably 5,000 to 400,000, and still more preferably 5,000 to 300,000.

The polydispersity (Mw/Mn) of the block copolymer is preferably 1.0 to 3.0, more preferably 1.0 to 1.5, and still more preferably 1.0 to 1.2. Here, Mn is the number average molecular weight.

If desired, other miscible additives can also be added to the composition containing a block copolymer. Examples of such miscible additives include additive resins for improving the performance of the layer composed of the undercoat agent, surfactants for improving the applicability, dissolution inhibitors, plasticizers, stabilizers, colorants, halation prevention agents, dyes, sensitizers, base amplifiers and basic compound.

Organic Solvent

The composition containing a block copolymer can be prepared by dissolving the aforementioned block copolymer in an organic solvent. Examples of organic solvents that may be used include the same solvents as those mentioned above for the component (S) used as the organic solvent for the undercoat agent.

There are no particular limitations on the amount used of the organic solvent in the composition containing the block copolymer, which may be adjusted appropriately to produce a concentration that enables application of the solution in accordance with the desired thickness of the formed film. In general, the organic solvent is used in an amount that yields a solid content of the block copolymer that is within a range from 0.2 to 70% by weight, and preferably from 0.2 to 50% by weight.

With respect to the phase separation of the layer 3 containing the block copolymer, the substrate 1 on which the layer 3 containing the block copolymer and the layer 2 composed of the undercoat agent have been formed, is subjected to a heat treatment, and a phase separation structure in which at least a part of the surface of the substrate is exposed is formed by a selective removal of the block copolymer in a later step. The heat treatment is preferably conducted at a temperature at least as high as the glass transition temperature of the block copolymer used and lower than the heat decomposition temperature. For example, when a PS-PMMA (Mw: 40 k-20 k) is used as the block copolymer, it is preferable to conduct a heat treatment at 180 to 270° C. for 30 to 3,600 seconds.

Further, the heat treatment is preferably conducted in a low reactive gas such as nitrogen.

[Step (3)]

In the step (3), a phase 3a of at least one block of the plurality of blocks constituting the block copolymer is selectively removed from the layer 3 containing the block copolymer, thereby forming a pattern.

Hereafter, among the blocks constituting the block copolymer, a block which is not selectively removed is referred to as "block $P_A$", and a block to be selectively removed is referred to as "block $P_B$". For example, after the phase separation of a layer containing a PS-PMMA block copolymer, by subjecting the layer to an oxygen plasma treatment or a hydrogen plasma treatment, the phase of PMMA is selectively removed. In such a case, PS is the block $P_A$, and PMMA is the block $P_B$.

Subsequently, after the formation of the phase separation structure, at least a portion of the phase of block $P_B$ is selectively removed from the layer containing the block copolymer formed on the substrate (the molecular weight is decreased). By selectively removing a portion of the block $P_B$ in advance, the solubility in a developing solution can be enhanced. As a result, the phase of the block $P_B$ can be more reliably removed by selective removing than the phase of the block $P_A$.

The selective removal treatment is not particularly limited, as long as it is a treatment capable of decomposing and removing the block $P_B$ without affecting the block $P_A$. The selective removal treatment can be appropriately selected from any methods for removing a resin film, depending on the types of the block $P_A$ and the block $P_B$. Further, when a neutralization film is formed on the surface of the substrate in advance, the neutralization film is removed together with the phase of the block $P_B$. Examples of the removal treatment include an oxygen plasma treatment, an ozone treatment, a UV irradiation treatment, a heat decomposition treatment and a chemical decomposition treatment.

The substrate on which a pattern 3b has been formed by a phase separation of the layer 3 containing the block copolymer in the manner described above can be used without further modification, or may be subjected to an additional heat treatment to alter the shape of the polymer nanostructure on the substrate. The heat treatment is preferably conducted at a temperature at least as high as the glass transition temperature of the block copolymer used and lower than the heat decomposition temperature. Further, the heat treatment is preferably conducted in a low reactive gas such as nitrogen.

EXAMPLES

As follows is a description of examples of the present invention, although the scope of the present invention is in no way limited by these examples.

[Production of Polymeric Compounds 1 to 9]

Polymeric compounds 1 to 9 were produced by a conventional method using the following monomers (1) to (8) which derived the structural units constituting each polymeric compound with a molar ratio indicated in Table 1. The molecular weight (Mw) and the molecular weight distribution (Mw/Mn) of the obtained polymeric compounds are shown in Table 1.

[Chemical Formula 28]

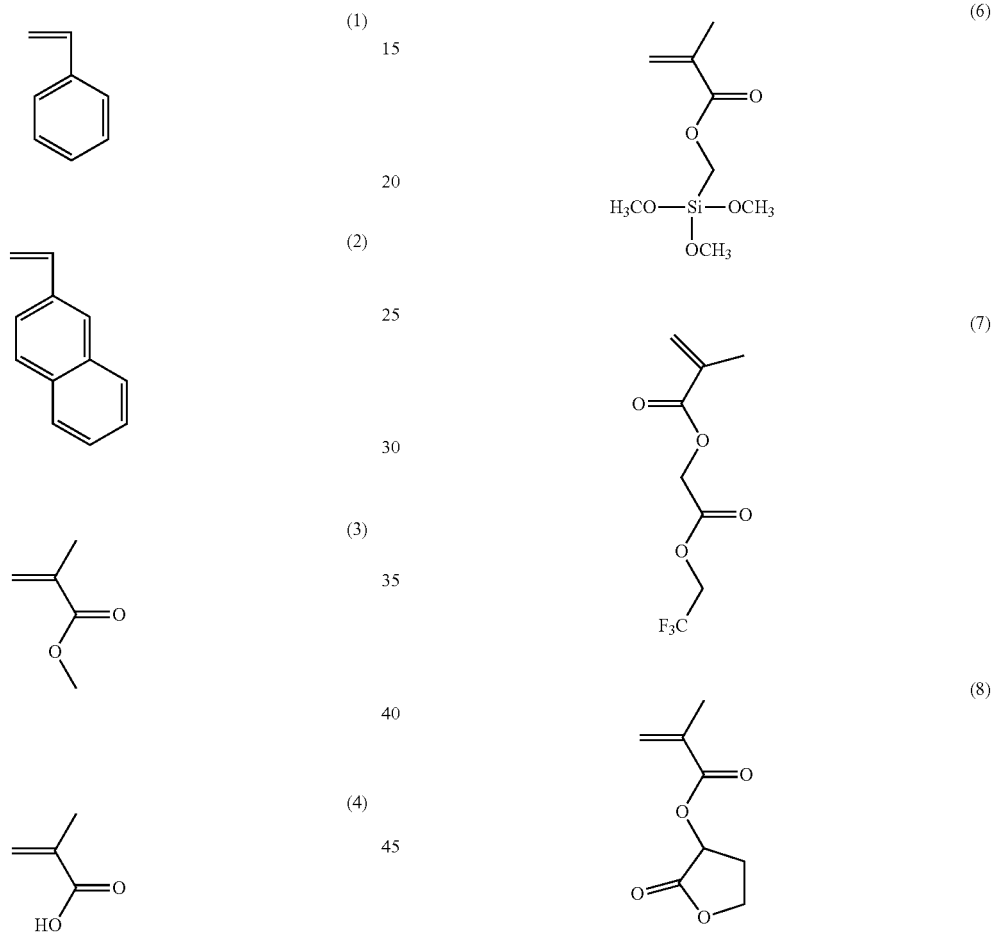

TABLE 1

| | | Polymeric Compound | | | | | | | | |
|---|---|---|---|---|---|---|---|---|---|---|
| | | 1 | 2 | 3 | 4 | 5 | 6 | 7 | 8 | 9 |
| Monomer | (1) | 85 | 85 | 85 | | 85 | 90 | 70 | 92 | 92 |
| | (2) | | | | 70 | | | | | |
| | (3) | | | | 25 | | | 30 | | |
| | (4) | 15 | | 8 | 5 | 5 | 5 | | 3 | 3 |
| | (5) | | 15 | 7 | | | | 5 | | |
| | (6) | | | | | 10 | | | | |
| | (7) | | | | | | | | 5 | |
| | (8) | | | | | | | | | 5 |
| Mw | | 40000 | 10000 | 40000 | 100000 | 10000 | 20000 | 40000 | 57700 | 57700 |
| Mw/Mn | | 1.9 | 1.6 | 1.8 | 1.7 | 1.8 | 1.7 | 1.7 | 1.7 | 1.7 |

Examples 1 to 16, Comparative Examples 1 and 2

First, 100 parts by weight of the polymeric compounds shown in Table 2 were each mixed with 3 part by weight of an acidic compound component or an acid generator that was added as required, and 12,400 parts by weight of PGMEA, and the mixtures were dissolved to prepare a series of undercoat agents.

The thus obtained undercoat agent of each example was applied to a silicon wafer (Si substrate), a silicon wafer having an SOG film formed on the surface thereof (product name: OCD-T11, manufactured by Tokyo Ohka Kogyo Co., Ltd.), a silicon wafer having a film composed of an organic anti-reflection film composition (product name: ARC29A or ARC95, manufactured by Brewer Science Ltd.) on the surface thereof, or a silicon wafer having an SiON film on the surface thereof, using a spinner. In Examples 1 to 10 and Comparative Examples 1 and 2, a bake treatment was then performed at 240° C. for a period indicated in Table 2 to form a layer composed of the undercoat agent having a thickness of 10 nm. Further, with respect to Examples 11 to 16, a bake treatment was conducted for 60 seconds at a temperature indicated in Table 3.

Next, the layer was spun while a rinse was performed using PGMEA for 15 seconds, and the thickness (nm) of the layer composed of the undercoat agent was then measured using a UTFTA-200 (product name, manufactured by Litho Tech Japan Corporation). In all examples, the film thickness was no more than the detection limit (1 nm). Further, as a result of observing the surface of the substrate, in Examples 1 to 16, a thin film (a monomolecular film) was formed from the undercoat agent.

Next, a solution (solvent: PGMEA) containing the block copolymer shown in Table 2 or 3 and having a solid content of 1.8% by weight was spin coated onto the substrate having the layer composed of the undercoat agent formed thereon, thereby forming a coating film having a thickness of 60 nm.

Subsequently, the substrate was heated at 240° C. for 60 seconds while flowing nitrogen, thereby forming a phase-separated structure. Thereafter, the substrate on which a phase-separated structure had been formed, was subjected to an oxygen plasma treatment (200 mL/minute, 40 Pa, 40° C., 200 W, 20 seconds) using TCA-3822 (manufactured by Tokyo Ohka Kogyo Co., Ltd.) to selectively remove the phase of PMMA. The surface of the obtained substrate was observed using a scanning electron microscope (SEM) SU8000 (manufactured by Hitachi High-Technologies Corporation). A substrate on which a uniform pattern (vertical lamella) was observed is evaluated as "A"; a substrate on which a part where a uniform pattern (vertical lamella) had not been formed was observed is evaluated as "B"; and a substrate on which a uniform pattern (vertical lamella) was not observed is evaluated as "C".

In Examples 11, 12, 15 and 16 in which an SiON substrate was used, as well as vertical lamella pattern described above, cylinder pattern was also evaluated. A substrate on which a uniform pattern (cylinder) was observed is evaluated as "A"; a substrate on which a part where a uniform pattern (cylinder) had not been formed was observed is evaluated as "B"; and a substrate on which a uniform pattern (cylinder) was not observed is evaluated as "C".

The results are shown in Tables 2 and 3.

TABLE 2

| | Polymeric compound | Acidic compound/ Acid generator | Bake (sec) | Block copolymer | Si substrate | SOG substrate | ARC 29A | ARC 95 |
|---|---|---|---|---|---|---|---|---|
| Example 1 | (A)-1 | | 300 | (BP)-1 | A | A | A | A |
| Example 2 | (A)-1 | (G)-1 | 60 | (BP)-1 | A | A | A | A |
| Example 3 | (A)-1 | (G)-2 | 60 | (BP)-1 | A | A | A | A |
| Example 4 | (A)-1 | (B)-1 | 60 | (BP)-1 | A | A | A | A |
| Example 5 | (A)-2 | | 300 | (BP)-1 | A | A | A | A |
| Example 6 | (A)-3 | (G)-1 | 180 | (BP)-1 | A | A | A | A |
| Example 7 | (A)-4 | | 300 | (BP)-2 | A | A | A | A |
| Example 8 | (A)-1 | (B)-2 | 180 | (BP)-1 | A | A | A | A |
| Example 9 | (A)-6 | (G)-1 | 60 | (BP)-1 | A | A | A | A |
| Example 10 | (A)-5 | (G)-1 | 60 | (BP)-1 | A | A | A | A |
| Comparative Example 1 | (A)-7 | | 300 | (BP)-1 | C | C | C | C |
| Comparative Example 2 | (A)-7 | (G)-1 | 60 | (BP)-1 | C | C | C | C |

TABLE 3

| | | Bake | | SiON substrate | |
|---|---|---|---|---|---|
| | Polymeric compound | temperature (° C.) | Block copolymer | Lamella pattern | Cylinder pattern |
| Example 11 | (A)-8 | 210 | (BP)-3 | — | A |
| Example 12 | (A)-8 | 230 | (BP)-3 | — | A |
| Example 13 | (A)-8 | 210 | (BP)-4 | B | — |
| Example 14 | (A)-8 | 230 | (BP)-4 | B | — |
| Example 15 | (A)-9 | 210 | (BP)-3 | — | A |
| Example 16 | (A)-9 | 230 | (BP)-3 | — | A |

In Tables 2 and 3, the reference characters indicate the following.

(A)-1 to (A)-9: the aforementioned polymeric compounds 1 to 9

(G)-1: a compound represented by chemical formula (G)-1 shown below (G)-2: nonafluorobutanesulfonate (B)-1 and (B)-2: compounds represented by chemical formulas (B)-1 and (B)-2 shown below, respectively (BP)-1: a block copolymer of PS-PMMA (Mw=18000-18000, Mw/Mn=1.07)

(BP)-2: a block copolymer of PS-PMMA (Mw=45000-20000, Mw/Mn=1.07)

(BP)-3: a block copolymer of PS-PMMA (Mw=52000-20000, Mw/Mn=1.08)

(BP)-4: a block copolymer of PS-PMMA (Mw=23000-20000, Mw/Mn=1.07)

[Chemical Formula 29]

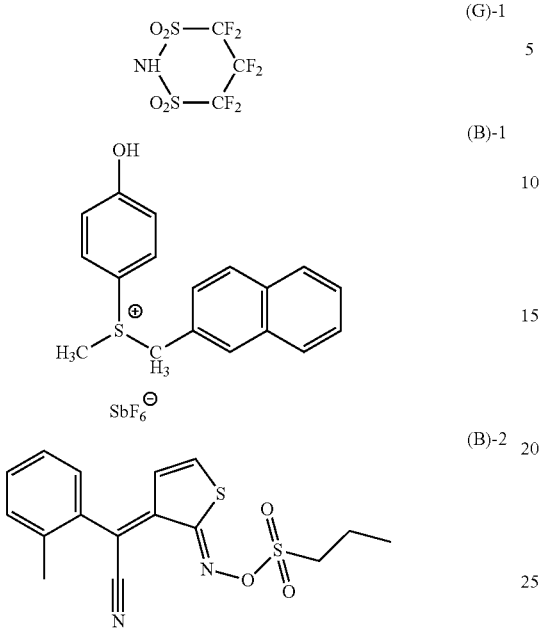

From the results shown above, it was confirmed that, in the case where the undercoat agents of Examples 1 to 16 according to the present invention were used, a favorable pattern (vertical lamella pattern or cylinder pattern) could be obtained by phase separation of a layer containing a block copolymer, as compared to the case where the undercoat agent of Comparative Examples 1 and 2 were used.

BRIEF DESCRIPTION OF THE DRAWINGS

1: substrate, 2: layer composed of undercoat agent, 3: layer containing block copolymer, 3a: phase composed of $P_B$ block, 3b: phase composed of $P_A$ block While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method of forming a pattern of a layer containing a block copolymer, the method comprising:
   applying an undercoat agent to a substrate to form a layer comprising the undercoat agent;
   forming a layer containing a block copolymer having a plurality of blocks bonded on a surface of the layer comprising the undercoat agent which has not been subjected to exposure with radiation, followed by a phase separation of the layer containing the block copolymer; and
   selectively removing a phase comprising at least one block of the plurality of blocks constituting the block copolymer, wherein
   the undercoat agent comprises a resin component, the resin component includes a structural unit having an aromatic ring and a structural unit having no aromatic ring,
   the resin component includes a group which can interact with the substrate and does not include a 3 to 7-membered, ether-containing cyclic group,
   the structural unit having an aromatic ring is at least one structural unit selected from structural units represented by general formulas (a1-1) to (a1-4) shown below;

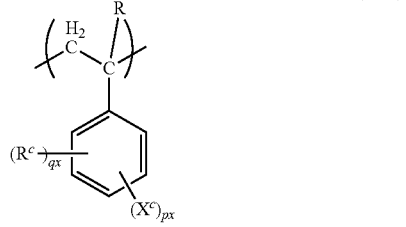

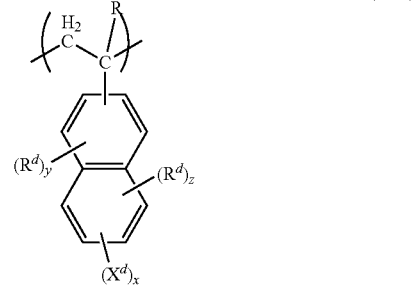

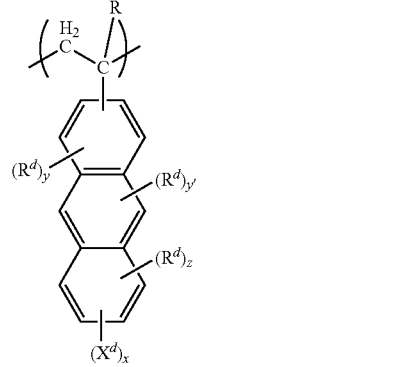

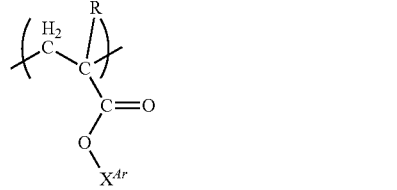

wherein R represents a hydrogen atom, an alkyl group of 1 to 5 carbon atoms or a halogenated alkyl group of 1 to 5 carbon atoms; $X^c$ and $X^d$ each independently represents a hydrogen atom, a hydroxy group, a cyano group or an organic group; $R^c$ and $R^d$ each independently represents a halogen atom, —COOX$^e$ (X$^e$ represents a hydrogen atom or an organic group), an alkyl group of 1 to 5 carbon atoms or a halogenated alkyl group of 1 to 5 carbon atoms; px represents an integer of 0 to 3, qx represents an integer of 0 to 5, and px+qx=1 to 5, provided that, when qx is an integer of 2 or more, the plurality of $R^c$ groups may be the same or different from each other; x represents an integer of 0 to 3, y represents an integer of 0 to 3, y' represents an integer of 0 to 2, z represents an integer of 0 to 4, and in the formula (a1-2), x+y+z=1 to 7, and in the formula (a1-3), x+y+y'+z=1 to 7, provided that, when y+z or y+y'+z is an integer of 2 or more, the plurality of $R^d$ groups may be the same or different from each other; and $X^{Ar}$ represents a monovalent organic group containing an aromatic ring, and the structural unit having no aromatic ring is at least one structural unit represented by any one of the formulas shown below:

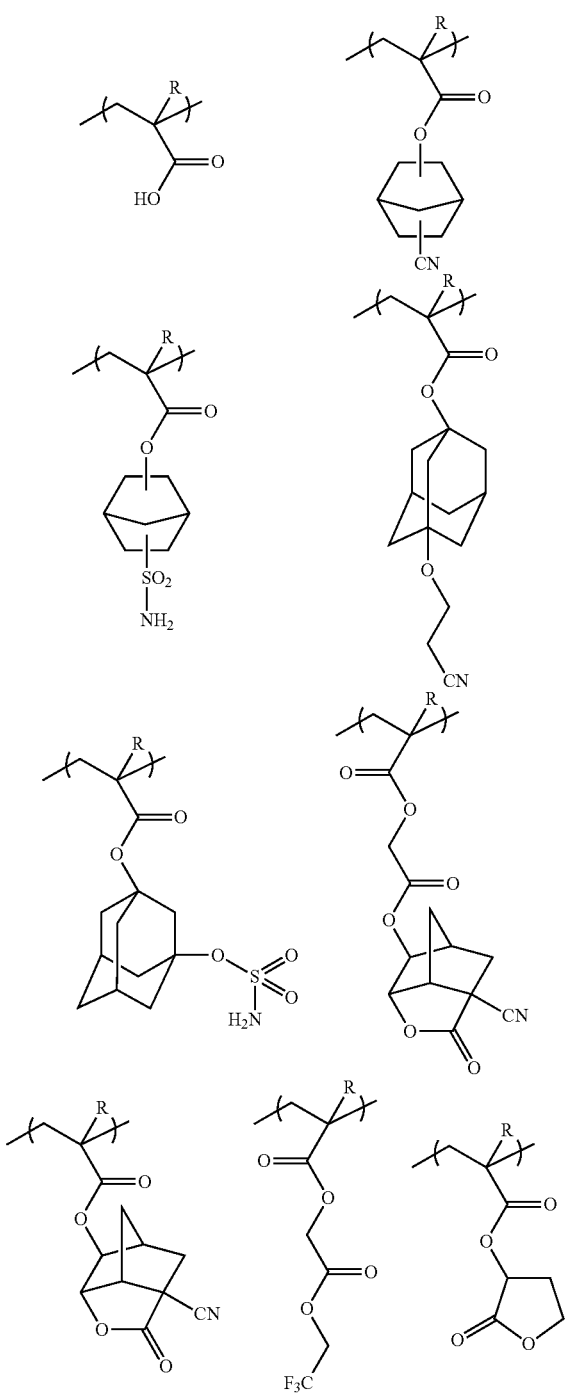

wherein R represents a hydrogen atom, an alkyl group of 1 to 5 carbon atoms or a halogenated alkyl group of 1 to 5 carbon atoms.

2. The method of forming a pattern of a layer containing a block copolymer according to claim 1, wherein the amount of the structural unit having an aromatic ring, based on the combined total of all structural units constituting the resin component is 10 to 95 mol %.

3. The method of forming a pattern of a layer containing a block copolymer according to claim 1, wherein the undercoat agent further comprises an acidic compound component or an acid generator component that generates acid upon heating or exposure.

4. The method of forming a pattern of a layer containing a block copolymer according to claim 1, wherein the structural unit having an aromatic ring is at least one structural unit represented by general formula (a1-1) or (a1-2) shown below:

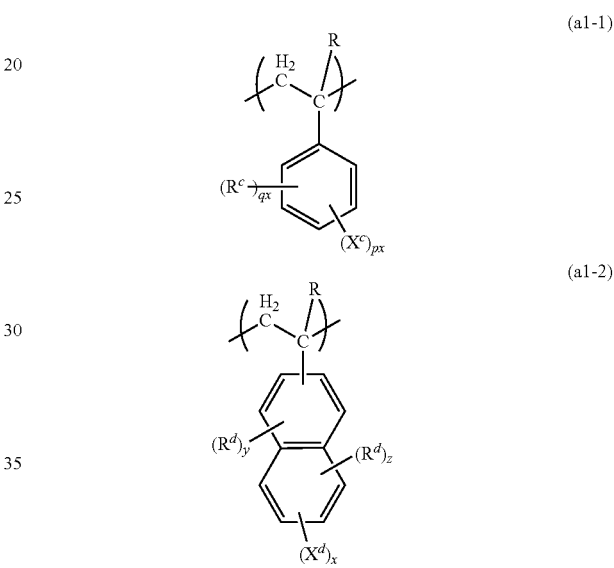

wherein R represents a hydrogen atom, an alkyl group of 1 to 5 carbon atoms or a halogenated alkyl group of 1 to 5 carbon atoms; $X^c$ and $X^d$ each independently represents a hydrogen atom, a hydroxy group, a cyano group or an organic group; $R^c$ and $R^d$ each independently represents a halogen atom, —COOX$^e$ ($X^e$ represents a hydrogen atom or an organic group), an alkyl group of 1 to 5 carbon atoms or a halogenated alkyl group of 1 to 5 carbon atoms; px represents an integer of 0 to 3, qx represents an integer of 0 to 5, and px+qx=1 to 5, provided that, when qx is an integer of 2 or more, the plurality of $R^c$ groups may be the same or different from each other; x represents an integer of 0 to 3, y represents an integer of 0 to 3, z represents an integer of 0 to 4, and x+y+z=1 to 7, provided that, when y+z is an integer of 2 or more, the plurality of $R^d$ groups may be the same or different from each other.

5. The method of forming a pattern of a layer containing a block copolymer according to claim 1, wherein the amount of the structural unit having no aromatic ring, based on the combined total of all structural units constituting the resin component is preferably 5 to 90 mol %.

6. The method of forming a pattern of a layer containing a block copolymer according to claim 1, wherein the structural unit having an aromatic ring is at least one structural unit represented by any one of general formulas shown below;

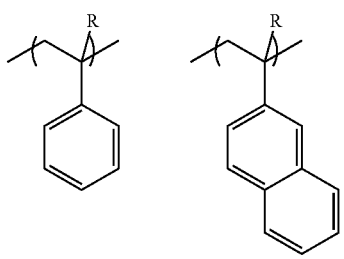

wherein R represents a hydrogen atom, an alkyl group of 1 to 5 carbon atoms or a halogenated alkyl group of 1 to 5 carbon atoms, and the structural unit having no aromatic ring is at least one structural unit represented by any one of the formulas shown below;

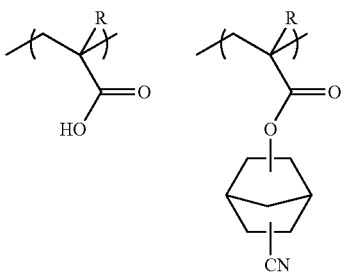

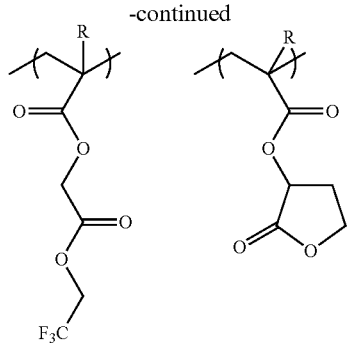

wherein R represents a hydrogen atom, an alkyl group of 1 to 5 carbon atoms or a halogenated alkyl group of 1 to 5 carbon atoms.

7. The method of forming a pattern of a layer containing a block copolymer according to claim 1, wherein the block copolymer is at least one block copolymer selected from the group consisting of a polystyrene-polymethyl methacrylate (PS-PMMA) block copolymer, a polystyrene-polyethyl methacrylate block copolymer, a polystyrene-(poly-t-butyl methacrylate) block copolymer, a polystyrene-polymethacrylic acid block copolymer, a polystyrene-polymethyl acrylate block copolymer, a polystyrene-polyethyl acrylate block copolymer, a polystyrene-(poly-t-butyl acrylate) block copolymer and a polystyrene-polyacrylic acid block copolymer.

* * * * *